(12) United States Patent
Hayama et al.

(10) Patent No.: US 6,438,509 B1
(45) Date of Patent: Aug. 20, 2002

(54) CHARACTER LAYOUT METHOD, IMAGE FORMING METHOD AND STAMP-MAKING METHOD AND APPARATUS THEREFOR

(75) Inventors: Hitoshi Hayama, Nagano; Kenji Watanabe, Tokyo; Takanobu Kameda, Tokyo; Tomoyuki Shimmura, Tokyo, all of (JP)

(73) Assignees: Seiko Epson Corporation; King Jim Co., Ltd., both of Tokyo (JP)

( * ) Notice: Subject to any disclaimer, the term of this patent is extended or adjusted under 35 U.S.C. 154(b) by 830 days.

(21) Appl. No.: 08/777,393

(22) Filed: Dec. 27, 1996

(30) Foreign Application Priority Data

Dec. 28, 1995 (JP) ............................................. 7-341991
Dec. 28, 1995 (JP) ............................................. 7-341996
Dec. 28, 1995 (JP) ............................................. 7-341998

(51) Int. Cl.[7] ............................................. G06F 15/00
(52) U.S. Cl. ............................................. 702/155; 400/3
(58) Field of Search .................. 364/560; 345/467–472, 345/128; 395/102, 110; 707/517–519; 400/2, 3, 9; 702/155

(56) References Cited

U.S. PATENT DOCUMENTS

| | | | |
|---|---|---|---|
| 4,799,172 A | * | 1/1989 | Wood et al. .................. 364/518 |
| 5,230,572 A | * | 7/1993 | Hirono et al. .................. 400/3 |
| 5,344,247 A | | 9/1994 | Sakuragi et al. |
| 5,452,380 A | * | 9/1995 | Uehara et al. .................. 345/128 |
| 5,680,520 A | * | 10/1997 | Watanabe et al. ........... 395/110 |

FOREIGN PATENT DOCUMENTS

JP          9717309          6/1995

\* cited by examiner

*Primary Examiner*—Patrick Assouad
(74) *Attorney, Agent, or Firm*—Hogan & Hartson, L.L.P.

(57) ABSTRACT

An image forming method, a stamp-making method, and apparatuses implementing these methods are provided. Each of characters included in each character string on one or a plurality of lines are laid out within a rectangular contour having a defined width in a reading direction. Each of the characters are laid out so as to satisfy B>D>O, where D is the dimension of a margin between an edge of the contour and a character at an end of the string, and B is the dimension of an inter-character spacing between adjacent characters. Each of the characters are enlarged in the horizontal direction and laid out such that an area ratio of character portions to blank portions within the contour is equal to or lower than a constant value. Within the plurality of lines, the one having the smallest quotient G of a calculation (A−C×F)/F is determined as the longest line, where A is the width of the contour, C is the character width of each of the characters, and an inter-character spacing in the longest line is determined as a reference inter-character spacing dimension B. The characters on the longest line and the remaining line are laid out based on the reference inter-character spacing dimension B.

34 Claims, 41 Drawing Sheets

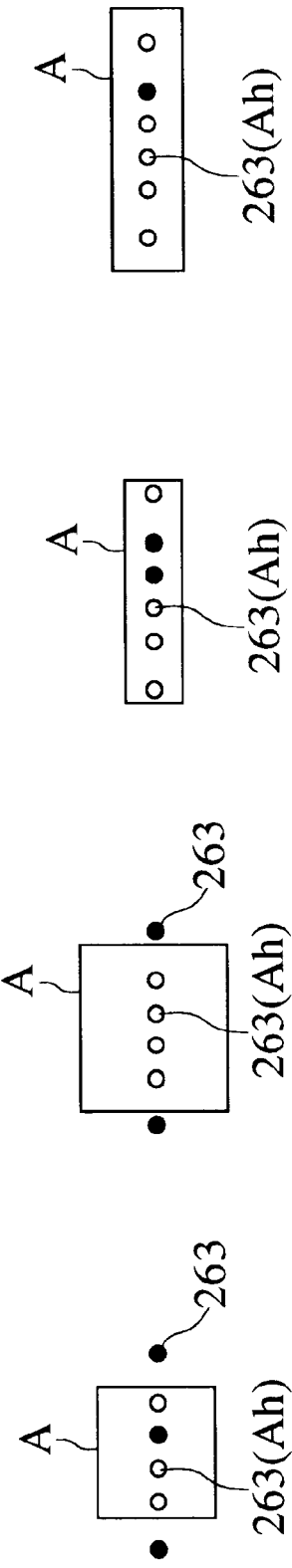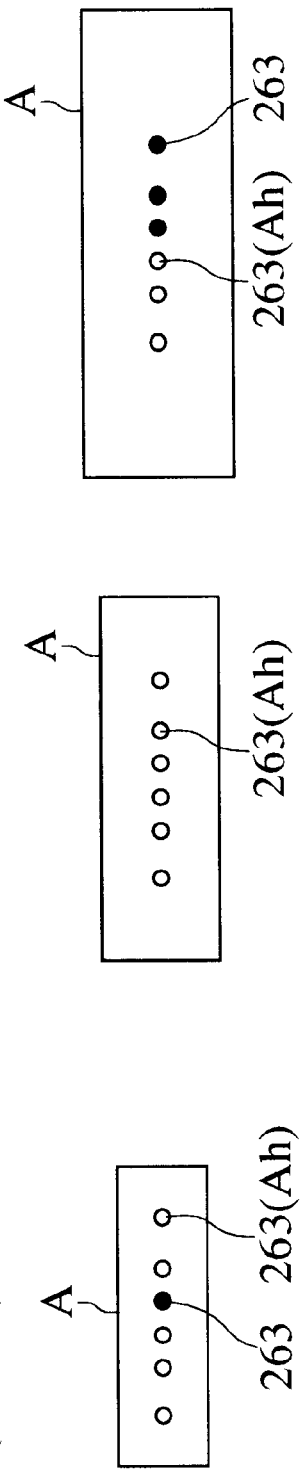

FIG. 12
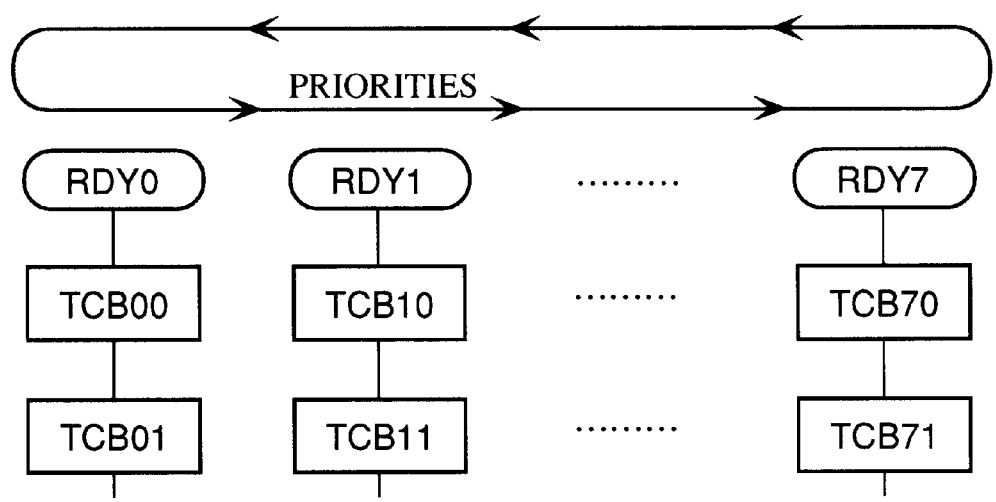
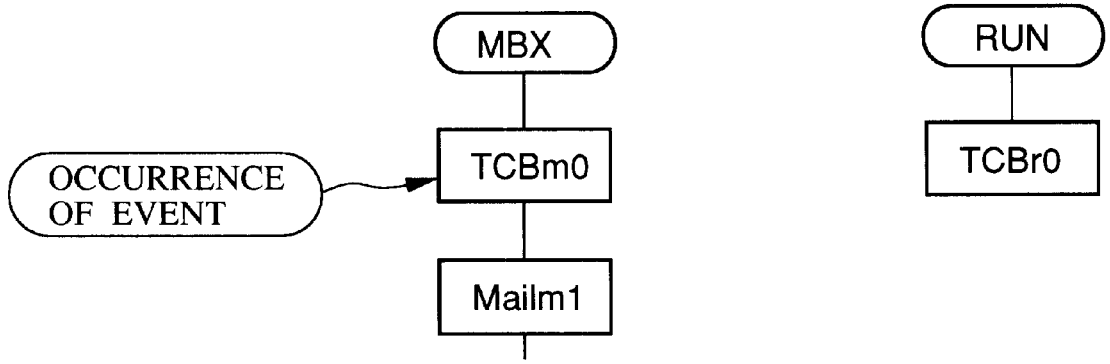

F I G. 1 5
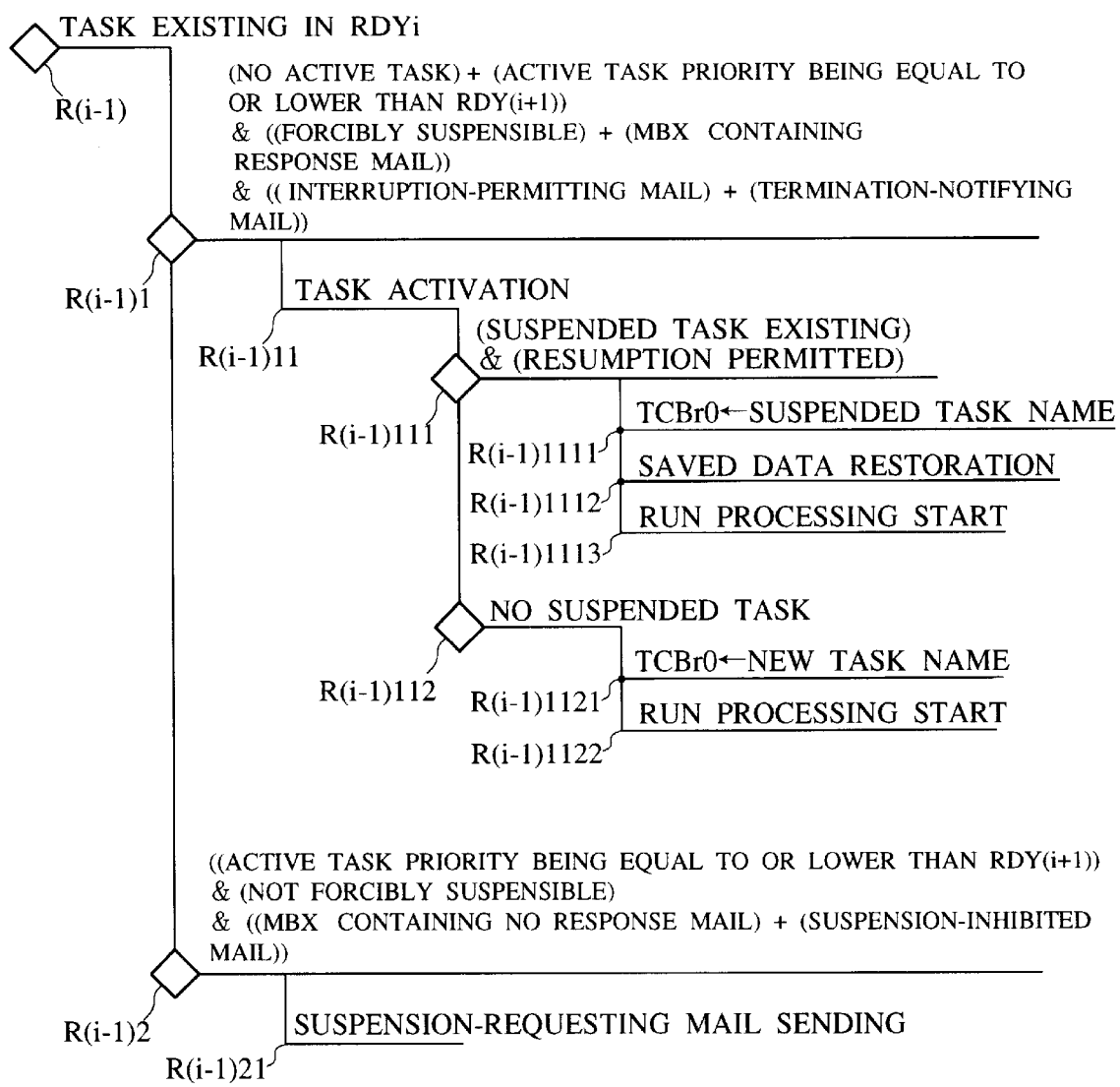

FIG. 21A

FORM : FRAMED PERSONAL NAME STAMP
　　　　—HORIZONTAL
SIZE : ONE LINE SMALL　1a
IMAGE : [千代田花子]
INPUT ITEMS : FAMILY NAME [千代田]　FIRST NAME [花子]

FIG. 21B

FORM : PERSONAL NAME STAMP—HORIZONTAL
SIZE : ONE LINE MIDDLE　1b
IMAGE : 伊藤　あつし
INPUT ITEMS : FAMILY NAME [伊藤]　FIRST NAME [あつし]

FIG. 21C

FORM : PERSONAL NAME STAMP—VERTICAL
SIZE : ONE LINE MIDDLE　1b
IMAGE : 相良　真由美
INPUT ITEMS : FAMILY NAME [相良]　FIRST NAME [真由美]

FIG. 21D

FORM : FRAMED PERSONAL NAME STAMP
　　　　—VERTICAL
SIZE : ONE LINE SMALL　1b
IMAGE : [岸本里香]
INPUT ITEMS : FAMILY NAME [岸本]　FIRST NAME [里香]

FIG. 22A

FORM : BUSINESS STAMP—SMALL—HORIZONTAL
SIZE : TWO LINES SMALL     2a

IMAGE : 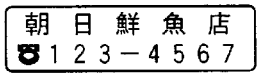

INPUT ITEMS :   FIRST LINE   [朝日鮮魚店]
                SECOND LINE  

FIG. 22B

FORM : BUSINESS STAMP—LARGE—ILLUSTRATED STAMP
       —VERTICAL
SIZE : THREE LINES     3a

IMAGE : 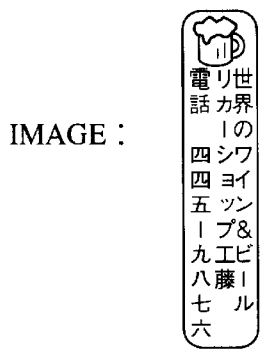

INPUT ITEMS :
    PICTOGRAM   [🍺]
    FIRST LINE  [世界のワイン&ビール]
    SECOND LINE [リカーショップ工藤]
    THIRD LINE  [電話　四四五—九八七六]

FIG. 22C

FORM : SQUARE STAMP—EVALUATION STAMP■ VERY GOOD 01

IMAGE : 

INPUT ITEM :  [たいへんよくできました

FIG. 22D

FORM : SQUARE STAMP—CIRCULAR STAMP—VERTICAL

IMAGE : 

INPUT ITEM :  [人事部]

FIG. 23A

FORM : ADDRESS STAMP

```
┌─┬─────────────┐
│ │             │ ← POSTAL NUMBER
├─┼─────────────┤
│ │             │ ⎫
├─┤             │ ⎬ ADDRESS 1
│ │             │ ⎭
├─┼─────────────┤
│ │             │ ← NAME    ADDRESS 2
├─┼─────────────┤
│ │             │ ← TELEPHONE NUMBER
└─┴─────────────┘
```

(EXAMPLE)

| | | | | | | | | | | |
|---|---|---|---|---|---|---|---|---|---|---|
| A=40 | 1 | 6 | 2 | 6 | 2 | 6 | 2 | 6 | 2 | 6 | 1 |
| A=39 | 1 | 6 | 2 | 6 | 2 | 6 | 2 | 6 | 1 | 6 | 1 |
| A=38 | 1 | 6 | 2 | 6 | 2 | 6 | 1 | 6 | 1 | 6 | 1 |
| A=41 | 1 | 6 | 3 | 6 | 2 | 6 | 2 | 6 | 2 | 6 | 1 |
| A=42 | 1 | 6 | 3 | 6 | 3 | 6 | 2 | 6 | 2 | 6 | 1 |

FIG. 28A  INPUT IMAGE  文字幅通常
普通処理
FIG. 28B  PLATE-MAKING IMAGE AREA FOR STAMP IMAGE DATA 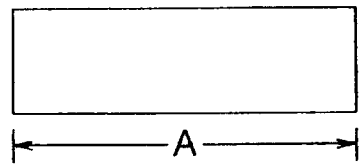
FIG. 28C  STAMP FRAME DATA 
FIG. 28D  STAMP IMAGE DATA AREA 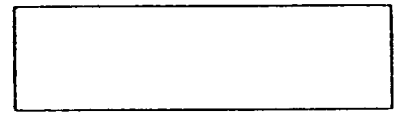
FIG. 28E  READ BASIC IMAGE DATA 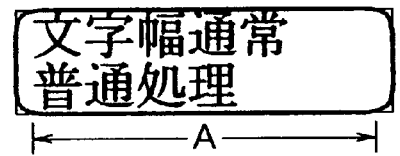
FIG. 28F  STAMP IMAGE DATA AFTER LAYING OUT LONGEST LINE 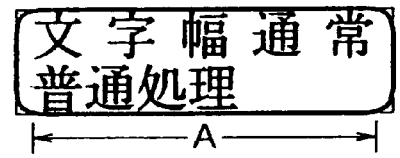
FIG. 28G  SUBSQUENT PROCESSING
LAYOUT PROCESSING
FRONT ALIGNMENT PROCESSING
CENTERING PROCESSING
REAR ALIGNMENT PROCESSING
(EXAMPLE) A=40
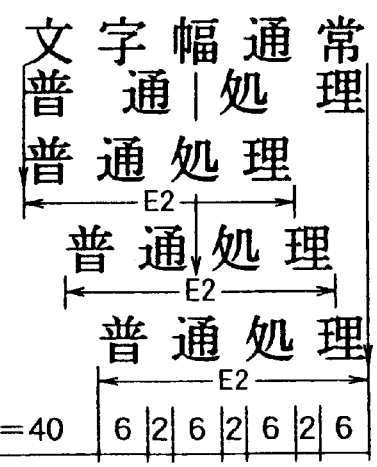

FIG. 30A
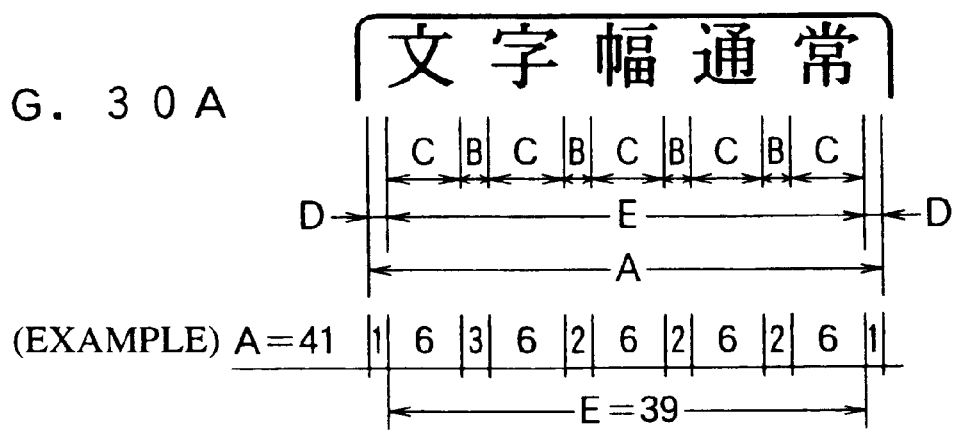
FIG. 30B
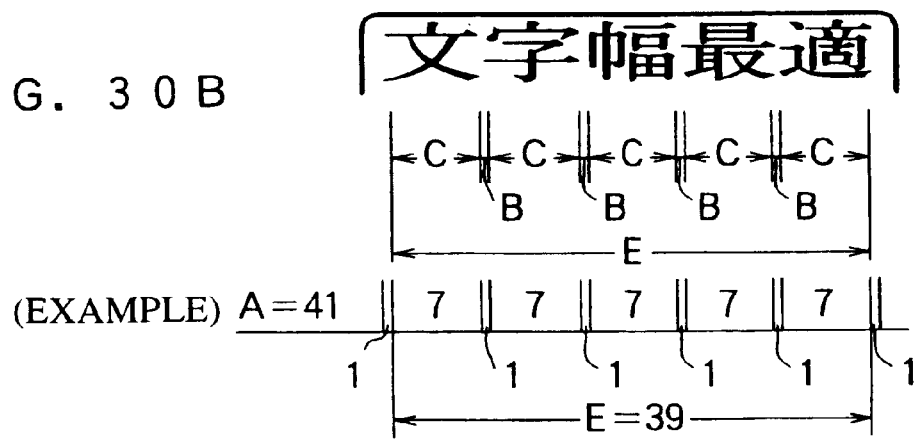
FIG. 30C
文字幅通常
普通処理
FIG. 30D
文字幅最適
拡大処理

FIG. 31A
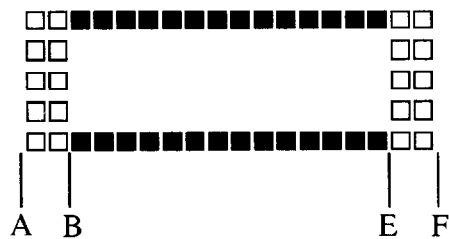
A B　　　　　　　　E F
FIG. 31B
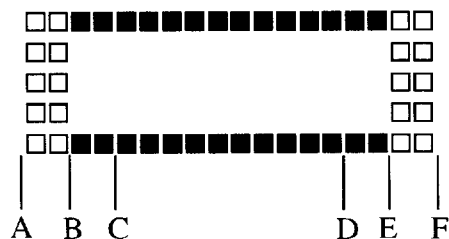
A B C　　　　　D E F
FIG. 31C
|  | TYPE A (IN DOTS) | | TYPE B (IN DOTS) | |
| --- | --- | --- | --- | --- |
|  | CHARACTER SIZE AB(=EF) | CHARACTER AREA BE | CHARACTER SIZE AB(=EF) | CHARACTER AREA BE |
| PERSONAL NAME STAMP | 6 | 224 | 16 | 204 |
| BUSINESS STAMP (SMALL) | 8 | 288 | 24 | 256 |
| BUSINESS STAMP (LARGE) | 12 | 320 | 32 | 280 |
| SQUARE STAMP (MIDDLE) | 4 | 120 | 12 | 104 |
| ADDRESS STAMP | 16 | 393 | 48 | 329 |

FIG. 32

| | ADDRESS/BUSINESS STAMP(LARGE) | BUSINESS STAMP(SMALL) | PERSONAL NAME STAMP | SQUARE STAMP |
|---|---|---|---|---|
| 1 | NO FRAME | SAME AS LEFT | SAME AS LEFT | SAME AS LEFT |
| 2 | ▭ | SAME AS LEFT | SAME AS LEFT | ▭ |
| 3 | ▭ | SAME AS LEFT | SAME AS LEFT | ▭ |
| 4 | ▭ | SAME AS LEFT | SAME AS LEFT | ▭ |
| 5 | ▭ | SAME AS LEFT | SAME AS LEFT | ▭ |
| 6 | ▭ | SAME AS LEFT | SAME AS LEFT | ▭ |
| 7 | ▭ | SAME AS LEFT | NO OPTION | ▭ |
| 8 | ▭ | SAME AS LEFT | NO OPTION | ▭ |
| 9 | ▭ | SAME AS LEFT | NO OPTION | ▭ |
| 10 | ▭ | SAME AS LEFT | NO OPTION | ▭ |
| 11 | ▭ | SAME AS LEFT | SAME AS LEFT | ▭ |
| 12 | NO OPTION | ▭ | SAME AS LEFT | ▭ |
| 13 | NO OPTION | ▭ | SAME AS LEFT | ▭ |
| 14 | [ ] | SAME AS LEFT | SAME AS LEFT | [ ] |
| 15 | ( ) | SAME AS LEFT | SAME AS LEFT | NO OPTION |
| 16 | ▭ | SAME AS LEFT | SAME AS LEFT | NO OPTION |
| 17 | ▭ | SAME AS LEFT | SAME AS LEFT | NO OPTION |
| 18 | ▭ | SAME AS LEFT | SAME AS LEFT | NO OPTION |
| 19 | ▭ | SAME AS LEFT | SAME AS LEFT | NO OPTION |
| 20 | ▭ | SAME AS LEFT | SAME AS LEFT | NO OPTION |

FIG. 33

| | ADDRESS/BUSINESS STAMP(LARGE) | BUSINESS STAMP(SMALL) | PERSONAL NAME STAMP | SQUARE STAMP |
|---|---|---|---|---|
| 21 | | SAME AS LEFT | SAME AS LEFT | NO OPTION |
| 22 | | SAME AS LEFT | SAME AS LEFT | NO OPTION |
| 23 | | SAME AS LEFT | SAME AS LEFT | NO OPTION |
| 24 | | SAME AS LEFT | SAME AS LEFT | NO OPTION |
| 25 | | SAME AS LEFT | SAME AS LEFT | NO OPTION |
| 26 | | SAME AS LEFT | SAME AS LEFT | NO OPTION |
| 27 | | SAME AS LEFT | SAME AS LEFT | NO OPTION |
| 28 | | SAME AS LEFT | SAME AS LEFT | NO OPTION |
| 29 | | SAME AS LEFT | SAME AS LEFT | NO OPTION |
| 30 | | SAME AS LEFT | SAME AS LEFT | NO OPTION |
| 31 | | SAME AS LEFT | SAME AS LEFT | NO OPTION |
| 32 | | SAME AS LEFT | SAME AS LEFT | NO OPTION |

FIG. 37A
FIG. 37B
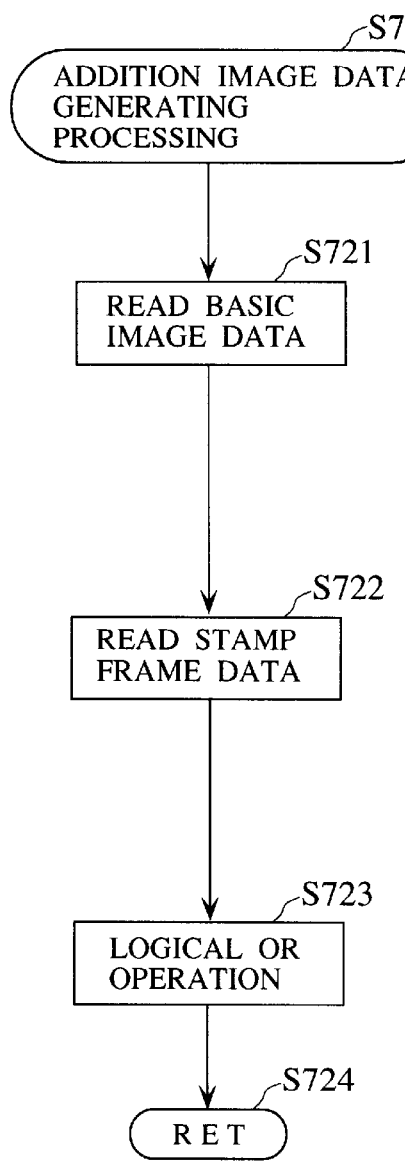
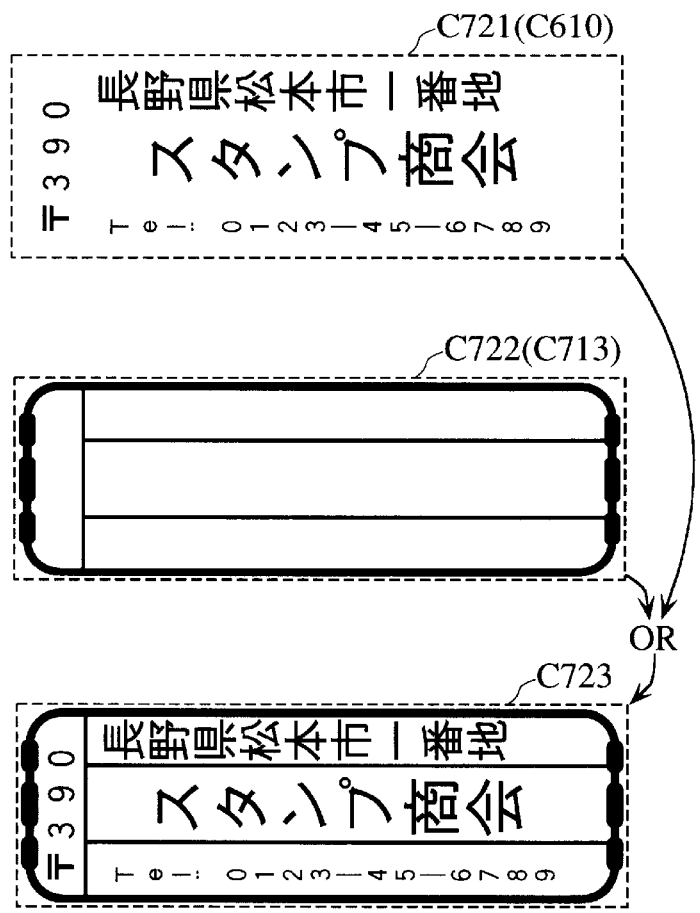

(EXAMPLE)

CHARACTER LAYOUT METHOD, IMAGE FORMING METHOD AND STAMP-MAKING METHOD AND APPARATUS THEREFOR

BACKGROUND OF THE INVENTION

1. Field of the Invention

The present invention relates generally to a method and apparatus for forming an image in a defined area for making a plate with a desired image fitted in a predetermined contour, for example, for a stamp surface of a stamp, a print surface of a label, and so on or for printing such an image. More particularly, the present invention is directed to a character layout method for allocating each of characters included in a character string within each of square contours having a predetermined width in a reading direction, an image forming method for inputting components of an image associated with each of a plurality of items, and a stamp-making method for forming a stamp image on a stamp-making area of a stamp body, i.e., an object of the stamp-making, by applying the two previous methods, as well as apparatuses for implementing these methods.

2. Description of the Related Art

First of all, conventional character layout methods for laying out characters on one or each of a plurality of lines, for example, those used in word processors, employ uniform layout in many cases. An example of uniform layout will be explained with reference to FIG. 43. For laying out, for example, a character string consisting of five characters "均等割付け" ("uniform layout" in English) over a layout area having a width A of 70 dots (number of dots A=70), the first and the last characters "均" and "け" are first positioned to front and rear ends of the layout area. Then, a character width C of ten dots (number of dots C=10) is subtracted from the width A of the layout area, and the difference (A−C=60) is divided by the remaining number of characters (5−1+4). The quotient (60/4=15 dots) is used as a width for one character and a spacing between adjacent characters (B+C), so that five dots (B=5) are allocated to the spacing B between characters. As a result, the character string is laid out as illustrated in FIG. 43.

Second, in a conventional image forming method for inputting a component for each of a plurality of items, if there is any item to which nothing is input, an area allocated to the item is left empty. Also, for inputting components, data is input one by one through manipulations on a keyboard.

Third, with respect to a plate-making method or a printing method for realizing a desired image, for example, a method implemented in a tape printing apparatus retrieves character/figure data stored in a memory (ROM) in the apparatus, generates image data on a character-by-character basis or on a line-by-line basis, and sequentially prints the image on a long plastic tape or the like in the form of a roll based on the generated image data.

The above-mentioned conventional methods have the following problems.

First, assuming that the foregoing character layout method is employed for laying out characters on a stamp or printing characters on a label, if a number of characters is too small for a given stamp surface area or print surface area, characters are laid out with an extremely wide spacing intervening therebetween so that the resulting stamp or label will appear to be lack of profoundness. Thus, a poor stamp or label with blank portions more prominent than characters will be produced (see FIGS. 25(*a*)).

Second, assuming that the foregoing image forming method is applied, for example, to the formation of an image for a stamp or an image for a label, if any of items comprising address, name, figure, and so on is not input, an area associated with the lacking item is left as a blank, resulting in an unbalanced layout of components of the image. In addition, the resulting stamp image or label image will be an unbalanced image with a low ratio of an area of the stamp image or label image to the entire stamp area or print surface area, i.e., a low black ratio. Further, since data must be input one by one for inputting components of an image, this method requires a time-consuming work, and rapid processing will not be expected.

Third, since the formation of a stamp image implies difficulties in aligning a plurality of items constituting the image, the foregoing printing apparatus or the like, which makes a plate on a character-by-character basis or on a line-by-line basis, is incapable of laying out respective items in a well balanced manner, adjusting the items for increasing the black ratio, or forming a complicated stamp image.

SUMMARY OF THE INVENTION

The present invention has been made in view of particular features of images for stamps and labels, and it is a first object to provide a character layout method which is capable of appropriately laying out stamp characters and characters for a label on a stamp surface or on a print surface.

It is a second object of the present invention to provide a character layout apparatus which is capable of appropriately laying out stamp characters and characters for a label on a stamp surface or on a print surface.

It is a third object of the present invention to provide an image forming method which is capable of laying out characters or the like within a limited area in a well balanced manner with easy image forming manipulations.

It is a fourth object of the present invention to provide an image forming apparatus which is capable of laying out characters or the like within a limited area in a well balanced manner with easy image forming manipulations.

It is a fifth object of the present invention to provide a stamp-making method which is capable of making a good-looking stamp image even having a complicated configuration.

It is a sixth object of the present invention to provide a stamp-making apparatus which is capable of making a good-looking stamp image even having a complicated configuration.

To achieve the first object, according to a first embodiment of the present invention, there is provided a character layout method for laying out each of characters included in each character string on one or a plurality of lines within a rectangular contour having a defined width in a reading direction, comprising the step of laying out the each character so as to satisfy B>D>0, where D is the dimension of a margin between an edge of the contour and a character at an end of the string, and B is the dimension of an inter-character spacing between adjacent characters.

To achieve the second object, according to a second embodiment of the present invention, there is provided a character layout apparatus for laying out each of characters included in each character string on one or a plurality of lines within a rectangular contour having a defined width in a reading direction, comprising character layout means for laying out the each character so as to satisfy B>D>0, where D is the dimension of a margin between an edge of the contour and a character at an end of the string, and B is the dimension of an inter-character spacing between adjacent characters.

According to the character layout method of the first embodiment and the character layout apparatus of the second embodiment of the present invention, the margins can be adjusted to appropriate dimensions, so that characters can be laid out in a well balanced manner without allowing the central spacing between the characters to be excessively wide even if there are a small number of characters to be laid out over a stamp surface of a stamp or over a print surface of a label.

Preferably, in the first embodiment, the margin dimension and the inter-character spacing dimension are adjusted in accordance with an area ratio of character portions to blank portions within the contour.

Preferably, in the second embodiment the character layout apparatus further includes margin and spacing adjusting means for adjusting the margin dimension and the inter-character spacing dimension in accordance with an area ratio of character portions to blank portions within the contour.

For example, if a large inter-character spacing is applied to a stamp image having a small area ratio of character portions to blank portions within a contour, the blank portions becomes more prominent and a central portion looks bare in the resulting stamp image. According to the above preferred embodiments, since the margins are adjusted to appropriate dimensions in accordance with the area ratio of the character portions to the blank portions, a well balanced layout of characters can be provided without allowing only the central spacing between the characters to be excessively wide or without giving a bare impression.

Preferably, in the first embodiment, each of the characters, the margin dimension, and the inter-character spacing dimension are allocated based on the number of dots on a dot matrix, and the inter-character spacing dimension B is defined by a quotient of a calculation $(A-C \times F)/F$, where A is the width of the contour, C is the character width of each of the characters, and F is the number of characters in the character string, and a number of dots corresponding to a residue of the calculation is allocated to the inter-character spacings from the first one in the direction of reading the characters.

Preferably, in the second embodiment, each of the characters, the margin dimension, and the inter-character spacing dimension are allocated based on the number of dots on a dot matrix, and the character layout means includes quotient dot number calculating means for calculating $(A-C \times F)/F$, where A is the width of the contour, C is the character width of each of the characters, and F is the number of characters in the character string, and for applying the quotient of the calculation to the inter-character spacing, and residue dot number allocating means for allocating a number of dots corresponding to a residue of the calculation to the inter-character spacings from the first one in the direction of reading the characters.

According to these preferred embodiments, stamp characters can be readily laid out over any plate-making available area, and moreover each character can be laid out without making the difference in inter-character spacing discernible.

To achieve the first object, according to a third embodiment of the present invention, there is provided a character layout method for laying out each of characters included in each character string on one or a plurality of lines within a rectangular contour having a defined width in a reading direction, comprising the steps of enlarging each of the characters in the horizontal direction such that an area ratio of character portions to blank portions within the contour is equal to or lower than a constant value, and laying out the enlarged characters.

To achieve the second embodiment, according to a fourth embodiment of the present invention, there is provided a character layout apparatus for laying out each of characters included in each character string on one or a plurality of lines within a rectangular contour having a defined width in a reading direction, comprising area ratio calculating means for calculating an area ratio of character portions to blank portions within the contour; and character enlarging and layout means for enlarging each of the characters in the horizontal direction and laying out the enlarged characters, when the area ratio is equal to or below a constant value, based on the calculation result of the area ratio calculating means.

According to the character layout method of the third embodiment and the character layout apparatus of the fourth embodiment of the present invention, blank portions in a stamp image can be reduced, and stamp characters be made profound without producing awkward font in the respective characters of the stamp image.

Preferably, in the third embodiment, the character portions and the blank portions are allocated based on the number of dot on a dot matrix, and the area ratio is calculated with the number of dots constituting the character portions and the number of dots constituting the blank portions.

Preferably, in the fourth embodiment, the character portions and the blank portions are allocated based on the number of dot on a dot matrix, and the area ratio calculating means calculates the area ratio from a ratio of the number of dots constituting the character portions and the number of dots constituting the blank portions.

According to these preferred embodiments, the area ratio of character portions to blank portions within a contour can be readily calculated, and respective characters can be appropriately enlarged in the horizontal direction based on the calculated ratio.

To achieve the first object, according to a fifth embodiment of the present invention, there is provided a character layout method for laying out each of characters included in each character string on each of a plurality of lines within a rectangular contour having a defined width in a reading direction of each of the lines, comprising the steps of selecting the line having the smallest quotient G of a calculation $(A-C \times F)/F$ from the plurality of line as the longest line, where A is the width of the contour, C is the character width of each of the characters, and F is the number of characters in the string, determining an inter-character spacing in the longest line as a reference inter-character spacing dimension B serving as a basis for determining an inter-character spacing between adjacent characters, and laying out characters on the longest line and the remaining line based on the reference inter-character spacing dimension B.

To achieve the second object, according to a sixth embodiment of the present invention, there is provided a character layout apparatus for laying out each of characters included in each character string on each of a plurality of lines within a rectangular contour having a defined width in a reading direction of each of the lines, comprising longest line determining means for determining the line having the smallest quotient G of a calculation $(A-C \times F)/F$ from the plurality of line as the longest line, where A is the width of the contour, C is the character width of each of the characters, and F is the number of characters in the string, reference inter-character spacing determining means for determining an inter-character spacing in the longest line as a reference inter-character spacing dimension B serving as a basis for determining an inter-character spacing between adjacent characters, longest line character layout means for laying out characters on the longest line based on the reference inter-character spacing dimension B, and remaining line character layout means for laying out characters on the remaining line based on the reference inter-character spacing dimension B.

According to the character layout method of the fifth embodiment and the character layout apparatus of the sixth embodiment of the present invention, since the longest line is determined based on the width of a rectangular contour in which characters are laid out, the line having the least spacings and margins can be readily calculated and the line be determined as the longest line. For example, there may be a case where although the number of characters in a string is small, decorations included in a certain portion of a frame reduces an actual character layout area, and a chase where characters provided with decorations such as shading, emphasis, italic, outline, reverse, and so on may cause a reduction in an actual area available for laying out characters. The present invention is applicable even to such cases. Stated another way, the selection of the longest line can be made more appropriately than the determination of the longest line simply from the number of characters. In addition, by utilizing the selected line as a basis for allocating spacings and margins, a well-balanced layout of characters can be accomplished for a stamp surface of a stamp having a plurality of lines of characters and for a print surface of a label having a plurality of lines of characters.

Preferably, in the fifth embodiment, the longest character is laid out such that the relationship between the reference inter-character space dimension B and the dimension D of a margin between an end of the contour and a character at the end of the string satisfies B>D>0.

Preferably, in the sixth embodiment, the reference inter-character spacing determining means determines the reference spacing dimension B and a reference margin dimension D such that the relationship between the reference inter-character space dimension B and the reference margin dimension D satisfies B>D>0, where the reference margin dimension D is the dimension of a margin between an end of the outline and a character at the end of the string; and the longest line character layout means lays out each of the characters on the longest line based on the reference inter-character spacing dimension B and such that the margin dimension is equal to the reference margin dimension D.

According to these preferred embodiments, margins of a character string on the longest line can be adjusted to appropriate dimensions, so that characters can be laid out in a well balanced manner without allowing the central spacing between the characters to be excessively wide even if there are a small number of characters to be laid out. In addition, by utilizing the selected line as a basis for allocating spacings and margins, an orderly and well-balanced layout of characters can be accomplished for a stamp surface of a stamp having a plurality of lines of characters and for a print surface of a label having a plurality of lines of characters.

Preferably, in the fifth embodiment, each of lines except for the longest line includes a character string having a character string dimension E=J×H+K×(H−1)+C×F+B×(F−1) equal to the dimension of a character string on the longest line, and characters in the character string are laid out so as to align one end of either one of a character at the front end and a character at the rear end of the character string with a corresponding end of a character at the one end of the character string on the longest line, where J is a character width, K is an inter-character spacing dimension, and H is the number of characters on the line.

Preferably, in the sixth embodiment, the remaining line character layout means includes layout character string generating means for generating a character string having a character string dimension E=J×H+K×(H−1)+C×F+B×(F−1) equal to the dimension of a character string on the longest line, where J is a character width, K is an inter-character spacing dimension, and H is the number of characters on the line, and uniform character string layout means for laying out characters in the character string so as to align one end of either one of a character at the front end and a character at the rear end of the character string with a corresponding end of a character at the one end of the character string on the longest line.

According to these preferred embodiments, the respective lines can be laid out such that all lines have the same character string length, i.e., the front ends and the rear ends of the respective lines are aligned with each other for a stamp surface or the like having a plurality of lines, whereby a stable and good-looking layout can be provided.

Preferably, in the fifth embodiment, each of lines except for the longest line includes a character string having a character string dimension E=C×H+B×(H−1) and an inter-character spacing dimension between adjacent characters equal to the reference inter-character spacing dimension B, where H is the number of characters in the character string and satisfies H≦F, and characters in the character string are laid out so as to align the front end of the first character in the character string with the front end of the first character in the character string on the longest line.

Preferably, in the sixth embodiment, the remaining line character layout means includes layout character string generating means for generating a character string having a character string dimension E=C×H+B×(H−1) and an inter-character spacing dimension between adjacent characters equal to the reference inter-character spacing dimension B, where H is the number of characters in the character string and satisfies H≦F, and front alignment character string layout means for laying out characters in the character string so as to align the front end of the first character in the character string with the front end of the first character in the character string on the longest line.

According to these preferred embodiments, it is possible to provide an orderly and good-looking layout, wherein the front ends of the respective lines are aligned with each other and inter-character spacings are equal on the respective lines, for a stamp image and a print surface having a plurality of lines.

Preferably, in the fifth embodiment, each of lines except for the longest line includes a character string having a character string dimension E=C×H+B×(H−1) and an inter-character spacing dimension between adjacent characters equal to the reference inter-character spacing dimension B, where H is the number of characters in the character string and satisfies H≦F, and characters in the character string are laid out so as to align the center position of the character string with the center position of the longest line.

Preferably, in the sixth embodiment, the remaining line character layout means includes layout character string generating means for a generating a character string having a character string dimension E=C×H+B×(H−1) and an inter-character spacing dimension between adjacent characters equal to the reference inter-character spacing dimension B, where H is the number of characters in the character string and satisfies H≦F, and centering character string layout means for laying out characters in the character string so as to align the center position of the character string with the center position of the longest line.

According to these preferred embodiments, it is possible to provide an orderly and good-looking layout, wherein the center position of the respective lines are aligned with each other, for a stamp image and so on having a plurality of lines.

Preferably, in the fifth embodiment, each of lines except for the longest line includes a character string having a character string dimension E=C×H+B×(H−1) and an inter-character spacing dimension between adjacent characters equal to the reference inter-character spacing dimension B, where H is the number of characters in the character string and satisfies H≦F, and characters in the character string are laid out so as to align the rear end of the last character in the character string with the rear end of the last character in the character string on the longest line.

Preferably, in the sixth embodiment, the remaining line character layout means includes layout character string generating means for generating a character string having a character string dimension E=C×H+B×(H−1) and an inter-character spacing dimension between adjacent characters equal to the reference inter-character spacing dimension B, where H is the number of characters in the character string and satisfies H≦F, and rear alignment character string layout means for laying out characters in the character string so as to align the rear end of the last character in the character string with the rear end of the last character in the character string on the longest line.

According to these preferred embodiments, it is possible to provide an orderly and good-looking layout, wherein the rear ends of the respective lines are aligned with each other and inter-character spacings are equal on the respective lines, for a stamp image and so on having a plurality of lines.

To achieve the third object, according to a seventh embodiment of the present invention, there is provided an image forming method for forming images for areas having a plurality of items for inputting components of the images and defined by inputting components corresponding to the respective items, the method comprising the steps of deleting an area for an item from the plurality of items when detecting no component is input for the item, extending areas for the remaining items by the deleted area, and enlarging dimensions of components input to the remaining items in accordance with the extended areas.

To achieve the fourth object, according to an eighth embodiment of the present invention, there is provided an image forming apparatus for forming images for areas having a plurality of items for inputting components of the images and defined by inputting components corresponding to the respective items, the apparatus comprising detecting means for detecting that there is an item within the plurality of items for which a component is not input, item area changing means for deleting an area for the item based on the detection result of the detecting means and extending areas for the remaining items by the deleted area, and component enlarging means for enlarging dimensions of components input to the remaining items and changing positions of the components in accordance with the extended areas.

According to the image forming method of the seventh embodiment and the image forming apparatus of the eighth embodiment of the present invention, as components associated with each item are input and no components are input for an unnecessary item, the unnecessary item is automatically deleted and other item areas are extended. Then, the components input in other item areas, i.e., characters representing address, name, telephone number, and so on and figures such as illustrations are enlarged so that an image with a high black ratio is produced. Consequently, the respective images in the defined areas are well balanced in the entire stamp image.

To achieve the third object, according to a ninth embodiment of the present invention, there is provided an image forming method for forming images for areas having a plurality of items for inputting components of the images and defined by inputting components corresponding to the respective items, the method comprising the steps of previously storing information for letting an operator know the contents of an item, input text data for generating image data as an output and/or text data having predetermined contents for each item, and retrieving the information and the data to input and modify components associated with the retrieved information and data to form an image.

To achieve the fourth object, according to the tenth embodiment of the present invention, there is provided an image forming apparatus for forming images for areas having a plurality of items for inputting components of the images and defined by inputting components corresponding to the respective items, comprising storing means for storing information for letting an operator know the contents of an item, input text data for generating image data as an output and/or text data having predetermined contents for each item, retrieving means for retrieving the input text data and/or the text data having predetermined contents for each item from the storing means, and input processing means for inputting and modifying components associated with the information, the input text data, and/or the text data for each item retrieved by the retrieving means from the storing means.

For example, if the contents of an item to be input can be known by retrieving it, the item can be readily input without referencing an operation manual or the like of the apparatus. Also, if input text data, for example, can be stored and retrieved, the text data can be retrieved and used as it is or with a modification partially added thereto, when it is used next time. In addition, if predetermined contents of text data, for example, text data having frequently used contents are stored in association with each item such that they can be retrieved and used at later time, they may be similarly used as they are or with a modification partially added thereto. Thus, according to the image forming method of the ninth embodiment and the image forming apparatus of the tenth embodiment of the present invention, it is possible to largely facilitate the input manipulation as well as to reduce a work time.

Preferably, in the tenth embodiment, the item area changing means includes storing means for storing enlarged dimensions of the areas for the remaining items, and retrieving means for retrieving the enlarged dimensions based on the detection result of the detecting means.

According to this preferred embodiment, when an area for an item without input is deleted, the dimensions of the remaining items can be readily determined only by retrieving the previously stored dimensions. Input characters, figures, and so on are appropriately scaled in accordance with the retrieved dimensions.

To achieve the fourth object, according to the eleventh embodiment of the present invention, there is provided an image forming apparatus for forming images for areas having a plurality of items for inputting components of the images and defined by inputting components corresponding to the respective items, the apparatus comprising adjusting means, operative when detecting an item within the plurality of items for which a component is not input, for deleting an area for the item, extending areas for the remaining items by the deleted area, and enlarging dimensions of components input to the remaining items in accordance with the extended areas, and switching means for switching whether or not processing by the adjusting means is performed.

According to the image forming apparatus of the eleventh embodiment of the present invention, some items may be intentionally left blank such that something can be input thereto at later time.

To achieve the fifth object, according to a twelfth embodiment of the present invention, there is provided a stamp-making method for making a plate having a stamp image for a stamp-making area of a stamp body based on stamp image data, comprising an entire image data generating step of generating entire image data corresponding to an entire plate-making region of the stamp image, an entire image data storing step of storing the entire image data, and a stamp image data outputting step of reading the entire image data and thereafter outputting the entire image data as the stamp image data.

To achieve the sixth object, according to a thirteenth embodiment of the present invention, there is provided a plate-making apparatus for making a plate having a stamp image for a stamp-making area of a stamp body based on stamp image data, comprising entire image data generating means for generating entire image data corresponding to an entire plate-making region of the stamp image, entire image data storing means for storing the entire image data, and stamp image data outputting means for reading the entire image data and thereafter outputting the entire image data as the stamp image data.

According to the stamp-making method of the twelfth embodiment and the stamp-making apparatus of the thirteenth embodiment of the present invention, a plate is made after generating stamp image data corresponding to an entire plate-making region of a stamp image, respective image segments can be positioned in a well balanced manner in the stamp image, the image segments be adjusted to increase the black ratio, and a complicated stamp image be formed. In addition, collective printing processing can be carried out when the stamp image data is retrieved to make a stamp, thereby rendering it possible to realize not only high speed processing but also plate-making at a constant speed.

Preferably, in the twelfth embodiment, the entire image data generating step includes a basic image data generating step of generating basic image data in which image data representative of an input image is positioned, a stamp frame data generating step of generating stamp frame data corresponding to an image of a stamp frame, and a frame outside data deleting step of superimposing the stamp frame data on the basic image data and for deleting a portion of the basic image data overflowing from the stamp frame to generate the entire image data.

Preferably, in the thirteenth embodiment, the entire image data generating means includes basic image data generating means for generating basic image data in which image data representative of an input image is positioned, stamp frame data generating means for generating stamp frame data corresponding to an image of a stamp frame, sum image data generating means for superimposing the stamp frame data on the basic image data to generate sum image data, and frame outside data deleting means for deleting a portion of the sum image data overflowing from the stamp frame to generate the entire image data.

According to these preferred embodiments, by generating the stamp image data including a stamp frame, respective image segments can be positioned in a well balanced manner, and the sizes of the respective image segments can be enlarged to the very limit of the stamp frame. In addition, various techniques such as the deletion of a portion from a large image to accommodate the image within a frame and so on makes it possible to make a good-looking stamp image having a high black ratio and readily discernible character(s) and/or figure(s).

Preferably, in the thirteenth embodiment, the sum image data generating means includes logical OR data operating means for taking a logical OR of mutually corresponding dots of relief image data having the input image of the basic image data represented in the form of positive dots corresponding to protrusions and blank portions of the image represented in the form of negative dots corresponding to recesses, and relief frame data having the image of the stamp frame of the stamp frame data in the form of positive dots and portions inside and outside of the stamp frame in the form of negative dots.

According to this preferred embodiment, the logical OR operation enables a framed stamp image and hence a stamp having a framed stamp image to be readily made.

Further preferably, in the thirteenth embodiment, the frame outside data deleting means includes a logical AND data operating means for taking a logical AND of mutually corresponding dots of relief sum image data having the input image of the sum image data and the image of the stamp frame represented in the form of positive dots and other blank portions represented in the form of negative dots, and stamp frame outline data having the stamp frame of the stamp frame data and a portion inside thereof represented in the form of positive dots and a portion outside of the stamp frame represented in the form of negative dots.

According to this preferred embodiment, the logical AND operation enables a stamp image to be readily made without a desired image overflowing from a frame.

Preferably, according to the twelfth embodiment, the entire image data generating step includes a basic image data generating step of generating basic image data in which image data representative of an input image is positioned, a stamp frame data generating step of generating stamp frame data corresponding to an image of a stamp frame, an outside deleted image data generating step of determining whether or not the image of the basic image data overflows outside of the stamp frame, and deleting an overflowing portion from the basic image data, when the image overflows outside of the stamp frame, to generate outside deleted image data, and an image data adding step of superimposing the stamp frame data on the outside deleted image data, when the image of the basic image data overflows outside of the stamp frame, to generate the entire image data, and superimposing the stamp frame data on the basic image data, when the image does not overflow outside of the stamp frame, to generate the entire image data.

Preferably, in the thirteenth embodiment, the entire image data generating means includes basic image data generating means for generating basic image data in which image data representative of an input image is positioned, stamp frame data generating means for generating stamp frame data corresponding to an image of a stamp frame, outside overflow determining means for determining whether or not the image of the basic image data overflows outside of the stamp frame, outside deleted image data generating means for deleting an overflowing portion from the basic image data, when the image of the basic image data overflows outside of the stamp frame, to generate outside deleted image data, and image data adding means for superimposing the stamp frame data on the outside deleted image data, when the basic image data overflows outside of the stamp frame, to generate the entire image data, and for superimposing the stamp frame data on the basic image data, when the basic image data does not overflow outside of the stamp frame, to generate the entire image data.

According to the stamp-making method of the twelfth embodiment and the stamp-making apparatus of the thirteenth embodiment of the present invention, an image portion overflowing from a stamp frame is deleted after the sum image data is generated. Alternatively, the entire image data representative of a framed stamp image may be generated when an overflowing image portion is previously deleted from the basic image data and the stamp frame data is superimposed on the deleted basic image data so as to prevent the overflowing from the stamp frame. Therefore, according to this preferred embodiment, it is first determined whether or not an image of the basic image data overflows outside of the stamp frame, and outside deleted image data excluding an overflowing portion is created, when the image overflows, to superimpose the stamp frame data on the outside deleted image data while the stamp frame data is superimposed on the basic image data, when the image does not overflow, to generate the entire image data. In this way, similar effects to described above can be produced. Specifically, it is possible to readily generate a framed stamp image without a desired image overflowing from a frame, to make a good-looking stamp image having a high black ratio and readily discernible character(s) and/or figure(s), and so on.

Further preferably, in the thirteenth embodiment, the image data adding means includes logical OR data operating means for generating the entire image data by a logical OR operation, wherein the logical OR data operating means is operative, when the image of the basic image data overflows outside of the stamp frame, to take a logical OR of mutually corresponding dots of relief outside deleted image data having an image excluding the overflowing portion of the outside deleted image data represented in the form of positive dots corresponding to protrusions and blank portions of the image represented in the form of negative dots corresponding to recesses, and relief frame data having the image of the stamp frame of the stamp frame data represented in the form of positive dots and portions inside and outside of the stamp frame in the form of negative dots, and the logical OR data operating means is further operative, when the image of the basic image data does not overflow outside of the stamp frame, to take a logical OR of mutually corresponding dots of relief basic image data having the image of the basic image data represented in the form of positive dots corresponding to protrusions and blank portions of the image represented in the form of negative dots corresponding to recesses and the relief frame data.

According to this preferred embodiment, a logical OR of the outside deleted image data and the stamp frame data is taken when the image of the basic image data overflows outside of the stamp frame, while a logical OR of the basic image data and the stamp frame data is taken when the image does not overflow, thereby making it possible to readily generate a framed stamp image and hence to readily make a stamp having a framed stamp image, in a manner similar to the preferred stamp-making apparatus, described second, of the thirteenth embodiment.

Further preferably, in the thirteenth embodiment, the outside deleted image data generating means includes logical AND data operating means, operative when the image of the basic image data overflows outside of the stamp frame, for taking a logical AND of mutually corresponding dots of relief basic image data having the image of the basic image data represented in the form of positive dots and other blank portions represented in the form of negative dots, and stamp frame outline data having the stamp frame and a portion inside thereof of the stamp frame data represented in the form of positive dots and a portion outside of the stamp frame represented in the form of negative dots.

According to this preferred embodiment, when the image of the basic image data overflows outside of the stamp frame, a logical AND of the basic image data and the stamp frame outline data is taken to previously delete an overflowing image portion from the basic image data to prevent the image from overflowing, and the stamp frame data is superimposed on the deleted basic image data to generate the entire image data, thereby making it possible to readily generate a stamp image without a desired image overflowing from the frame.

Further preferably, in the twelfth embodiment, the entire image data generating step further includes a ruled line data storing step of storing plural kinds of ruled line data as line element parts for images, and the stamp frame data generating step retrieves specified ones of the ruled line data and combining the retrieved ruled line data to generate the stamp frame data.

Further preferably, in the thirteenth embodiment, the entire image data generating means further includes ruled line data storing means for storing plural kinds of ruled line data as line element parts for images; and the stamp frame data generating means retrieves specified ones of the ruled line data and combines the retrieved ruled line data to generate the stamp frame data.

According to these further preferred embodiments, since the ruled lines for forming stamp frames are stored as line element parts not as entire frames, the user may retrieve various required ruled line data and freely connect the retrieved ruled line data to create a variety of frames.

Further preferably, in the twelfth embodiment, the stamp frame data generating step generates stamp frame data adapted to a dimension of each stamp-making area corresponding to the type of the stamp body for which a plate is made.

Further preferably, in the thirteenth embodiment, the stamp frame data generating means generates stamp frame data adapted to the dimension of each stamp-making area corresponding to the type of the stamp body for which a plate is made.

According to these further preferred embodiments, since stamp frame data adapted to the dimension of each stamp-making area is generated corresponding to the type of a stamp body for which a plate is made, a variety of stamps can be made in accordance with the type of each stamp body, for example, features of a square stamp, a circular stamp, a vertically elongated stamp, a horizontally elongated stamp, and so on.

Preferably, in the twelfth embodiment, the entire image data generating step includes a ruled line data storing step of storing plural kinds of ruled line data as line element parts for images in a storing unit, a basic image data generating step of generating basic image data in which image data representative of an input image is positioned, and a stamp frame data adding step of retrieving ruled line data constituting stamp frame data corresponding to an image of a stamp frame from the storing unit and positioning the retrieved ruled line data on the basic image data to add the stamp frame data to the basic image data, thus generating the entire image data.

Preferably, in the thirteenth embodiment, the entire image data generating means includes ruled line data storing means for storing plural kinds of ruled line data as line element parts for images, basic image data generating means for generating basic image data in which image data representative of an input image is positioned, and stamp frame data adding means for retrieving ruled line data constituting stamp frame data corresponding to an image of a stamp frame from the storing means and positioning the retrieved ruled line data on the basic image data to add the stamp frame data to the basic image data, thus generating the entire image data.

In the twelfth and thirteenth embodiments and preferred embodiments thereof, the stamp frame data is generated and thereafter it is superimposed on the basic image data or the outside deleted imaged data. Alternatively, ruled line data for a stamp frame may be directly superimposing on the basic image data or the outside deleted image data, as it is generated, to consequently generate the entire image data having the additional stamp frame data. Therefore, in this preferred embodiment, ruled line data constituting the stamp frame data corresponding to an image of a stamp frame may be positioned on the basic image data to add the stamp frame data to the basic image data to generate the entire image data, thereby rendering it possible to readily generate a framed stamp image and hence a stamp having a framed stamp image in a manner similar to the aforementioned stamp-making methods and apparatuses.

Preferably, in the twelfth embodiment, the entire image data generating step includes a ruled line data storing step of storing plural kinds of ruled line data as line element parts for images in a storing unit, a basic image data generating step of generating basic image data in which image data representative of an input image is positioned, an outside deleted image data generating step of determining whether or not the image of the basic image data overflows outside of the stamp frame, and deleting an overflowing portion from the basic image data, when the image overflows outside of the stamp frame, to generate outside deleted image data, and a stamp frame data adding step, wherein the stamp frame data adding step retrieves ruled line data constituting stamp frame data corresponding to an image of a stamp frame from the storing unit and positioning the retrieved ruled line data on the outside deleted image data to add the stamp frame data to the outside deleted image data, thus generating the entire image data, when the image of the basic image data overflows outside of the stamp frame, and retrieves ruled line data constituting stamp frame data corresponding to an image of a stamp frame from the storing unit and positioning the retrieved ruled line data on the basic image data to add the stamp frame data to the basic image data, thus generating the entire image data, when the image of the basic image data does not overflow outside of the stamp frame.

Preferably, in the thirteenth embodiment, the entire image data generating means includes ruled line data storing means for storing plural kinds of ruled line data as line element parts for images, basic image data generating means for generating basic image data in which image data representative of an input image is positioned, outside deleted image data generating means for determining whether or not the image of the basic image data overflows outside of the stamp frame, and for deleting an overflowing portion from the basic image data, when the image overflows outside of the stamp frame, to generate outside deleted image data, and stamp frame data adding means, wherein the stamp frame data adding means retrieves ruled line data constituting stamp frame data corresponding to an image of a stamp frame from the storing means and positioning the retrieved ruled line data on the outside deleted image data to add the stamp frame data to the outside deleted image data, thus generating the entire image data, when the image of the basic image data overflows outside of the stamp frame, and retrieves ruled line data constituting stamp frame data corresponding to an image of a stamp frame from the storing means and positioning the retrieved ruled line data on the basic image data to add the stamp frame data to the basic image data, thus generating the entire image data, when the image of the basic image data does not overflow outside of the stamp frame.

According to these preferred embodiments, it is determined whether or not the image of the basic image data overflows outside the stamp image, and, when it overflows, the overflowing portion is deleted from the basic image data to generate outside deleted image data. Then, the ruled line data is positioned on the basic image data or the outside deleted image data to add stamp frame data to generate the entire image data. It is therefore possible to produce similar effects to the above, i.e., to readily generate a framed stamp image without a desired image overflowing from a frame, to make a good-looking stamp image having a high black ratio and readily discernible character(s) or figure(s).

Further preferably, according to the thirteenth embodiment, the outside deleted image data generating means includes logical AND data operating means, operative when the image of the basic image data overflows outside of the stamp frame, for taking a logical AND of mutually corresponding dots of relief basic image data having the image of the basic image data represented in the form of positive dots and other blank portions represented in the form of negative dots, and stamp frame outline data having the stamp frame and a portion inside thereof of the stamp frame data represented in the form of positive dots and a portion outside of the stamp frame represented in the form of negative dots.

According to this further preferred embodiment, when the image of the basic image data overflows outside of the stamp frame, a logical AND of the basic image data and the stamp frame outline data is taken to previously delete an image portion from the basic image data to prevent the overflowing from the stamp frame. The stamp frame data may be superimposed on the deleted basic image data to readily generate a stamp image without a desired image overflowing from a frame.

Further preferably, in the twelfth embodiment, the stamp frame data generating means generates stamp frame data adapted to the dimension of each stamp-making area corresponding to the type of the stamp body for which a plate is made.

Further preferably, in the thirteenth embodiment, the stamp frame data generating means generates stamp frame data adapted to the dimension of each stamp-making area corresponding to the type of the stamp body for which a plate is made.

According to these further preferred embodiments, since stamp frame data adapted to the dimension of each stamp-making area is generated corresponding to the type of a stamp body for which a plate is made, a variety of stamps can be made in accordance with the type of each stamp body, for example, features of a square stamp, a circular stamp, a vertically elongated stamp, a horizontally elongated stamp, and so on.

The above and other objects, features, and advantages of the present invention will become more apparent from the following detailed description of the preferred embodiment taken in conjunction with the accompanying drawings.

BRIEF DESCRIPTION OF THE DRAWINGS

FIG. 8A is a diagram illustrating a pattern for discriminating a stamp body of a smaller square stamp;

FIG. 8B is a diagram illustrating a pattern for discriminating a stamp body of a larger square stamp;

FIG. 8C is a diagram illustrating a pattern for discriminating a stamp body of a personal name stamp;

FIG. 8D is a diagram illustrating a pattern for discriminating a stamp body of a smaller business stamp;

FIG. 8E is a diagram illustrating a pattern for discriminating a stamp body of a larger business stamp;

FIG. 8F is a diagram illustrating a pattern for discriminating a stamp body of an address stamp;

FIG. 8G is a diagram illustrating a pattern for discriminating a maximum size stamp body;

FIG. 12 is a conceptual representation of an outline of multitasking executed in the stamp-making apparatus;

FIG. 15 is a hierarchical operation diagram of task-monitoring/switching processing executed in the stamp-making apparatus;

FIGS. 21A to 21D shows a stamp image for a personal name stamp and examples of input items for specifying a form;

FIG. 22A shows a stamp image for a small business stamp and examples of input items for specifying a form;

FIG. 22B shows a stamp image for a large business stamp and examples of input items for specifying a form;

FIG. 22C and FIG. 22D show stamp images for a square stamp and examples of input items for specifying a form;

FIGS. 23A to 23D are diagrams illustrating stamp images for an address stamp for showing specific examples of processing executed when data is not input for any item;

FIGS. 28A to 28G are diagrams illustrating examples of the positional relationship of a sequence of image data in the stamp-making apparatus with respect to a stamp-making image area, stamp frame data, a stamp image data area, text data, basic image data, the positions of laid out characters, and so on.

FIGS. 29A to 29D illustrate examples of stamp images after characters have been laid out;

FIGS. 30A to 30D illustrate a layout method when character width optimal enlarging processing is executed;

FIGS. 31A–31C are diagrams for showing the relationship in dimension between a character layout area and types of stamp bodies;

FIG. 32 illustrates exemplary stamp frames for each type of stamp body available in the stamp-making apparatus;

FIG. 33 illustrates further exemplary stamp frames similarly to FIG. 32;

FIG. 37A is a flow chart illustrating a procedure of steps executed for sum image data generating processing in FIG. 34;

FIG. 37B illustrates examples of image data corresponding to steps in the flow chart of FIG. 37A;

DESCRIPTION OF THE PREFERRED EMBODIMENTS

The present invention will hereinafter be described with reference to the accompanying drawings.

Figure 1A:
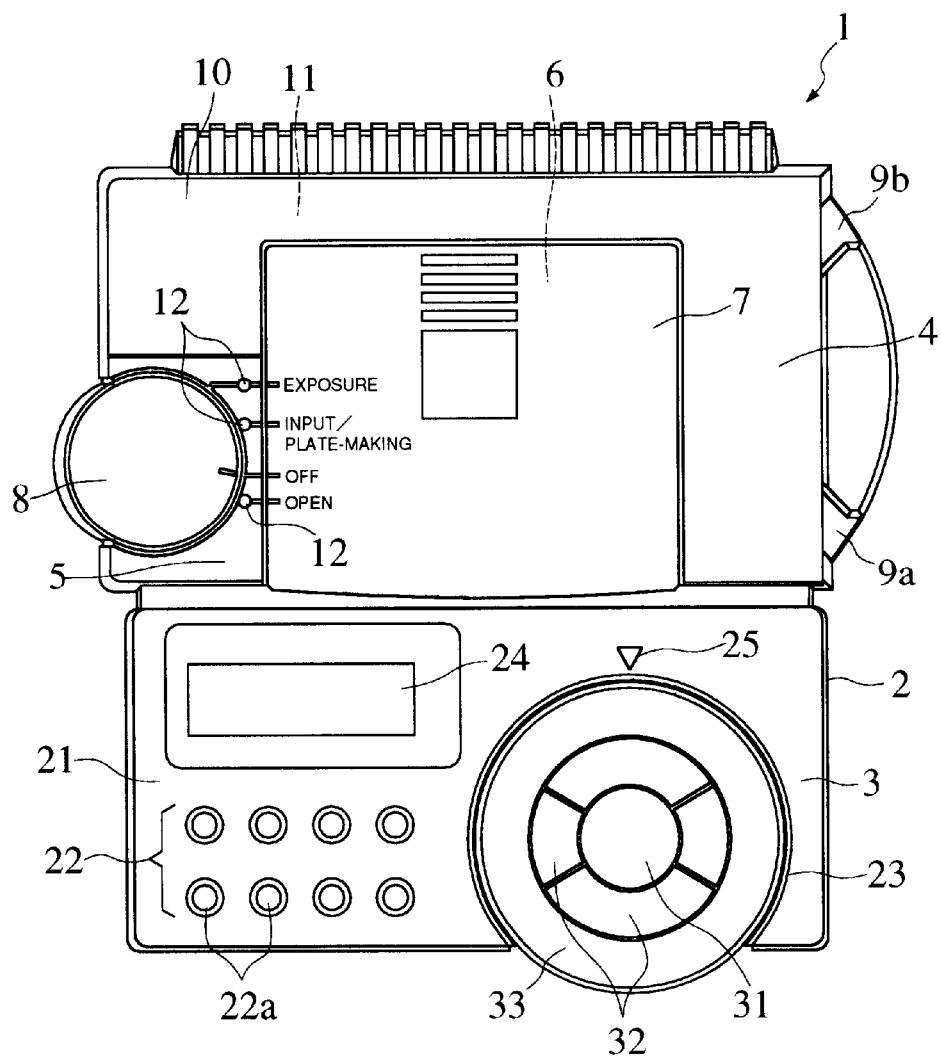
FIG. 1A is a plan view illustrating an appearance of a stamp-making apparatus according to an embodiment of the invention.
Figure 1B:
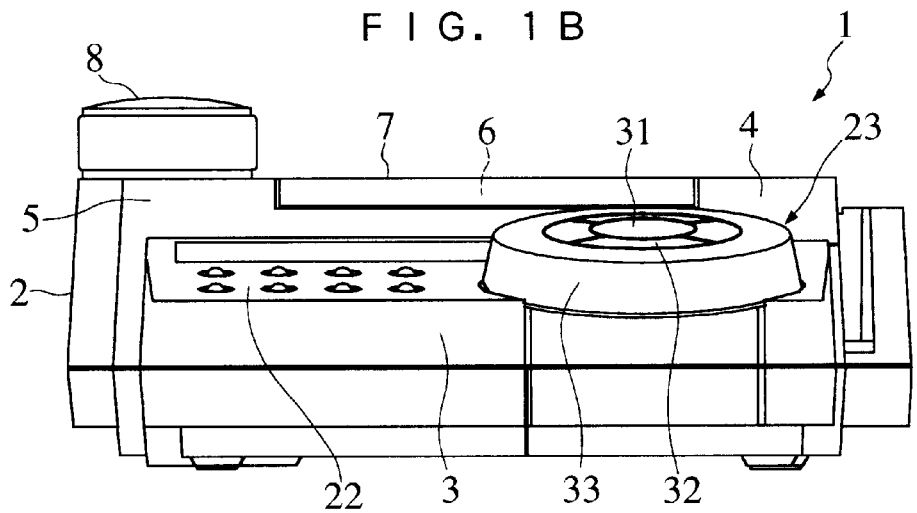
FIG. 1B is a front view illustrating an appearance of the stamp-making apparatus.
Figure 11:
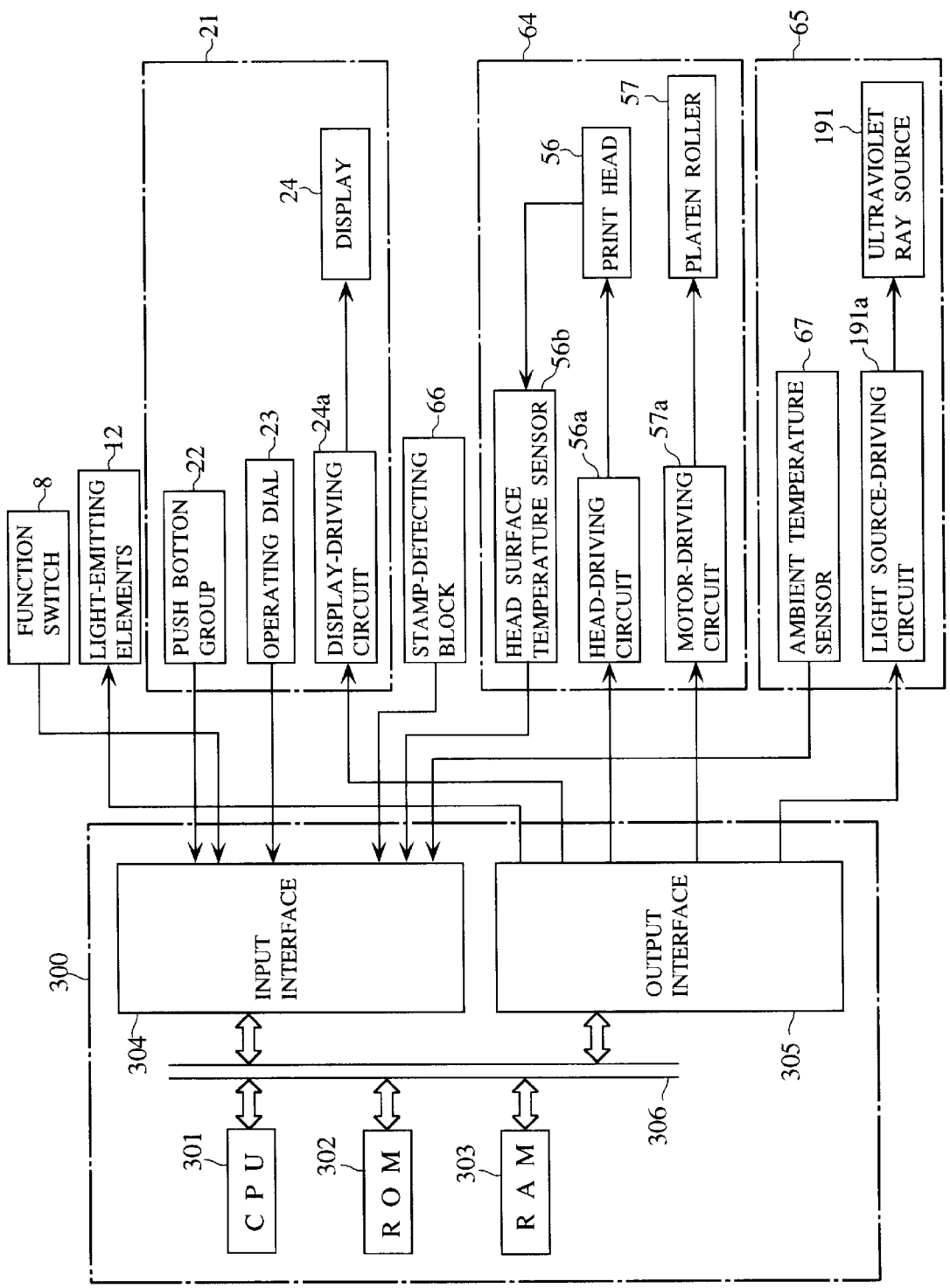
FIG. 11 is a block diagram of a control block and devices connected thereto of the stamp-making apparatus.

FIGS. 1A and 1B illustrate a stamp-making apparatus 1 to which are applied the stamp image forming method and apparatus according to embodiments of the present invention. The stamp-making apparatus makes a desired stamp by exposing a stamp body having a stamp surface formed of an ultraviolet curing resin to ultraviolet rays via a mask made of an ink ribbon on which stamp characters (images to be stamped including a pictorial pattern) are printed. The stamp image forming method and apparatus are directed to generate stamp image data which serves as information for fabricating such a mask on the ink ribbon. FIGS. 1A and 1B illustrate the stamp-making apparatus in a plan view and in a front view, respectively. FIG. 11 is a block diagram illustrating a control system of the apparatus.

As illustrated in FIGS. 1A and 1B, the stamp-making apparatus 1 includes a casing 2 having upper and lower divisional portions, an electronic block 3 arranged in a front part of the casing 2, and a mechanical block 4 arranged in a rear part of the same. The mechanical block 4 is comprised of a mechanical block body 5, a pocket 6 formed in a central area of the mechanical block for receiving therein a stamp body A as a stamp-making object material to mount the stamp body A in the mechanical block body 5, and a lid 7 for opening and closing the pocket 6, which is formed with a window. In a left side portion of the mechanical block 4 as viewed in the figures, a function switch 8 is provided for switching the operation of the stamp-making apparatus 1 between plate-making (printing) and exposure, as well as for permitting the lid 7 to be opened. Information of each switching operation of the function switch 9 is sent to an input interface 304 of a control block 300, later described, while indications of "EXPOSURE", "INPUT/PLATE-MAKING", "OFF" and "OPEN" are provided at respective operating positions. At the operating positions of "EXPOSURE", "INPUT/PLATE-MAKING", and "OPEN", there are provided respective light-emitting elements 12 connected to an output interface 305 of the control block 300. Further, in a right side portion of the mechanical block 4, there are formed an inserting slot 9a for feeding a plate-making sheet B from which is made a stamp character label, later described, and a take-out slot 9b for delivering the plate-making sheet B therefrom. Further, the mechanical block 4 has a maintenance cover 10 removably mounted on part thereof outside the pocket 6, and an ink ribbon cartridge 11 carrying an ink ribbon C is mounted under the maintenance cover 10.

The electronic block 3 has an operating block 21 formed on the top thereof and contains the control block 300 therein. The operating block 21 includes a push button group 22 and an operating dial 23 both connected to the input interface 304 of the control block 300, and an indicator-driving circuit (see FIG. 11) connected to the output interface 305 of the control block 300 and an indicator 24 driven by the indicator-driving circuit 24a. The operating dial 23 has a triad structure including an execution key 31 having a circular shape and arranged in the center, a cursor/conversion key 32 having four divisional blocks arranged along the outer periphery of the execution key 31 to form an annular shape, and a character input key 33 having an annular shape and arranged along the outer periphery of the cursor/conversion key 32. on the surface of the character input key 33, hirakana characters representative of the Japanese syllabary, not shown, etc. are printed. Stamp characters are input by first determining a character size by pushing a predetermined button 22a of the push button group 22, turning the character input key 33 to set each of desired hirakana characters to a triangle mark 25, and pushing the execution key 31 whenever each of the desired hirakana characters is set to the triangle mark 25, followed by converting desired ones of the input hirakana characters to kanji characters by operating the cursor/conversion key 32. When desired stamp characters are formed on the display 24, they are settled.

Figure 2:
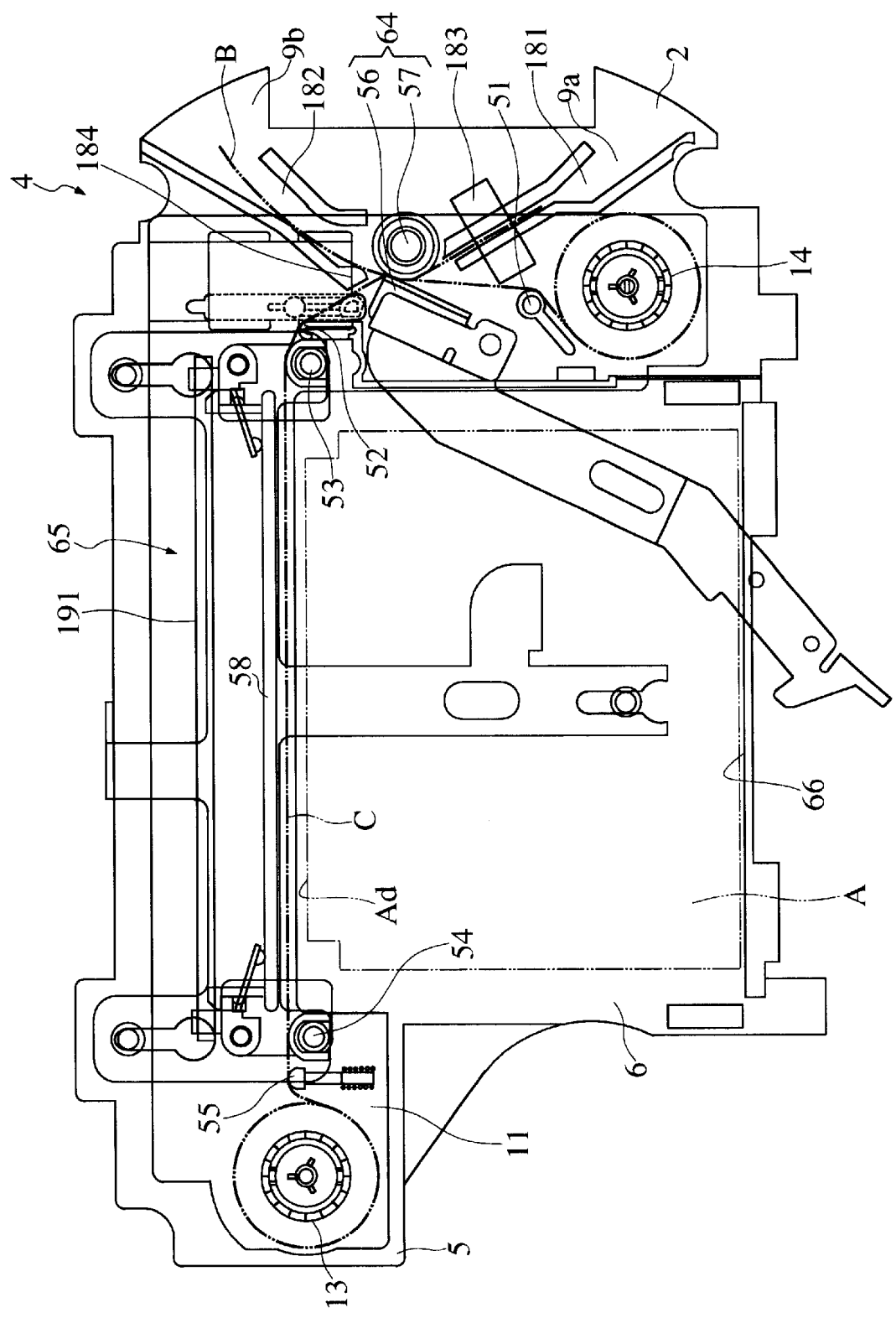
FIG. 2 is a plan view of an internal construction of a mechanical block of the stamp-making apparatus.

Now, a sequence of operations for making a stamp will be briefly described with reference to FIGS. 1A and 1B, and 2. First, the function switch 8 is rotated from "OFF" position as a standby position to "OPEN" position to open the lid 7, and a stamp body A is set in the pocket 6. As the stamp body A is set, the type of the stamp body A is detected by a stamp-detecting block 66 connected to the input interface 304 of the control block 300.

Then, the function switch 8 is rotated to "INPUT/PLATE-MAKING POSITION" to switch the function of the apparatus to plate-making, and the push button group 22 and the operating dial 23 are operated to input stamp characters. When the inputting of stamp characters is completed, the plate-making sheet B on which a stamp character label is provided is set by inserting the same into the inserting slot 9a.

Then, a predetermined button 22a of the push button group 22 is operated to cause the apparatus to execute the plate-making operation, i.e. printing of the stamp characters. The printing is effected simultaneously on the ink ribbon C and the plate-making sheet B. When the printing is completed, the ink ribbon (printed portion thereof) C is fed or advanced to set the same for exposure to ultraviolet rays, and at the same time plate-making sheet B is discharged from the take-out slot 9b. When it is confirmed by the plate-making sheet B discharged that there is no error in the printed stamp characters, the function switch 8 is rotated to the "EXPOSURE" position to switch the function of the apparatus to exposure, thereby causing an exposure block 65, later described, to expose the stamp body to ultraviolet rays.

When the exposure to ultraviolet rays is completed, the function switch 8 is rotated to the "OPEN" position to open the lid 7, and then the stamp body A is removed from the pocket 6 to wash the same. The washing completes the stamp. Before or after completion of the stamp, the stamp character label is peeled off the plate-making sheet B and attached on the back of the stamp.

Next, out of the components and elements of the stamp-making apparatus 1, those associated with the control block 300, described in detail hereinafter, will be described with reference to FIGS. 2 to 11, one by one.

The ribbon cartridge 11 is constructed such that it is removable from the mechanical block body 5, and the entire ribbon cartridge 11 may be replaced when the ink ribbon C is used up. As illustrated in FIG. 2, the ribbon cartridge 11 has a take-up reel 13 arranged at one end thereof and a supply reel 14 arranged at the other end thereof. The ink ribbon C is unrolled from the supply reel 14, fed along a feed path in the form of a rotation of an inverted-L shape as viewed in FIG. 2, and taken up by the take-up reel 13. The feed path in the form of a rotation of an inverted-L shape has a shorter side portion which a printing block 64, later described, faces and a longer side portion which the exposure block 65, later described, faces. The printing block 64 faces the ink ribbon C and the plate-making sheet B simultaneously, and the exposure block 65 faces the ink ribbon C printed with the image of the stamp characters.

The ink ribbon C is comprised of a transparent ribbon tape and ink coated thereon. In the present embodiment, it has a thickness of 6 $\mu$m. When the printing block 64 of the apparatus carries out printing on the ink ribbon C, a portion of ink coated on the ink ribbon, which defines a character, is transferred to the plate-making sheet B, whereby the ribbon tape of the ink ribbon C is formed with a negative image by a transparent portion from which the portion of ink defining the character has been transferred, while the plate-making sheet B is formed with a positive image by the transferred portion of ink defining the character. The ink ribbon C is sent forward to the exposure block 65 to use the resulting negative image-formed portion thereof as a mask in carrying out the exposure, while the plate-making sheet B is delivered from the apparatus for confirmation of the stamp characters and affixing the same to the stamp thus made.

Figure 4:
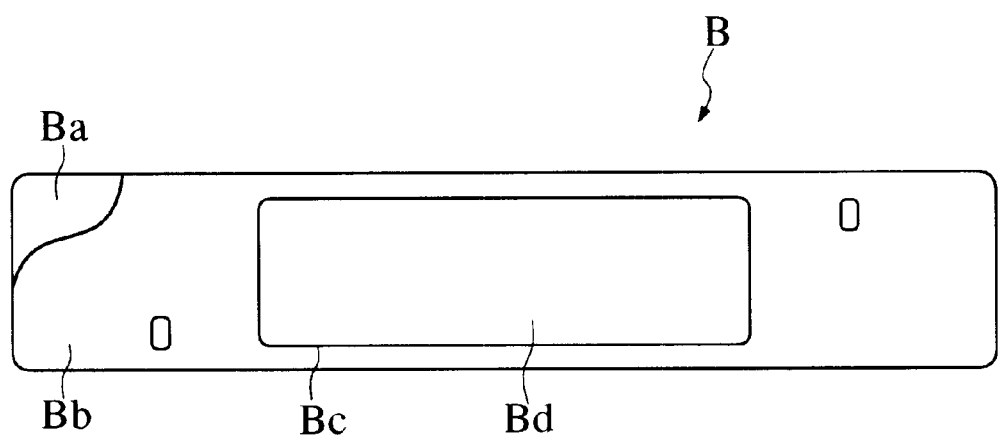
FIG. 4 is a view illustrating the structure of a plate-making sheet.

As illustrated in FIG. 4, the plate-making sheet B is a laminate of a base sheet Ba and an adhesive sheet Bb, generally in the form of a strip. The adhesive sheet Bb is formed with cutting lines Bc defining a rectangular area. The rectangular area of the adhesive sheet Bb is peeled off the base sheet Ba along the cutting lines Bc to form the stamp character label Bd to be affixed to the back of the stamp. There are provided several types of the stamp body A which are different in shape from each other according to the use of stamps, and there are also provided respective corresponding types of the plate-making sheet which are different in the shape of an area of the stamp character label Bd (shape and size of an area defined by cutting lines).

Figure 3:
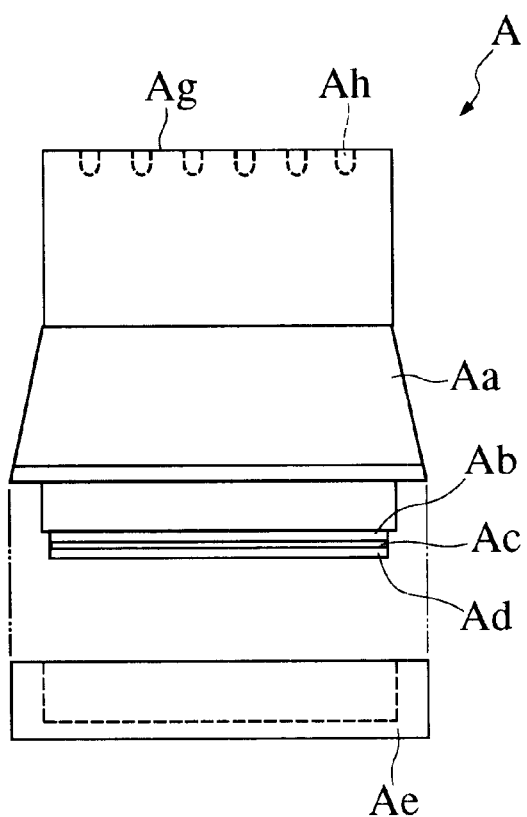
FIG. 3 is a view illustrating the structure of a stamp body.

On the other hand, as illustrated in FIG. 3, the stamp body A is comprised of a stock Aa (formed of a resin in the present embodiment), a thin sponge Ab (foamed urethane) affixed to a front end of the stock Aa, an ultraviolet-insensitive resin base Ac affixed to the sponge Ab, and an ultraviolet-curing resin affixed to the resin base Ac to form a stamp surface Ad. The ultraviolet-curing resin portion (stamp surface Ad) of the stamp body A is exposed to ultraviolet rays with the ink ribbon C as a mask, whereby portions of the stamp surface Ad corresponding to the stamp characters are cured. In this state, the stamp body A is taken out of the pocket 6, and washed with water to remove uncured portions of the stamp surface, which are soluble in water, from the stamp surface Ad. Thus the stamp is completed. Symbol Ae in the figure designates a cap made of resin.

Next, the printing block 64 will be described with reference to FIGS. 2 and 11. The printing block 64 includes a head-driving circuit 56a and a motor-driving circuit 57a both of which are connected to the output interface 305 of the control block 300, the print head (thermal head) 56 driven by the head-driving circuit 56a for printing stamp characters on the ink ribbon C, a platen roller 57 for feeding the ink ribbon C in a manner timed to printing operations of the print head 56, and a head temperature sensor 56b arranged on a head surface of the print head 56. Further, the casing 2 is formed with a feeding passage 181 through which the plate-making sheet B is fed to a contacting area between the print head 56 and the platen roller 57 and a delivery passage 182 through which the plate-making sheet B is delivered. The feeding passage 181 is formed with the inserting slot 9a which is open to the outside of the apparatus, at an upstream end thereof, and the delivery passage 182 is formed with the take-out slot 9b which is open to the outside of the apparatus, at a downstream end thereof.

The platen roller 57 is a drive roller as described hereinabove, and when the ink ribbon C is unrolled from the supply reel 14, it pulls in the plate-making sheet B between the print head 56 and itself to thereby bring a portion of the ink ribbon C and a portion of the plate-making sheet B, one upon the other, onto the print head 56. The print head 56 is a thermal head, and thermally transfers ink coated on the ribbon tape of the ink ribbon C to the plate-making sheet B. This transfer of the ink peels portions of ink corresponding to stamp characters off the ink ribbon C to reveal corresponding portions of the transparent base of the ribbon tape, while the peeled portions of the ink are attached to the plate-making sheet B as the stamp characters. The head surface temperature sensor 56b is formed by a temperature sensor, such as a thermistor, arranged on a surface of the print head 56 in an intimately contacting manner, and connected to the input interface 304 of the control block 300 for sending information on a temperature of the print head 56 detected thereby.

On the feeding passage 181 faces a sensor 183 which detects insertion of the plate-making sheet B and a feeding reference position of the same. The plate-making sheet B inserted into the feeding passage 181 is sent forward by the platen roller 57 depending on results of the detection of the sensor 183 whereby printing is started from one end of the stamp character label Bd. One of walls defining the delivery passage 182 on a left-hand side as viewed in FIG. 2 is formed with a separating nail 184 at an upstream end thereof, whereby the ink ribbon C and the plate-making sheet B being fed, one upon the other, are separated from each other. Thereafter, the ink ribbon C is sent forward to the exposure block, while the plate-making sheet B is delivered via the delivery passage 182 out of the apparatus.

Next, the exposure block 65 will be described with reference to FIGS. 2 and 11. The exposure block 65 includes a light source-driving circuit 191a connected to the output interface 305 of the control block 300, an ultraviolet ray source 191 arranged in a manner opposed to the stamp surface Ad of the stamp body A set in the pocket 6 and driven by the light source-driving circuit 191a, and a presser plate 58 arranged between the ultraviolet ray source 191 and the stamp surface Ad of the stamp body A. The ultraviolet ray source 191 is a self-heating hot-cathode tube called a semi-hot tube and supported on a fluorescent tube holder, not shown, provided on a base plate, not shown. The stamp surface Ad of the stamp body A, the presser plate 58, and the ultraviolet ray source 191 are arranged in parallel to each other with a gap between adjacent ones thereof. The ink ribbon C is fed between the stamp surface Ad and the presser plate 58.

The presser plate 58 is formed e.g. of a transparent resin, and moves forward (downward as viewed in FIG. 2) to urge the ink ribbon C against the stamp surface Ad of the stamp body A. More specifically, the exposure is carried out by causing the presser plate 58 to urge the ink ribbon C against the stamp surface Ad of the stamp body A, and lighting the ultraviolet ray source 191 to thereby irradiate the ink ribbon C with ultraviolet rays through the presser plate 58 (see FIG. 5). The exposure block 65 is provided with an ambient temperature sensor 67 which is connected to the input interface 304 of the control block 300, and sends information on a temperature of ambience of the exposure block 65 detected thereby to the input interface 304.

It should be noted that as the presser plate 58 is advanced, the first guide pin 53 and the second guide pin 54 are moved in the same direction. This movement decreases the tension of the ink ribbon C stretched between the first and second guide pins 53, 54, whereby the ink ribbon C is urged against the stamp surface Ad of the stamp body A with reduced tension, i.e. without forming any vertical wrinkles thereon.

Now, the above-mentioned state of the ink ribbon C is described in further detail with reference to FIGS. 2 and 5. Referring to FIG. 2, when the ink ribbon C is fed or advanced, the pulling force of the take-up reel 13 causes strong tension of the ink ribbon C, so that vertical wrinkles are formed on the ink ribbon C due to its very small thickness. Therefore, if the ink ribbon C is urged against the stamp surface Ad of the stamp body A as it is, there remain the wrinkles formed on the ink ribbon C urged against the stamp surface Ad, so that deformed images (negative) of the stamp characters on the ink ribbon C are used in carrying out the exposure of the stamp surface Ad to the ultraviolet rays. On the other hand, if the ink ribbon C is loosened, the exposure can be carried out with the images of the stamp characters being out of position. To eliminate these inconveniences, as illustrated in FIG. 5, the first guide pin 53 and the second guide pin 54 are moved forward in accordance with the forward movement of the presser plate 58, whereby the tension of the ink ribbon C is reduced, and at the same time, a slight stretching force is applied to the ink ribbon C by the tension pin 55, which is moderate enough not to produce any wrinkles on the ink ribbon C.

Figure 5:
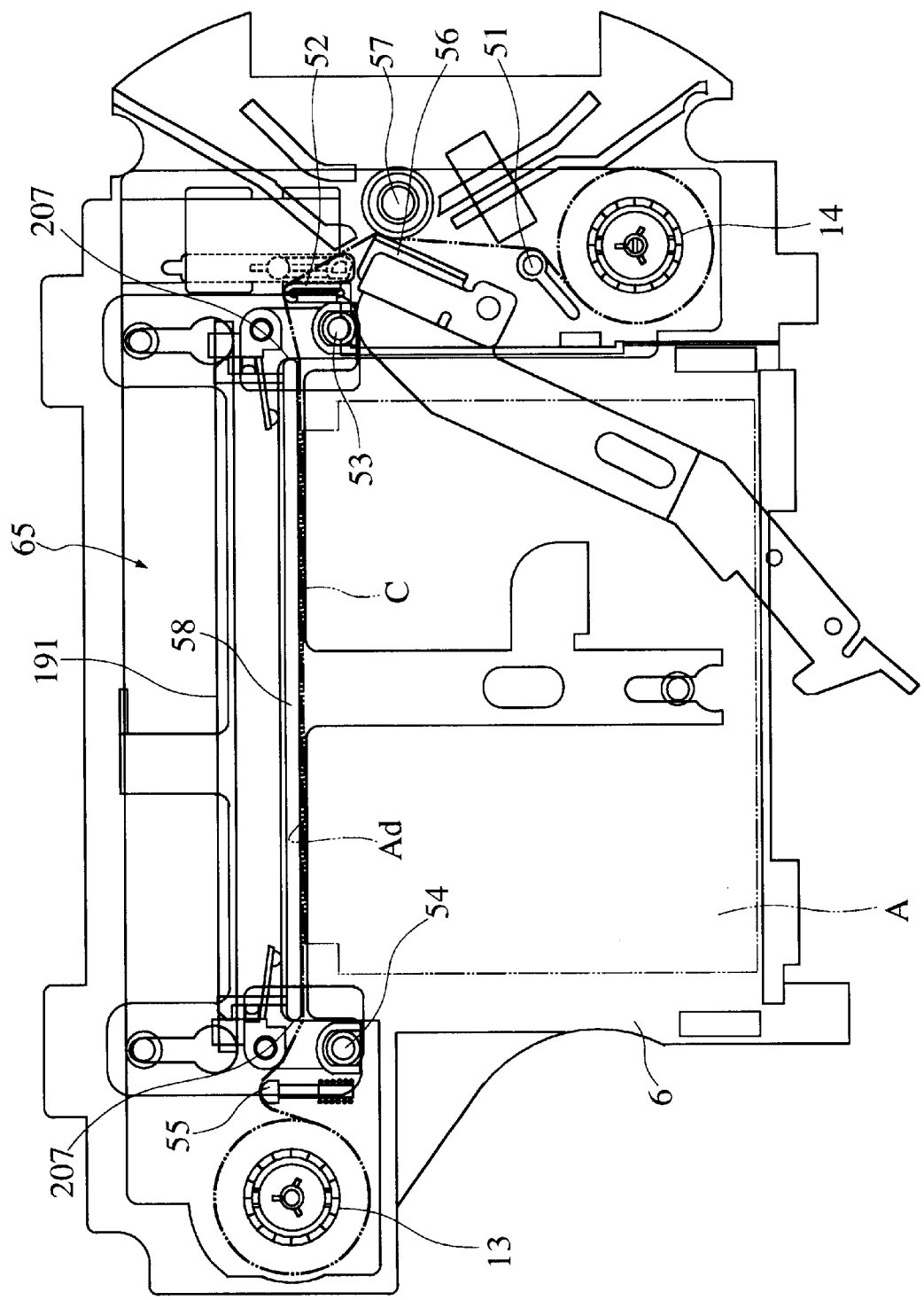
FIG. 5 is a plan view of an exposure system of the mechanical block and components associated therewith.
Figure 6:
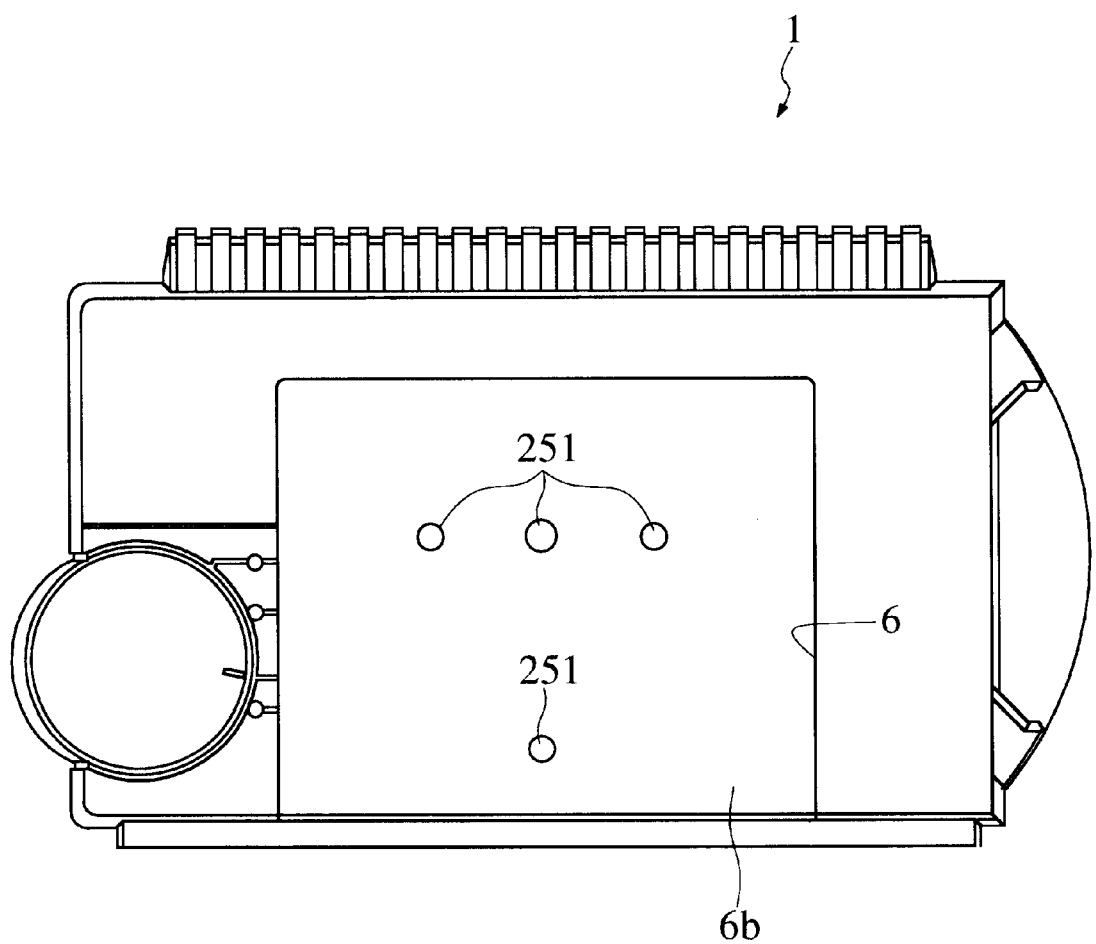
FIG. 6 is a plan view illustrating a pocket formed in the mechanical block with a lid removed therefrom.

Further, the ink ribbon C in the exposure position shown in FIG. 5 is bent backward at the longitudinal opposite ends of the presser plate 58 by the tension pin 55 and the second path-setting pin 52, and the chamfered portions 207 formed at the longitudinal opposite ends of the presser plate 58 operate to prevent undesired wrinkles from being produced on the ink ribbon C.

As described above, a positive image on the plate-making sheet B and a negative image on the ink ribbon C both formed by the printing are used as a stamp character label and an exposure mask, respectively. That is, the quality of these images directly reflects on the quality of a stamp as a final product. Especially, when the ink ribbon C, which is used as the exposure mask, is deformed, images of deformed characters are formed on the stamp body by the exposure. To eliminate this inconvenience, in addition to mechanical structural means for regulating the tension of the ink ribbon described above, electrical means of adjusting an amount of heat generated by the exposure process is provided to thereby prevent undesired wrinkles from being formed on the ink ribbon C.

Next, the stamp-detecting block 66, the operation of which is linked to the opening and closing of the lid 7, will be described. The stamp-detecting block 66 detects the mounting of the stamp body A in the pocket 6, and at the same time discriminates the type of the mounted stamp body A. The stamp body A includes various types having respective different shapes, e.g. ones for a square stamp, a personal name stamp, a business stamp, an address stamp, etc. The different types of stamp bodies A for respective types of stamps are identical in length, but different in width and thickness. It should be noted that the above "length" means a size of the stamp body A between the stamp surface Ad and a surface on an opposite side thereto (back surface Ag), the above "width" means a size of the stamp body A between surfaces of opposite lateral ends thereof in its position mounted in the pocket 6, and the above "thickness" means a size of the stamp body between an upper side surface and a lower side surface of the stamp body in its position mounted in the pocket 6. To set each of these various types of the stamp body A different in width and thickness to a fixed position with respect to the directions along the width and the thickness of the stamp body A, in the present embodiment, as illustrated in FIGS. 6 and 7A to 7D, four bosses 251, 251, 251, 251, long and short, are provided on the bottom 6b of the pocket 6 such that they extend perpendicularly upward from the bottom, and the stamp body A is formed with fitting holes Af for fitting corresponding ones of the bosses therein, respectively, (see FIG. 7A to 7D).

Figure 7C:
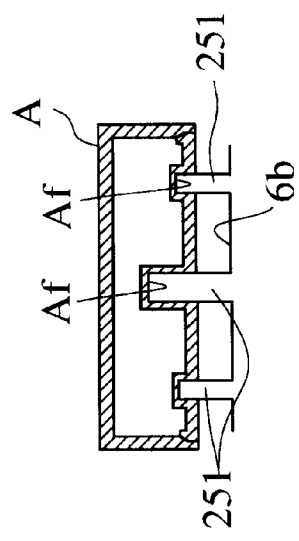
FIGS. 7C and 7D are explanatory diagrams for illustrating the construction of a stamp body of a business stamp when mounted in the pocket.
Figure 7D:
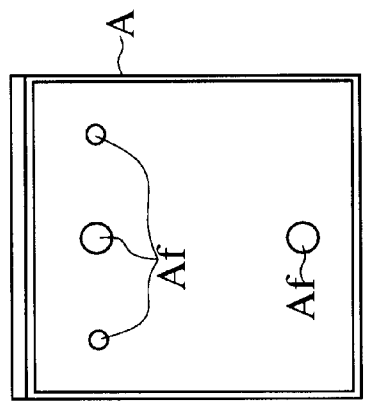
Figure 7A:
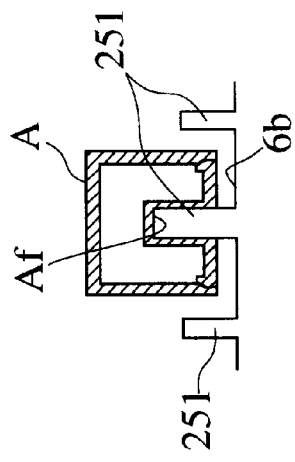
FIGS. 7A and 7B are explanatory diagrams for illustrating the construction of a stamp body of a square stamp when mounted in the pocket.
Figure 7B:
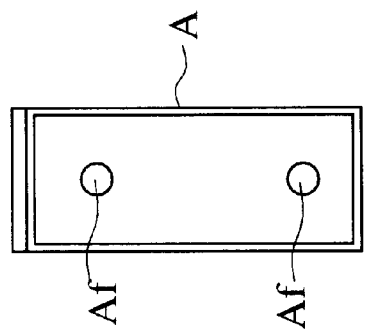

The four bosses 251, 251, 251, 251 are arranged to form a T shape, and in a manner corresponding thereto, a stamp body A for the square stamp, for example, is formed with two fitting holes Af, Af (see FIGS. 7A and 7B), and a stamp body A for the business stamp, for example, is formed with four fitting holes Af, Af, Af, Af (see FIGS. 7C and 7D). The number of the fitting holes Af and the depth of each of them depend on the type of the stamp body A, and this combination of the fitting holes Ag and the bosses 251 enables each stamp body A to be mounted in the pocket 6 such that the center of the stamp surface Ad of the stamp body A mounted in the pocket 6 is positioned to a fixed location.

Further, the back surface Ag on the opposite side to the stamp surface Ad is formed with a plurality of small holes Ah (type-detecting holes) arranged side by side at respective central locations along the width of the stamp body A. The small holes Ah cooperate with a switch array 262 of the stamp-detecting block 66, later described, to detect the type of the stamp body A (see FIGS. 8A to 8G). The stamp character label Bd of the plate-making sheet B printed with stamp characters and delivered to the outside of the apparatus separately from the ink ribbon C is affixed to the back surface Ag of the stamp body A, whereby the small holes Ah are concealed.

Figure 9:
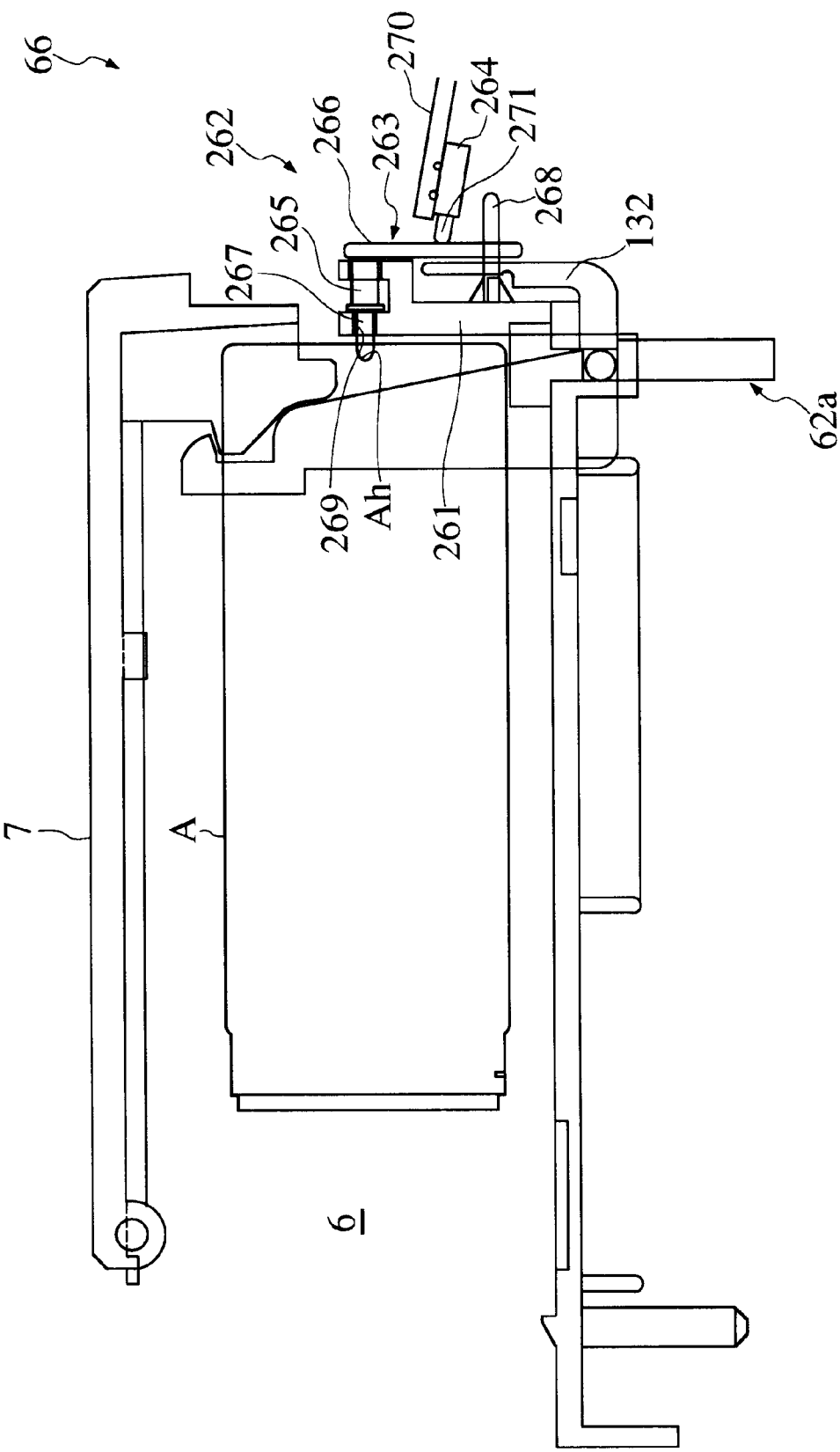
FIG. 9 is a cross-sectional view which is useful in explaining operations of a stamp-detecting block for detecting a stamp body.
Figure 10:
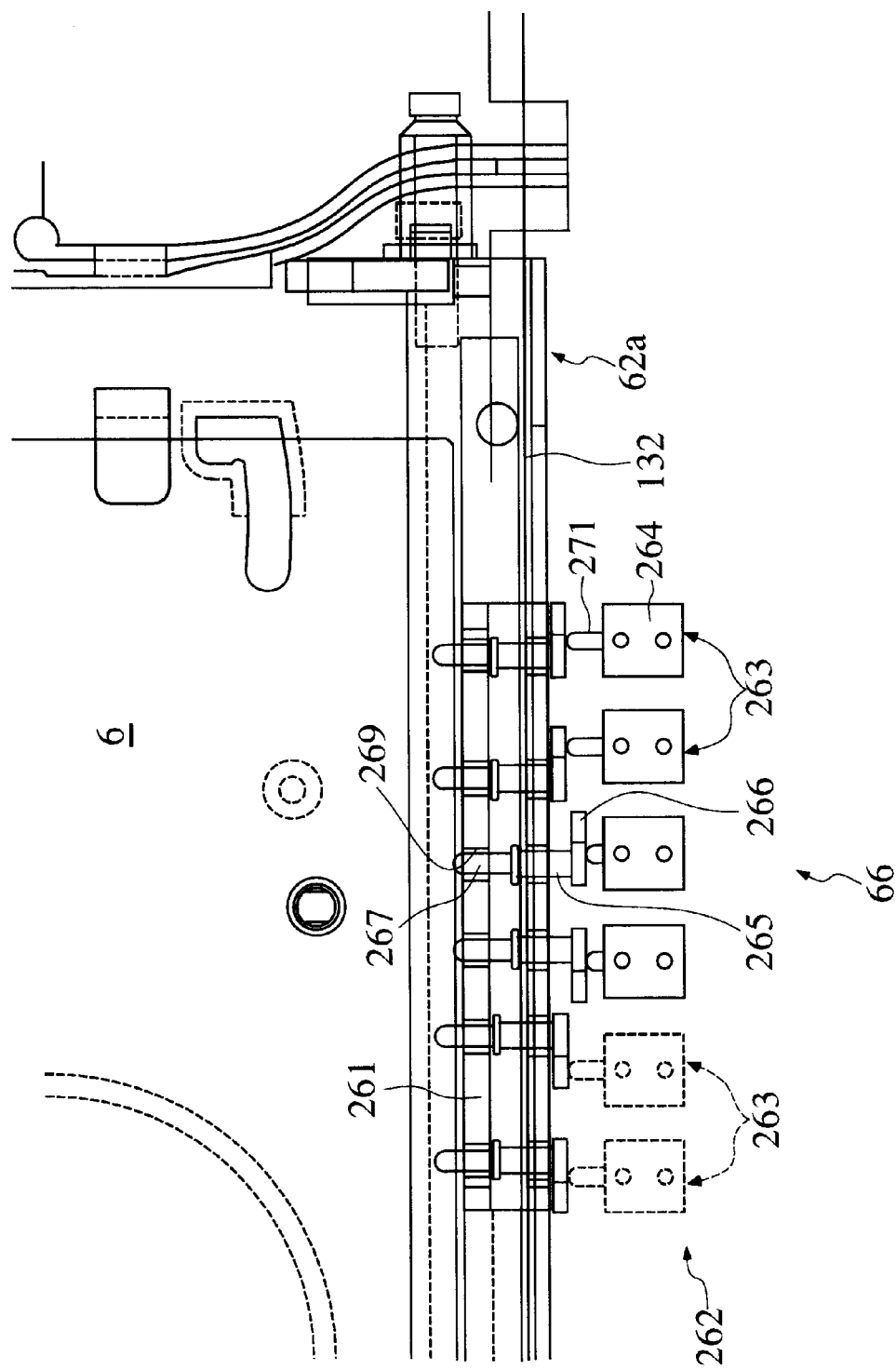
FIG. 10 is a partial plan view illustrating the pocket, the stamp-detecting block, and components associated therewith.

As illustrated in FIGS. 9 and 10, the stamp-detecting block 66 includes a switch holder 261 (also serving as a wall of the pocket 6) arranged such that it is opposed to the back surface Ag of the stamp body A when it is mounted in the pocket 6, and the switch array 262 formed of six detecting switches 263 supported on the switch holder 261. Each detecting switch 263 is comprised of a switch body 264 formed e.g. of a push switch, and a switch top 265 having one end for being projected into the pocket 6. The switch top 265 includes a plate portion 266 and a detecting projection 267 (including the one end) extending at a right angle to the plate portion 266, with a lower part of the plate portion 266 being guided by a guide projection 268 formed in the switch holder 261 and the detecting projection 267 being guided by a guide hole 269 formed through the switch holder 261 for forward and backward motions thereof.

The switch body 264 is fixed to the reverse side surface of a base plate 270 such that a plunger 271 thereof abuts the plate portion 266 of the switch top 265. The plunger 271 urges the switch top 265 toward the pocket 6 by the urging force generated by its spring, not shown. A state of the one end of the detecting projection 267 projected into the pocket 6 via the guide hole 269 through the switch holder 261, and a state of the same being retracted against the urging force of the plunger 271 correspond to ON-OFF states of the detecting switch 263, respectively. Actually, when any of the detecting switches 263 of the switch array 262 is turned on, mounting of the stamp body A is detected, whereas when all of the detecting switches 263 are turned off, removal of the stamp body A is detected. The detecting switches 263 of the switch array 262 are each in ON or OFF state depending on whether a corresponding small hole Ah exists in the stamp body A. Therefore, the type of the stamp body A can be determined from a pattern of ON/OFF states of the six detecting switches 263.

FIGS. 8A to 8G illustrate the relationship between small holes Ah in the stamp body A and the six detecting switches 263 (detecting projections 267). Provision of the six detecting switches 263 for detecting presence or absence of the small holes Ah makes it possible to detect 2n−1 (n=6), i.e. 63 types of patterns. A stamp body A for a square stamp or the like, which is small in width, has no small holes Ah corresponding to two outermost detecting switches 263, 263 on respective opposite sides, and the two detecting switches 263, 263 project into space at opposite locations outside the stamp body A. That is, a stamp body A having a small width, such as a stamp body A for a square stamp, is recognized by a pattern for a stamp body A having imaginary small holes Ah at outermost locations thereof.

Next, the control block 300 will be described with reference to FIG. 11. The control block 300 is based on, e.g. a microcomputer, and includes a CPU 301, a ROM 302, an input interface 304, an output interface 305, and a system bus 306 connecting all these devices to each other.

The ROM 302 stores various programs, dictionary data for kana-kanji character conversion, font data of characters, symbols, etc. and fixed data, such as data of a predetermined stamp frame. The RAM 303 is used as a working area, and also as means for storing fixed data input by a user. The data stored in the RAM 303 is backed up even when the power is turned off.

The input interface 304 interfaces to fetch signals from the function switch 8, the push button group 22 and the operating dial 23 of the operating block 21, the head surface temperature sensor 56b of the printing block 64, the ambient temperature sensor 67 of the exposure block 65, and the stamp-detecting block 66, via the system bus 306 into the CPU 301 or the RAM. The output interface 305 interfaces to deliver control signals and data used in control operations received via the system bus 306 from the CPU 301, the ROM 302, and the RAM 303 to the light-emitting elements 12, the display-driving circuit 24a of the operating block 21, the head-driving circuit 56a of the printing block 64, the motor-driving circuit 57a, the light source-driving circuit 191a of the exposure block 65, etc.

The CPU 301 carries out processing based on input signals from the input interface 304, and a processing program stored within the ROM 302 and selected according to the processing on each occasion, using the RAM 303 as the working area, and fixed data stored within the ROM 302 and the RAM 303, as needed.

The stamp-making apparatus 1 of the present embodiment carries out multitask processing in the following manner:

FIG. 12 illustrates a conceptual representation of the multitasking of the present embodiment. A plurality of tasks to be executed are classified into groups having respective priorities RDY0 to RDYn (in the case of the illustrated example, n=7), and the order of processing of tasks is determined based on the priorities to thereby activate each task. In the following description, tasks assigned the highest priority RDY0 are designated as TCB0i (i=0, 1, 2, . . . ), and tasks assigned the lowest priority are designated as TCB7i. In general, a task assigned the priority RDYj (j=0 to 7) is designated as TCBji. Further, when a task is classified into a group having the priority RDYj, and placed in a wait state in this group, i.e. in the priority, this state will be described e.g. as "a task TCBm0 is registered as TCBj0". When one or more tasks assigned the priority RDYj are registered, it will be expressed as "task existing in RDYj".

Further, as illustrated in FIG. 12, in the multitasking, an area is set aside for registering a name of each task (e.g. TCBm0 shown in the figure) created for execution in response to an event, such as an interrupt, generated e.g. by depression of any of the push buttons of the push button group 22 or operation of the operating dial 23, and for registering a communication task between tasks (e.g. Mailml illustrated in the figure; hereinafter simply referred to as a "mail"). This area will be referred to as "mail box MBX" in the following description. Further, the name of a task representative of the contents of current or actual processing is expressed as TCBr0, and execution of this task for processing is expressed as "the active task run processing", or "the RUN processing" in an abbreviated form. For example, when a task TCB00 is selected and activated, it will be expressed as "the task TCB00 is registered as TCBr0 and activated". This registration is shown as "TCBr0←TCB00" in hierarchical operation diagrams, later described, and flow charts. The task TCBm0 in the mailbox MBX contains information concerning whether the task TCBr0 currently being executed should be forcedly interrupted or not, and which priority RDYi it should be registered in, and in MBX processing, later described, the task TCBm0 is executed according to these pieces of information.

Figure 13:
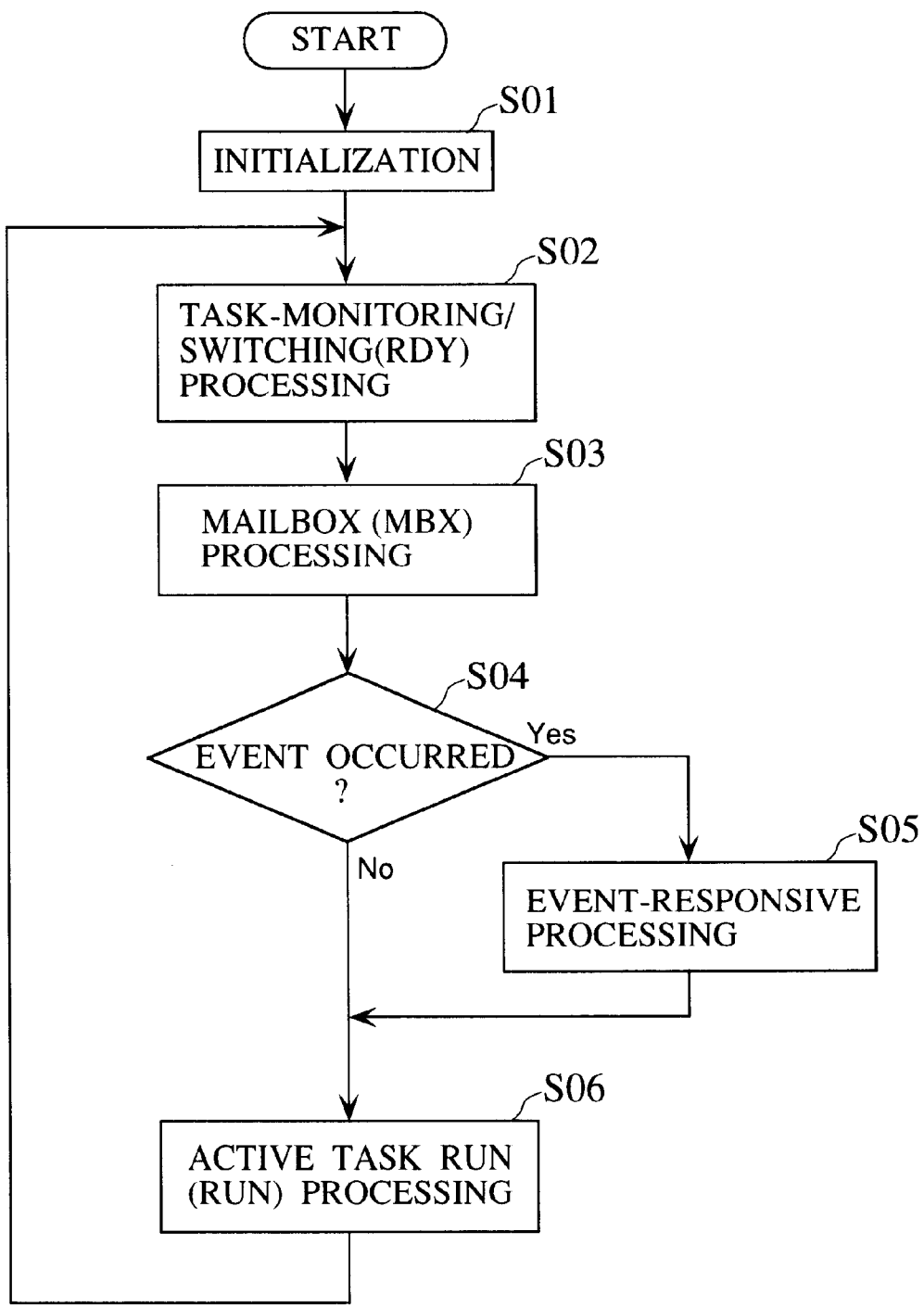
FIG. 13 is a flow chart illustrating an outline of the overall processing of the stamp-making apparatus.

FIG. 13 illustrates a procedure of processing executed according to the embodiment of the present embodiment, expressed in the form of an ordinary flow chart. As illustrated in the figure, when the stamp-making apparatus 1 is powered on to start the processing, an initialization of each device of the stamp-making apparatus is first executed at step S01, task-monitoring/switching (RDY) processing at step S02, and mailbox (MBX) processing at step S03. Then, it is determined at step S04 whether or not any event has occurred. If an event has occurred, event-responsive processing is executed at step S05, and thereafter, the active task run (RUN) processing is executed at step S06. Then, the RDY processing (step S02) to the RUN processing (step S06) are repeatedly executed.

However, in the actual processing, the RDY processing and the MBX processing are executed only at predetermined regular timing, but event-responsive processing is started upon occurrence of the event, while the RUN processing is executed during execution of the other processing. Therefore, the present multitasking cannot be expressed accurate enough by the above flow chart, and the hierarchical structure of the program is difficult to understand therefrom. Therefore, in the following description, when a sequence of steps of a task is described, a flow chart is employed which illustrates a task actually executed by activating another task for the multitasking as a subroutine.

Event-driven type tasks, i.e. tasks which are initiated or activated in response to respective events, are described by a description method used in a diagram of FIG. 14 (hereinafter referred to as "the hierarchical operation diagram").

In the hierarchical operation diagram, each processing branch point designated by symbol ◇ represents a task, a program, or a subroutine, which is of an event-driven type i.e. executed when an event, such as an interrupt or activation of a task initiated by another task, has occurred. The task-monitoring/switching (RDY) processing illustrated in FIG. 14 is started only when an interrupt is generated at regular time intervals e.g. through a real time monitoring. Further, the mailbox (MBX) processing is also started by an interrupt generated at regular time intervals other than the regular time intervals of the PDY processing. The event-responsive processing registers various events, such as tasks initiated by operations of the operating dial 23, in the mailbox MBX. Although only one routine is illustrated in FIG.14 as a representative, actually, the mailbox MBX is accessed for registration of the name of a task to be executed in response to each event independently whenever the event occurs.

Figure 14:
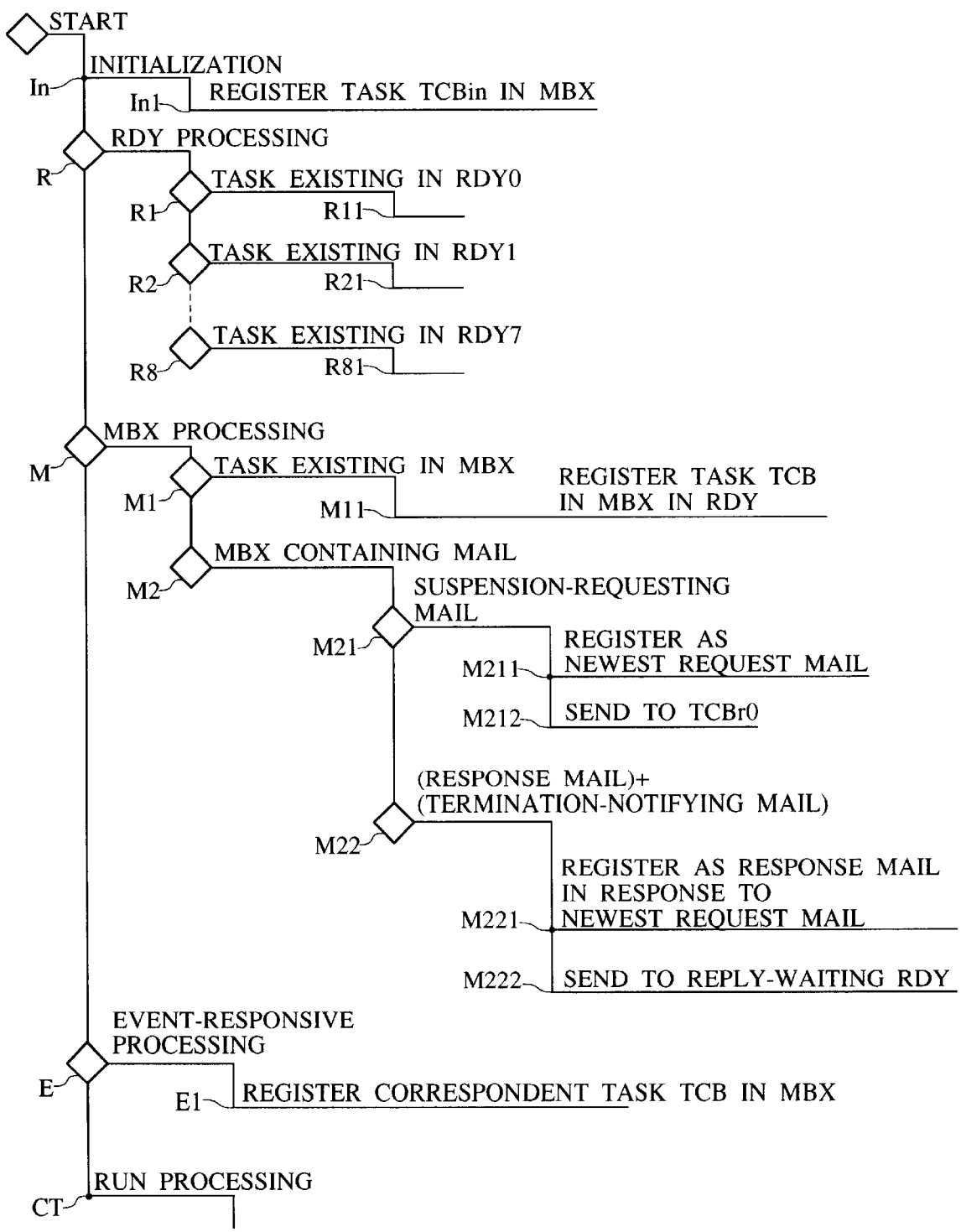
FIG. 14 is a hierarchical operation diagram illustrating main tasks executed in the stamp-making apparatus.

As illustrated in FIG. 14, when the program is started by turning on the power, first, the initialization at a processing branch point In (hereinafter referred to as "the initialization (In)") is executed. The initialization (In) registers a task TCBin of main tasks-starting processing in the mailbox MBX (In1). When the initialization (In) is terminated, if it is neither time for the RDY processing nor time for the MBX processing, or any other event has not occurred, then the program proceeds to the RUN processing (CT). However, at this time point of the present case, there is no task registered, so that time for starting the RDY processing or the MBX processing is awaited.

In this state, when it becomes time for the RDY processing, the RDY processing (R) is executed, but there are no tasks registered in the priorities RDY0 to RDY7, i.e. no tasks exist in the priorities RDY0 to RDY7 (R1 to R8), so that the RDY processing is terminated without executing any specific processing. On the other hand, when it is time for the MBX processing, the MBX processing (M) is executed, and according to the task TCBin for starting main tasks, which has been registered as TCBm0 in the mailbox MBX, the processing of "task existing in MBX (M1)" is executed to register the task TCB of the mailbox MBX in the priority RDY (M11). Specifically, if the priority specified for the task TCBin corresponds to the priority RDY4, the task TCBin is registered as TCB40 in the priority RDY4.

In this state, when it is time for the RDY processing, the RDY processing (R), e.g. the processing of "task existing in RDY4 (R3)" is executed. Now, the processing of "task existing in RDYi (R(i−1))" will be described with reference to FIG. 15. This processing generally branches into a case of activating a new task a case of sending a suspension-requesting mail to the active task without starting a task, and a case of executing no processing.

First, if there is no active task, i.e. if there is no task registered as TCBr0, and hence the RUN processing is not being executed, or if the active task TCBr0 has a priority equal to or lower than the priority RDY(i+1), and at the same time, the active task is suspensible, another task is started. The term "suspensible" means that the task to be activated can forcibly interrupt execution of the active task, or that a response mail in response to the suspension-requesting mail is an interruption-permitting mail or a termination-notifying mail indicative of termination of the active task. Under the above-mentioned condition, i.e. when the conditions expressed by (no active task)+(active task priority being equal to or lower than RDY(i+1)) & ((forcibly suspensible)+ (MBX containing response mail) & ((interruption-permitting mail)+(termination-notifying mail)) are fulfilled at R(i−1)1, the new task is activated at R(i−1)11. Here, "+" represents a logical sum (OR), while "&" a logical product (AND).

On the other hand, a suspension-requesting mail is sent to the mailbox MBX, if the priority of the active task is equal to or lower than RDY(i+1), and at the same time there is no response mail from the active task so that it is not known whether the active task is suspensible or not, or the situation requires to again send the suspension-requesting mail after a response mail saying that the active task is not suspensible was received in response to the preceding suspension-requesting mail. That is, if the conditions expressed by (active task priority being equal to or lower than RDY(i+1) & (not forcibly suspensible) & ((MBX containing no response mail)+(suspension-inhibited mail)) are fulfilled at R(i−1)2, a suspension-requesting mail is sent at R(i−1)21. If neither of the above two sets of conditions are fulfilled, i.e. if the active task priority is equal to or higher than RDYi, no particular processing is executed, but the processing of "task existing in RDYi (R(i−1))" is terminated.

In the new task activation (R(i−1)11), if there exists any other task which has been suspended to activate a task higher in priority, or to start a subtask and wait for results of processing by the subtask, it is determined e.g. from resumption information, later described, whether the suspended task can be resumed or not. If the suspended task can be resumed, the processing of (suspended task existing) & (resumption permitted) (R(i−1)111) is executed. In this processing, the suspended task is registered as the active task TCBr0 at R(i−1)111, and if there are any saved data or the like, these data are restored or returned at R(i−1)1112, followed by newly starting the RUN processing at R(i−1)1113. The generation of this event causes the new task activation (CT1) to be activated in the RUN processing (CT), later described.

When there is no suspended task, the processing of "no suspended task" is executed at R(i−1)112, and after the processing of "TCBr0←new task name" is executed at R(i−1)1112, the RUN processing is started again at R(i−1) 1122. For example, when the task TCBin for activating the main tasks is to be executed, in the processing of new task activation (R311), the processing of "TCBr0←TCBin (R31121)" is executed in "no suspended task (R3112)", and then the RUN processing is started at R31122.

On the other hand, if there is a suspended task but the resumption of the suspended task is inhibited, the permission of resuming the suspended work has to be awaited, so that the new task activation (R(i−1)11) is terminated without executing any processing. It should be noted that since the above-mentioned subtask is normally set to a higher priority than the originating task, it is a general tendency that the subtask has already been terminated when the task initiation (R(i−1)11) is processed, thus permitting the originating task to be resumed.

Next, the mailbox (MBX) processing will be described with reference to FIG. 14. In this processing, in the case of "task existing in MBX (M1)", the task TCBm0 in the mailbox MBX is registered at M11 in a priority RDYj according to a priority specified for the task. In the case of "MBX containing mail (M2)", if the mail is a suspension-requesting mail (M21), it is registered as the latest request mail at M211, and sent to the active task TCBr0 at M212, whereas if the mail fulfills the conditions expressed by "(response mail)+(termination-notifying mail)" at M22, it is registered as a response mail in response to the latest request mail (at M221) and sent to a reply-waiting RDY (at M222).

Next, the event-responsive processing (E) will be described. Although the initialization (In) is described as a different kind of processing from this processing for the convenience of explanation, it is actually a kind of event-responsive processing (E). That is, the event-responsive processing (E) registers a task created by an event from the outside of the CPU, such as a manipulation of the operating dial 23, or a task created for execution of a program for internal processing, in the mailbox MBX at E1. For example, after registration in the mailbox MBX, the task TCBin for starting the main tasks is registered in the priority RDY, and then executed as a new task by the (RUN) processing described below.

Figure 16:
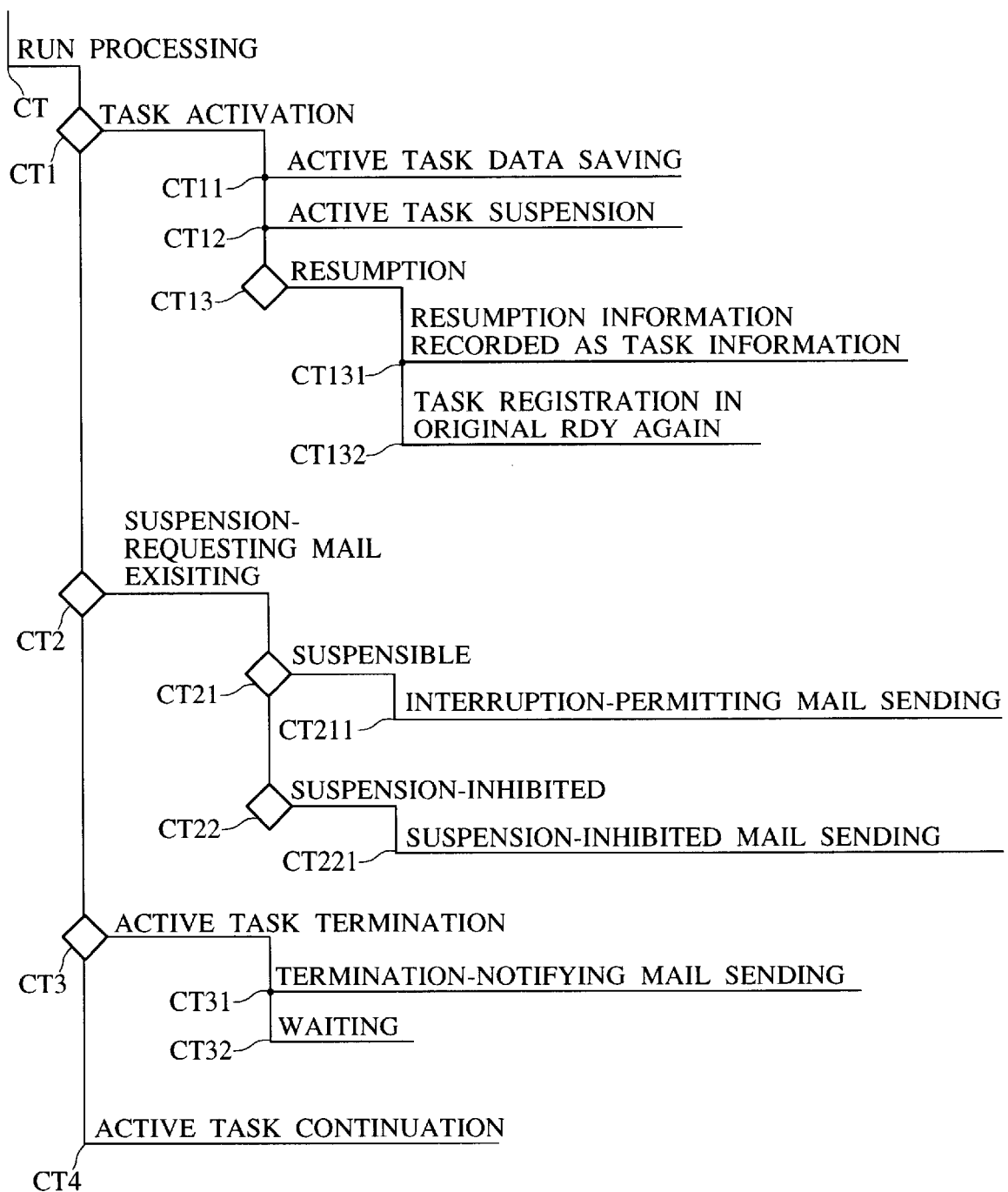
FIG. 16 is a hierarchical operation diagram of active task-executing processing executed in the stamp-making apparatus.

Now, the active task run (RUN) processing (CT) will be described with reference to FIG. 16. This processing continues the active task TCBr0 when there is no other event generated as described above. During this processing, there occur events of "task activation (CT1)", "suspension-requesting mail existing (CT2)" and "active task termination (CT3)". If these events do not occur, the processing of the active task is continued at CT4. If another task is to be activated at CT1, data of the active task being executed is saved at CT11, and then the active task is suspended at CT12. If resumption of the task is expected at CT13, resumption information is recorded as task information at CT131, based on which the task is registered again in the original priority RDY at CT132.

When the suspension-requesting mail existing at CT2, it is determined whether or not the active task is in a suspensible state. If the active task is suspensible at CT21, an interruption-permitting mail is sent to the mailbox MBX at CT211, while if it is not suspensible at CT22, a suspension-inhibited mail is sent at CT221. It should be noted that although similar processing is executed to temporarily suspend the RUN processing, when the RUN processing (CT) being executed is switched to the RDY processing (R), the MBX processing (M) or the event-responsive processing (E), this processing is a basic routine for real-time monitoring which is different from the processing of switching to the other tasks, and hence description thereof is omitted. When the active task TCBr is terminated at CT3, the termination-notifying mail is transmitted to the mailbox at MBX CT31, and the following task activation is awaited at CT32.

Figure 17:
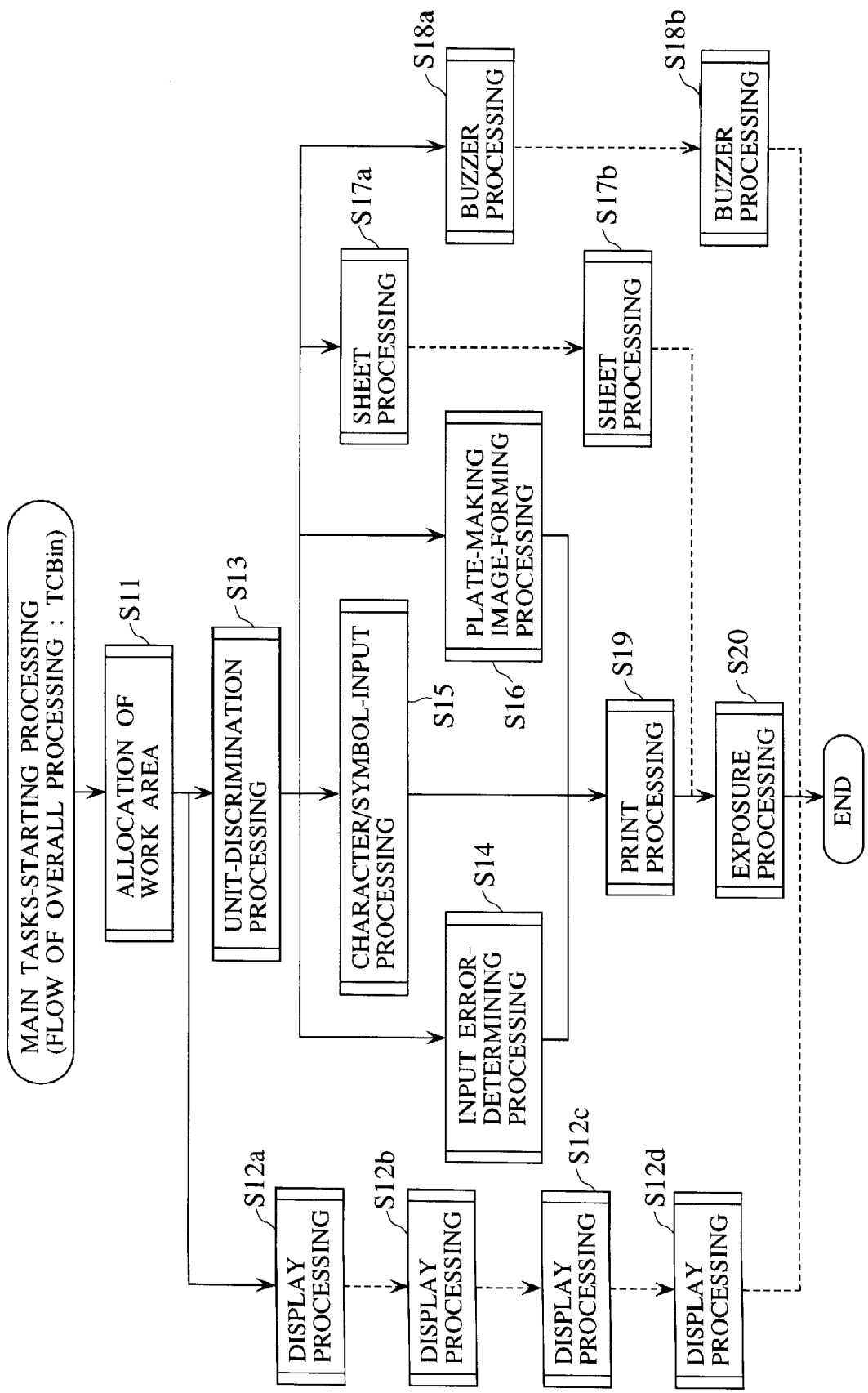
FIG. 17 is a flow chart of an example of main tasks-starting processing executed in the stamp-making apparatus.

FIG. 17 illustrates an example of the main tasks-starting processing. As illustrated in the figure, when the main tasks-starting processing task TCBin is activated, a task of allocating work area is first registered in the mailbox MBX at step S11, and then a task of display processing and a task of unit (stamp body)-discriminating processing are registered in the mailbox MBX at respective steps S12 and S13. Then, a task of input error-determining processing is registered at step S14, a task of character/symbol-input processing at step S15, a task of plate-making image (stamp image)-forming processing at step S16, a task of sheet processing at step S17, and a task of buzzer processing at step S18. Then, after a task of print processing is registered at step S19, a task of exposure processing is registered at step S20. The MBX processing classifies these subtasks according to the order of priority and registers each of them in a proper priority RDYj, and then the RDY processing causes them to be activated one after another. Further, after these subtasks are started, subtasks of the subtasks are registered in the mailbox MBX as required and each of them is activated by the RDY processing.

Stated another way, a plurality of tasks including the task TCBin of the initialization continue to be executed until they are each eventually placed in a wait state by any reasons. The internal processing of the stamp-making apparatus 1 proceeds to a next step by the multitasking described above when another task as a cause of the wait state of a task has progressed to be deactivated, so that eventually, the internal processing of the multitasking enters a state in which an entry or other manipulation by the user is awaited. Conversely, once the user manipulates the stamp-making apparatus 1, the tasks therefor including error handling tasks are sequentially carried out, and eventually the program enters a state in which another manipulation by the user is awaited.

Therefore, the user actually feels that various processing operations or tasks are executed in parallel and simultaneously. More specifically, according to the processing of the present stamp-making apparatus 1, compared with a manner of processing in which the processing proceeds to a next step each time only in response to a manipulation by the user, various kinds of processing operations which will be required to be executed later can be executed in advance, whereby a time period during which the man or user has to wait can be minimized, enabling high-speed processing to be attained. It should be noted that parallel processing, such as the multitasking processing described above, can be realized by forming the program or all the tasks described above by interrupt handlers and employing an interrupt control circuit which controls the order of priority of interrupts generated.

The dotted lines in FIG. 17 show that tasks appear to be simultaneously executed in parallel with each other. Further, the task of character/symbol-input processing (step S15), the task of input error-determining processing (step S14), and the task of plate-making image-forming processing (step S16) are simultaneously executed. More specifically, after a first entry of characters or the like (letters, symbols, figures, or the like) is effected, and before the following entry of characters or the like is effected (step S15), it is determined at step S14 whether or not there is an inconvenience in the number of characters entered in a text, and an image for use in the plate-making is formed at step S16. In the course of executing these steps, if a character entry is carried out at step S15, the task of the input error-determining processing (S14) and that of the plate-making image-forming processing (step S16) are immediately stopped, and then resumed from the start thereof. In the meanwhile, the display processing (step S12, shown as S12$a$ to S12$d$) and the buzzer processing (step S18, shown as S18$a$ and S18$b$), further, the sheet processing (step S17, shown as S17$a$ and S17$b$) responsive to insertion of the plate-making sheet, are being executed in parallel with the above steps.

In the stamp-making apparatus 1, the methods and apparatuses provided by the present invention are implemented by the control block 300, the operating block 21, and the stamp-detecting block 66. Since the characteristic operations thereof lie in the plate-making image-forming processing (step S16), this processing (step S16) will be described below in detail with reference to FIGS. 18–42. It should be noted that, within a variety of aspects of the present invention, the image forming method and apparatus are mainly applied to basic image positioning processing (step S50), later described, belonging to the plate-making image-forming processing (step S16), the character layout method and apparatus are mainly applied to character layout processing (step S60), later described, and the stamp-making method and apparatus are mainly applied to decorative image positioning processing (step S70), later described.

As described above, the plate-making image-forming processing (step S16) is resumed every time a new character or the like is input in the character/symbol-input processing (step S15). In addition, the processing at the first two steps of FIG. 18, i.e., stamp type discrimination (step S30) and stamp image data dot number determination (step S31) have been executed in the unit determining processing (step S13) before the processing of interest is started, and the subsequent style form specification acquisition (step S31) has been executed in the character/symbol-input processing (step S15). While the processing at these steps are used to only reference information provided thereby, they are included in the flow chart of FIG. 18 for the convenience of explanation.

Figure 18:
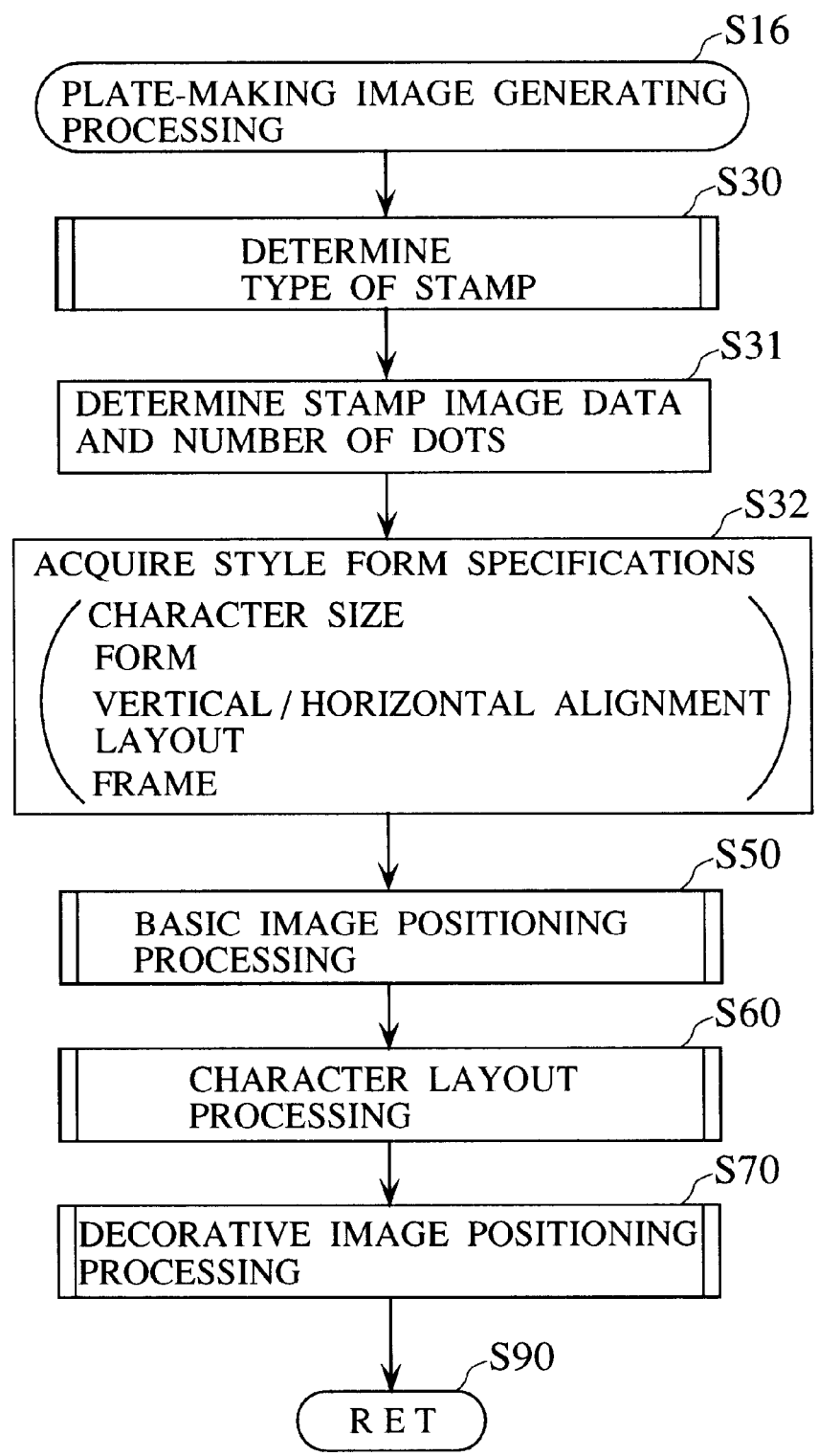
FIG. 18 is a flow chart illustrating a procedure of steps executed for plate image forming processing shown in FIG. 17.

As illustrated in FIG. 18, when the plate-making image-forming processing (step S16 in FIG. 17) is started, the stamp detecting block 66 determines whether or not a stamp body A is set (loaded) and, if set, which type of stamp is set (step S30). Then, the number of dots in stamp image data is determined (step S31), and thereafter style form specifications are acquired (step S32). In the style form specification acquisition (step S32), the contents specified by the user, i.e., a character size, a form, vertical alignment/horizontal alignment, layout, a frame, and so on, are read from the RAM 303.

As forms for stamps made by the stamp-making apparatus 1, a large number of different forms in different shapes have been provided in the ROM 302. For example, a personal name stamp, a larger business stamp, a smaller business stamp, a square stamp, an address stamp, and so on (see FIGS. 21A to 23D and FIGS. 31A to 33) have been prepared in the ROM 302. In addition, vertical/horizontal alignment can be specified for any of these stamps, and an illustration can be also included therein as a part of a stamp image.

When a predetermined button 22a in the push button group 22 is depressed in the character/symbol-input processing (step S15 in FIG. 17), options for specifying a style form is displayed on the display 24, allowing the user to select any option by switching the display by the cursor/conversion key 32. For the above-mentioned style form specification, when the execution key 31 of the operating dial 23 is depressed at the time "Form" is displayed on the display 24, one of options "Personal Name Stamp", "Business Stamp", . . . "Form Not Specified", "Specification Terminated", and so on is displayed on the display 24, wherein one of them is selected by the cursor/conversion key 32 and the execution key is depressed, followed by displaying the contents of the selected option, for example, a character size, vertical/horizontal alignment, a layout method for each of items to be input, and so on.

When desired contents within these options are displayed by the operating dial 23 and the execution key 31 is depressed, the selected contents of the option is further displayed. Subsequently, selections are made at respective levels of hierarchy until the lowest level to set respective specified items. For returning from a lower level to an upper level of the hierarchy, the option "Specification Terminated" may be selected and the execution key 31 be depressed at each level. Alternatively, the push button group 22 may be provided with a predetermined function key for returning to an upper level.

After a form has been specified, an input prompt associated with the specified form is retrieved from the ROM 32 and displayed on the display 24, as illustrated in FIGS. 21A to 21D. Specifically, text data can be input after an input prompt "[" of respective displayed input items in these figures, for example, "Family Name [", "Name [", in FIG. 21A, "Pictograph [", "First Line [", "Second Line [" and so on in FIG. 22B. This allows the user to readily input appropriate data for associated items without referencing any operation manual or the like.

In this event, when an input prompt for the first item is displayed on the display 24, desired stamp characters are input through the character input key 33 and the cursor/conversion key 32 and determined after confirmed on the display 24, whereby text data for the first item can be input. As the text data has been input for the first item, an input prompt of the next item is displayed. Thus, text data can be subsequently input for required items in a similar manner. The input text data are stored in the RAM 303 for use in generating basic image data for a stamp image, later described.

A form may include, for example, previously input text data, or a default image or the like, which may be generally used, after the input prompt "[" for any item in order to facilitate an input manipulation. For example, "You Have Done It!" is displayed after the input prompt "[" in FIG. 22C, so that this string may be determined if it is to be used as it is, or this string may be partially modified and used. It is therefore possible to largely facilitate the input manipulation as well as to reduce a work time.

In addition, when "Form Not Specified" is selected or when "Form" is not selected, a character size, vertical/horizontal alignment, layout, or other specifications such as a frame or the like can be selected in a free form at the same hierarchy as "Form". The character size may be selected, in a similar manner to the foregoing form specification, from a predetermined range displayed on the display 24 (see, for example, "Form" illustrated in FIG. 31C) for each line in accordance with the number of input lines, depending on the type of a used stamp body A and the kind of a selected form. Alternatively, the character size may also be specified by directly input the number of dots. The vertical/horizontal alignment may also be selected or specified in a manner similar to the form specification. The layout may also be specified from "Front Alignment", "Centering", "Rear Alignment", and "Uniform Layout", one of which is displayed on the display 24 for selection (see FIG. 24 and FIGS. 31A–31C). The frame may also be specified from a range in accordance with the type of a used stamp body A and the kind of a selected form (see FIGS. 32 to 33).

Since the input prompt is displayed on the display 24 after each of the specifications mentioned above has been set even when "Form Not Specified" is selected, desired stamp characters are input by manipulating the character input key 33 and the cursor/conversion key 32 and determined after confirmed on the display 24, thereby making it possible to input text data representing characters, numbers, figures such as illustrations, and so on, which are the basis for forming a stamp image.

When the style form specification acquisition (step S32) is terminated, the basic image positioning processing (step S50) is executed for generating basic image data for a stamp image, the character layout processing (step S60) is next executed for appropriately laying out characters constituting the stamp image over a plate-making image area, and the decorative image positioning processing (step S70) is finally executed for superimposing a frame of a stamp and data for decoration onto the stamp characters to generate target stamp image data, followed by the termination of the plate-making image-forming processing (step S90). Then, based on the stamp image data generated in the decorative image positioning processing (step S70), subsequent processing in FIG. 17, i.e., the printing processing (step S19) and the exposure processing (step S20) are executed to make a desired stamp. Now, the basic image positioning processing (step S50), the character layout processing (step S60), and the decorative image positioning processing (step S70) of the plate-making image-forming processing (step S16) will be described in detail in this order.

Figure 19:
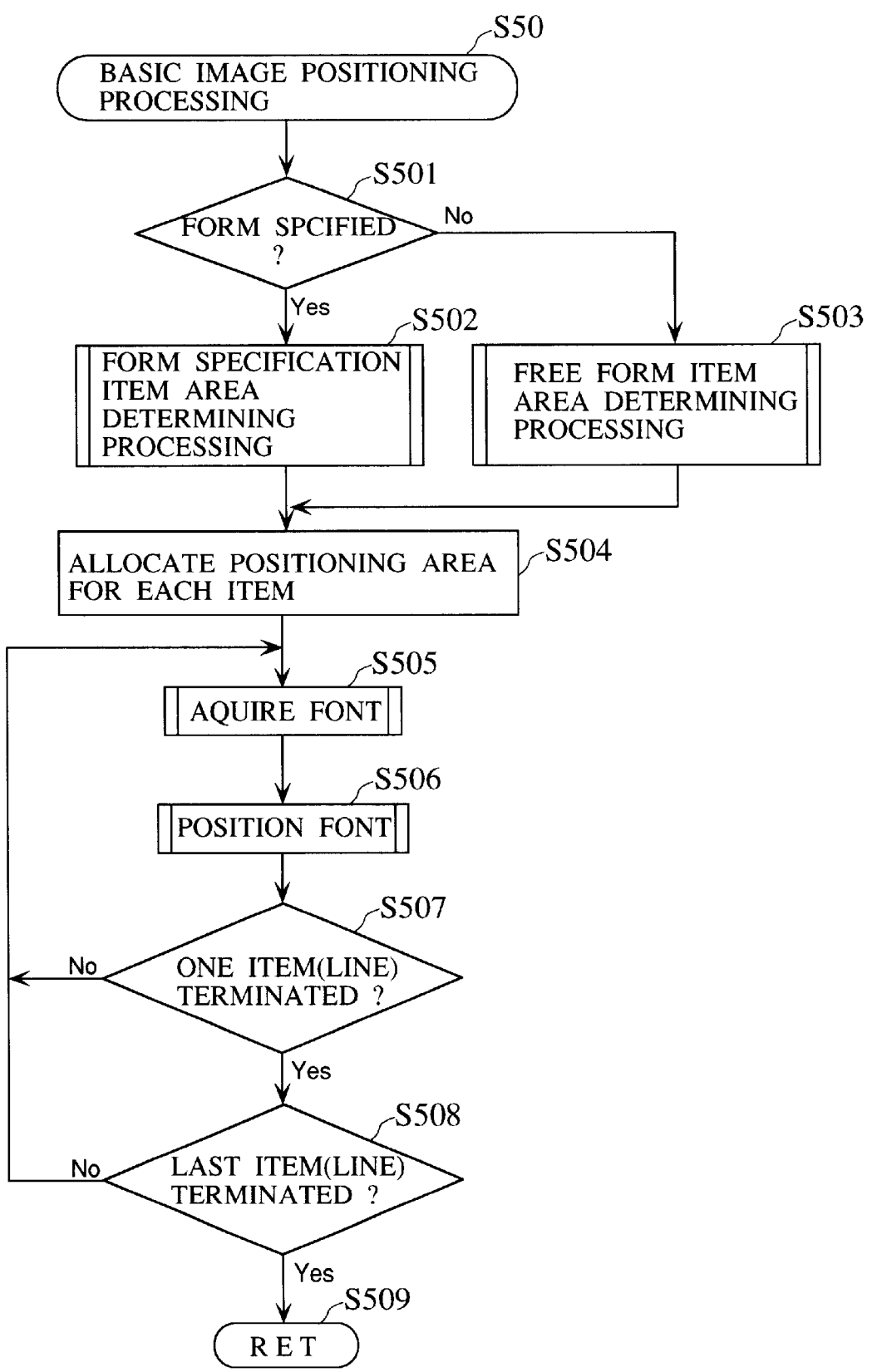
FIG. 19 is a flow chart illustrating a procedure of steps executed for basic image positioning processing shown in FIG. 18.

When the basic image positioning processing (step S50) is started, it is first determined whether or not a form is specified (step S501) as illustrated in FIG. 19. When a form is specified (step S501:Yes), form specification item area determining processing is next executed (step S502).

Figure 20:
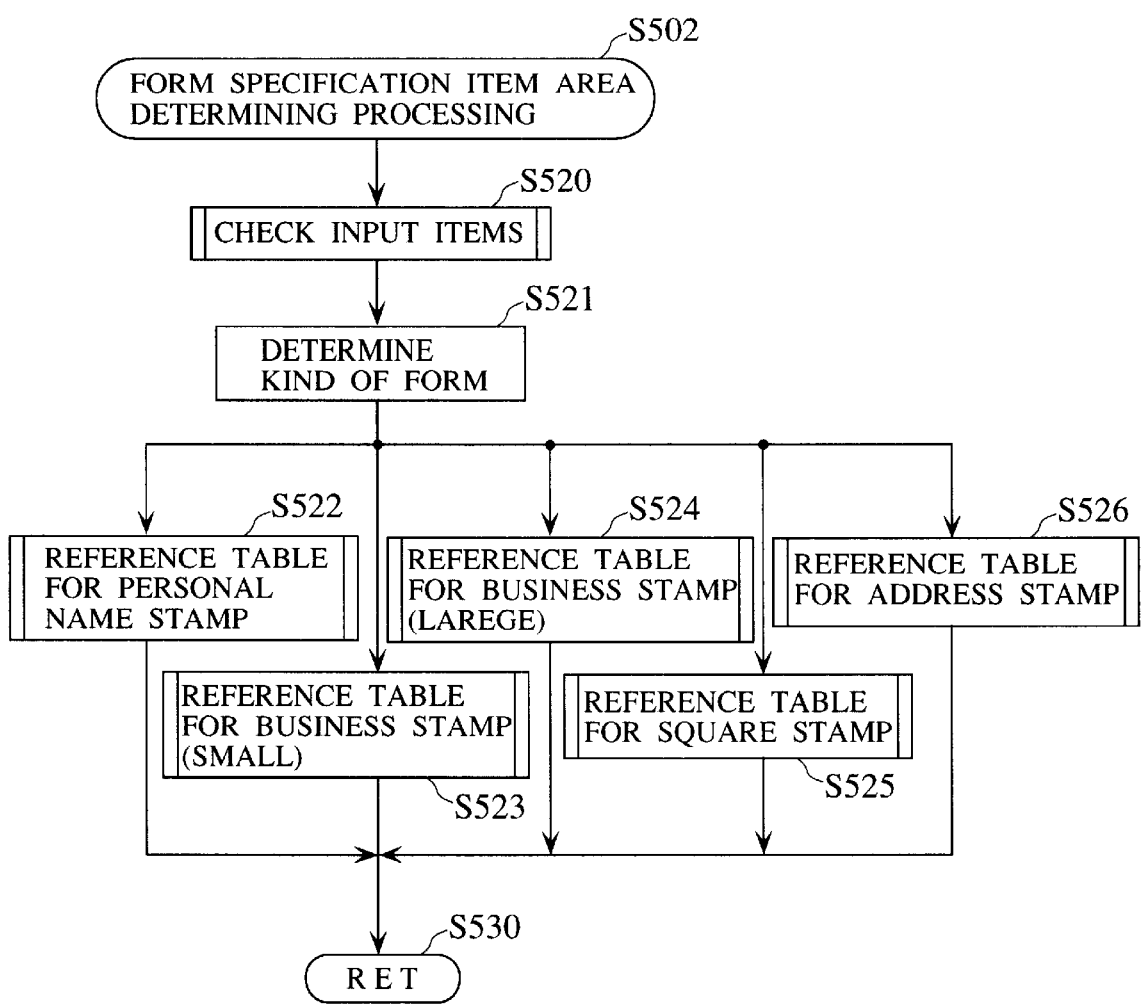
FIG. 20 is a flow chart illustrating a procedure of steps executed for form specification item area determining processing in FIG. 19.

In the form specification item area determining processing (step S502), input items are first checked (step S520) as illustrated in FIG. 20. Assume that characters and so on are to be input for a plurality of items including address, name, telephone number, and so on, for example, as an address stamp illustrated in FIG. 23. In this case, if items not specified are left as blank and a stamp image is formed based on item data including blank portions without any modification, the components or items of the image are laid out in an ill-balanced state, and an unbalanced image having a low ratio of the area of the stamp image to the entire area of the stamp, i.e., a low black ratio will be produced.

To avoid this inconvenience, the input item check (step S520) in FIG. 20 checks which items are left blank, if text data has not been input for any item in the character/symbol-input processing (step S15), i.e., actually if no character or the like was input for the item in response to the input prompt thereof and a blank state was determined by the execution key 31 (hereinafter referred to as "empty input"). For example, in contrast with a stamp illustrated in FIG. 23B in which characters are input for all of five items, i.e., "postal number", "address 1", "address 2", "name", and "telephone number" shown in FIG. 23A, a stamp in FIG. 23C has empty "address 2", while a stamp in FIG. 23D has empty "telephone number". It should be noted that while ruled lines partitioning the respective items and frames in FIGS. 23A to 23D are actually superimposed on respective stamp images as a part thereof after they have been created in the decorative image positioning processing (step S70), later described, they are included in these figures for purposes of facilitating the view of the figures and the understanding of the processing described herein.

For positioning images of the respective items in a well balanced state even if a stamp includes any empty input item, as illustrated in FIGS. 23C and 23D, a variety of tables for specifying the form stored in the ROM 302 is referenced (steps S522 to S526), depending on the kind of the form and a number of empty inputs (step S521), to retrieve defined data for the size and position of an area allocated for each item, followed by the termination of the form specification item area determining processing (step S530). The above-mentioned tables define not only the size and position of the area for each item when characters are input for all the items but also the size and position of the area for each item, when a certain item is empty input, in correspondence to the respective items. Thus, if a stamp image includes an empty input for any item, data defining the sizes and positions are retrieved for extending areas for the remaining items.

Turning back to FIG. 19, when the form specification item area determining processing (step S502) is terminated, positioning areas for the respective items are next allocated in accordance with the determined sizes and positions of areas for the items (step S504: see FIGS. 31A to 31C). Then, font data corresponding to text data such as input characters and so on are retrieved one by one from the ROM 302 (step S505) and positioned in the respective positioning areas (step S506). The foregoing processing is repeated until the last font data in the associated item is positioned in the corresponding positioning area (step S507). Further, the processing up to step S507 is repeated for all the input items (step S508) to generate basic image data which is stored in the RAM 302, followed by the termination (step S509) of the basic image positioning processing (step S50).

On the other hand, if it is determined that a form is not specified (S501: NO) in the aforementioned form specification determination (step S501), free form item area determining processing is executed (step S503). In this processing, the number of lines of input text data is regarded as the number of items, and the size and position of an area for each item are determined in accordance with character sizes specified for the respective lines. Since the number of dots is determined for stamp image data depending on the type of a used stamp body A (step S31 in FIG. 18), the sizes and positions of areas for the respective items can be readily determined by referencing the tables based on the character sizes of the respective lines, in a manner similar to the form specification item area determining processing (step S502). Alternatively, in this event, the item areas may be directly calculated from the character sizes of the respective lines.

In accordance with the foregoing basic image positioning processing (step S50), as components associated with each item are input and no components are input for an unnecessary item, the unnecessary item is automatically deleted and other item areas are extended. Then, the components input in other item areas, i.e., characters representing address, name, telephone number, and so on and figures such as illustrations are enlarged, for example, as illustrated in FIGS. 23C and 23D, so that an image with a high black ratio is produced. Consequently, the respective images in the defined areas are well balanced in the entire stamp image.

In addition, since the stored tables also include sizes and positions employed, when any empty input item is deleted, for the remaining item areas, these data may only be retrieved to readily determine areas for the remaining items. Furthermore, input characters and figures are appropriately scaled in accordance with respective determined sizes of areas.

Each form in the aforementioned form specification includes an option "Maintain Empty Input" in options at a lower level of the hierarchy. When this option is selected and specified, areas for empty input items are maintained as they are without deleting the empty input items. When the same form is specified next time, contents previously input in other items remain stored, so that data may be input only for the item which has been previously left empty for completing the input operation. Stated another way, the deletion of an empty input item can be disabled in order to maintain the empty input item as a portion in which data can be written at any later time. In addition, the positional relationship between the items may only be modified without enlarging characters.

Figure 24:
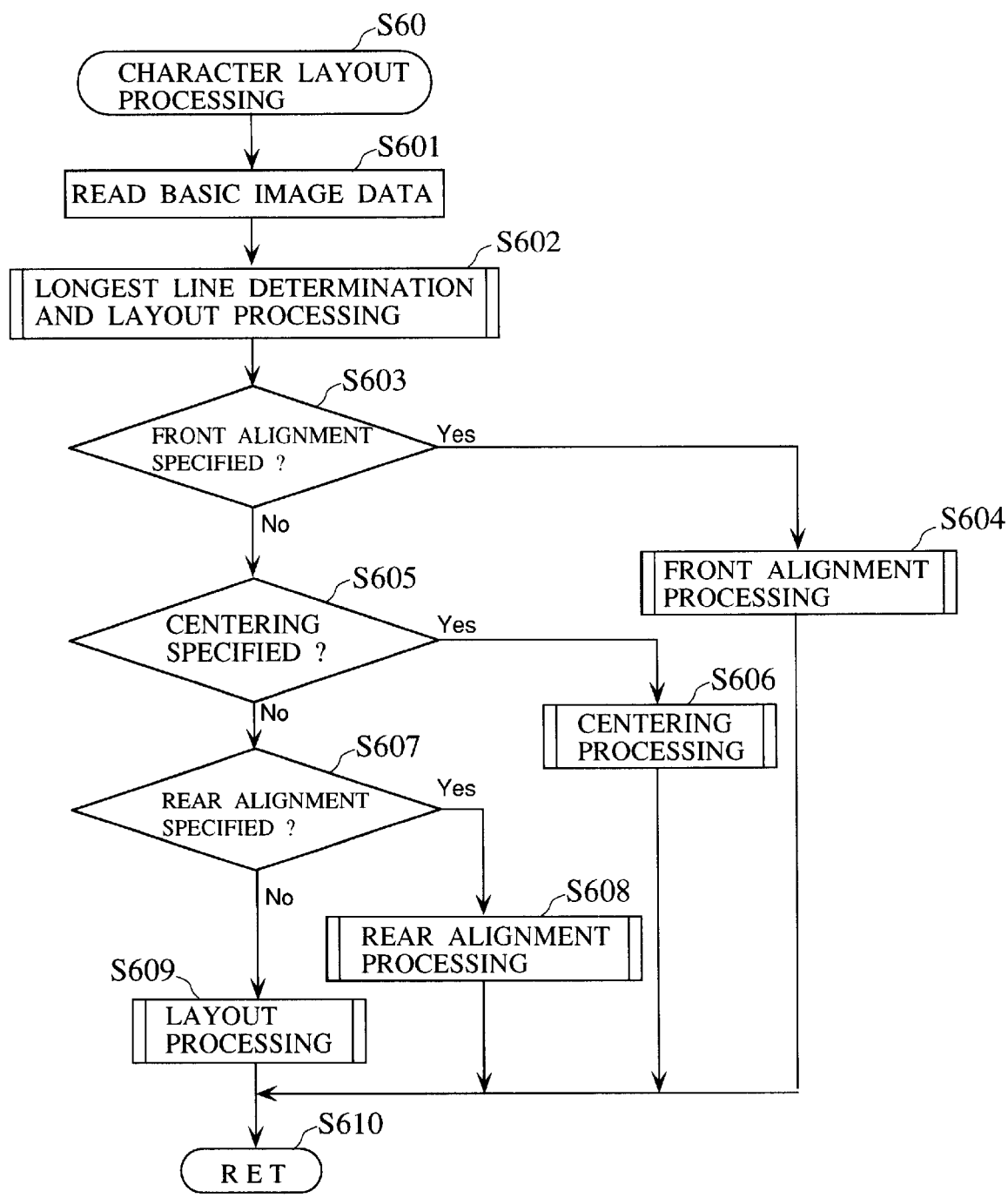
FIG. 24 is a flow chart illustrating a procedure of steps executed for the character layout processing in FIG. 18.

When the basic image positioning processing (step S50) is terminated, the character layout processing (step S60) is executed as illustrated in FIG. 18. As the character layout processing (step S60) is started, basic image data is first read from the RAM 302 (step S601) as illustrated in FIG. 24.

For example, as illustrated in FIG. 28A, when input characters such as letters and so on, i.e., data for forming an image indicate "文字幅普通" ("Normal Character Width") on the first line and "普通処理" ("Normal Processing") on the second line, the text data are simply arranged in two line, as illustrated in FIG. 28A. An area for a plate-making image in stamp image data is determined by the type of a set stamp body A, whether or not a form is specified, whether or not a stamp frame is used, and so on (see FIGS. 31A to 31C) in the basic image positioning processing (step S50). Referring to FIGS. 31A and 31B, a distance AF indicates the maximum width of an area over which input characters can be laid out for each stamp type, and a distance BE indicates the width of an area over which input characters can be laid out when characters for a front portion of a frame (the left ends in the figures) and characters for a rear portion of the frame (the right ends in the figures), as illustrated in FIGS. 32 and 33, are allocated in an area between A and B and an area between E and F, respectively. FIG. 31C lists the widths of the character areas available to respective types of stamp bodies for Type A and Type B, by way of example. FIG. 31B shows the widths of areas, modified by the character layout processing, over which characters can be laid out. In FIG. 31B, distances BC and DE respectively indicate margins which may be produced by the character layout processing. Therefore, a distance CD is the actual width of the area available for laying out characters.

If no form is specified, a plate-making available area, denoted by A, can be represented by a rectangular contour as illustrated in FIG. 28B. For providing a stamp with a frame, stamp frame data as illustrated in FIG. 28C is positioned around the plate-making image area of FIG. 28B by the decorative image positioning processing (step S70), later described. In this case, the entire stamp image data has a size which covers the stamp frame data, as illustrated in FIG. 28D.

When a stamp image has no frame, or even when a stamp has a frame but portions of enlarged characters overflowing from the frame may be deleted, the entire stamp image data area may be used as an area for a plate-making image. However, the following description will be made in conjunction of a stamp image having a frame which is to be positioned in the plate-making image area of FIG. 28B for providing clear views and facilitating the understanding. Related figures also illustrate stamps having a frame. Further, while uniform layout, centering, rear alignment, and so on, later described, may be specified as default in the aforementioned basic image positioning processing (step S50), the following description will be advanced on the assumption that basic image data as illustrated in FIG. 28E is retrieved (read) simply commensurate with input text data, i.e., characters in all lines are arranged in a front alignment configuration.

Since a positioning area is reserved for each item when a form is specified, respective processing for the character layout, herein after described, is executed for each item. However, several items may be treated as a plurality of lines belonging to the same item as "address 1" and "address 2" in the aforementioned FIG. 23. Further, "スカイハイツ・・・" ("sky-Heights . . . ") may be rear aligned, front aligned, or centered, as illustrated in FIG. 23.

When the basic image data read (step S601) is terminated, longest line determination and layout processing (step S602) is next executed, as illustrated in FIG. 24.

Figure 25A:
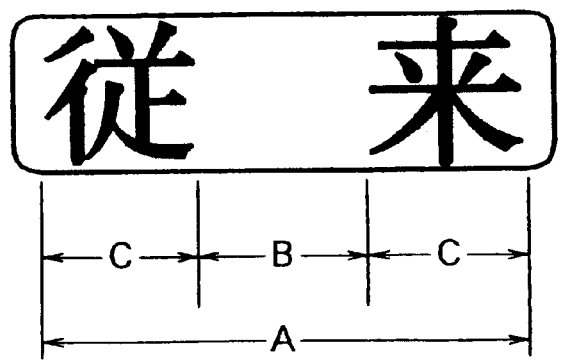
FIGS. 25A to 25C are diagrams for showing how stamp characters on one line are laid out.

First, a layout method for a stamp image having only one line, i.e., the longest line will be described with reference to FIGS. 25A to 25C. Text data for each item in a specified form also falls under this one-line text data if it is not treated as plural lines, i.e., in normal processing. In FIGS. 25A to 28G and FIG. 43, reference letter A designates a plate-making available area width; B a spacing between characters; C a character width; D a margin; and E an actual layout area width.

For example, when two characters are to be laid out, a conventional layout method will produce a stamp image having an extremely wide spacing B between the characters, as illustrated in FIG. 25A. Since the resulting stamp image includes blank portions larger than image portions, it is lack of profoundness and gives a poor impression. In contrast, the character layout processing (step S60) of the present invention lays out the characters such that the margin D satisfies B>D>0 with respect to the inter-character spacing B (in FIG. 25A, D=B/2), so that the characters are laid out in a well balanced manner without allowing only the inter-character spacing B to be extremely extended, as illustrated in FIG. 25B.

Figure 25B:
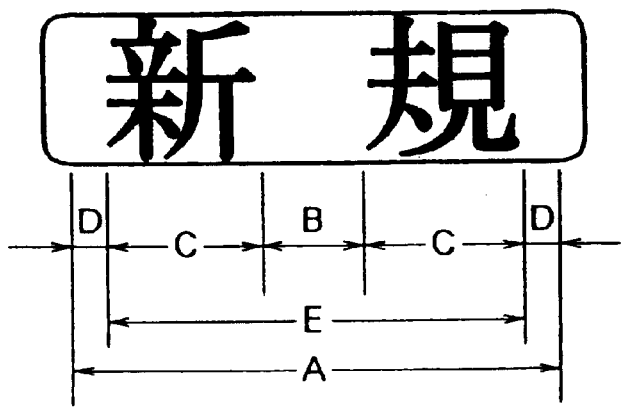

Although the ratio D/B of the margin D to the inter-character spacing B is determined to be D/B=1/2 in the foregoing example of FIG. 25B, the ratio is not limited to this particular value but the user can select any ratio D/B from predefined values such as 9/10, . . . , 6/5, 4/5, 4/3, 2/3, 1/2, 7/10, . . . , 2/5, and so on in the stamp-making apparatus 1 by manipulating a predetermined button 22a.

Figure 26A:
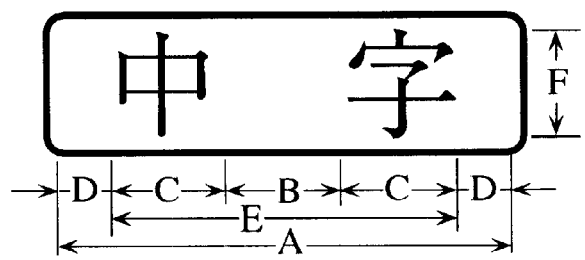
FIGS. 26A to 26C are diagrams, similar to FIGS. 25A to 25C, for showing stamp characters having different area ratios of character portions to blank portions.
Figure 26B:
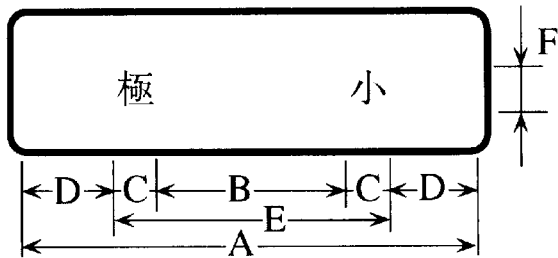
Figure 26C:
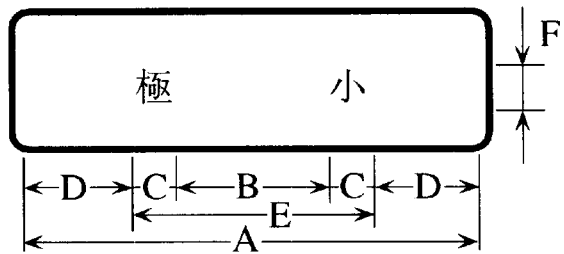

Explaining more specifically, the ratio D/B giving a good-looking stamp image depends on the area ratio of character portions to blank portions of a plate-making available area, for example, as illustrated in FIGS. 26A to 26C. That is, FIG. 26A illustrates a character string "中字" ("middle size letter") laid out with the ratio D/B equal to 1/2, where the characters have a large height F and a large width C so that the area ratio of the character portions to the blank portions is large. If the same ratio D/B=1/2 is applied to a character string "極小" ("extremely small") with a small area ratio for laying out this character string in the same manner, blank portions are prominent and a central portion looks bare in the resulting stamp image, as illustrated in FIG. 26B. Since the stamp-making apparatus 1 can freely set the ratio D/B as mentioned above, the ratio D/B may be set, for example, to 5/6 for the character string "極小" to lay out the characters in a well balanced manner, as illustrated in FIG. 26C, even if the character string has a small area ratio.

Figure 27A:
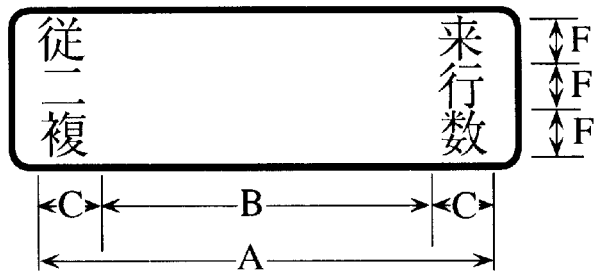
FIGS. 27A and 27B are diagrams, similar to FIGS. 26A to 26C, showing layouts of stamp characters on multiple lines.
Figure 27B:
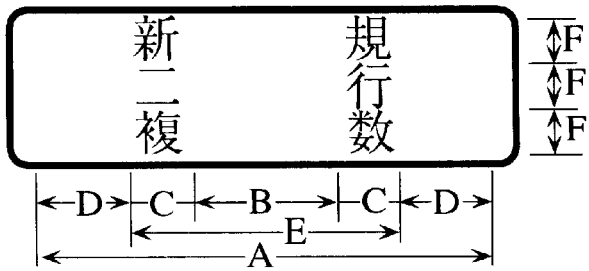

The foregoing description is also applied to an item having more than one line. Assume herein that three character strings are to be laid out in three lines, for example, as illustrated in FIGS. 27A and 27B. In this case, since the character height F is small, a character width C well balanced with this character height F will result in a small area ratio of character portions to blank portions, particularly the number of characters in a line is few. If a conventional layout method were used for this case, a central portion of a resulting stamp image would look bare as illustrated in FIG. 27A. On the other hand, the character layout processing (step S60) of the present invention can appropriately set the margins D in accordance with the area ratio to adjust the margins D to an appropriate width, thereby making it possible to lay out the characters in three lines in a well balanced manner without allowing the central spacing between the characters to be excessively wide or without giving a bare impression.

In the alternative to the setting method described above, numbers of dots may be directly input for setting the inter-character spacing B and the margin D, or a numerical value less than one may be input to freely set the ratio D/B which seems to give a good-looking stamp image, within the range of B>D>0. Further alternatively, a reference table based on experimental data may be prepared and stored in the stamp-making apparatus 1 such that the ratio D/B can be automatically set to give a good-looking stamp image by referencing the table based on the type of a used stamp body A, a character size, the number of characters, and so on.

While the ratio D/B may be set to a variety of character strings used in the following description in a similar manner as described above, the following description will be advanced on the assumption that the ratio D/B is set to 1/2, i.e., D=B/2, that is, in the same manner as the example illustrated in FIG. 25, for purposes of clarifying features of respective layout methods described below and facilitating the understanding thereof.

Specifically, assume that a character string consisting of five characters "文字幅普通" on the first line of the afore-mentioned FIG. 28E is laid out by the layout method described above. When the width A of a plate-making available area is equal to 40 (A=40) and a character width C is equal to six (C=6), the margin D is calculated to be one (D=B/2=1) with the inter-character spacing B equal to two (B=2). The relationship between the dimension of the actual layout area E and the type of the stamp body A, when the present layout method is applied, is based on the number of dots when image data is represented by a dot matrix, as illustrated in FIGS. 31B and 31C.

In this event, for example, when the plate-making available area width A is equal to 41 (dots) (A=41) and the number of characters F is equal to 5 (F=5), a quotient derived by (A−C×F)/F=(41−6×5)/5=11/5, i.e., two is set to the inter-character spacing B (B=2), and the residue of the division, i.e., one (dot) is allocated to the first inter-character spacing. With this operation, the inter-character spacings B are defined to be 3, 2, 2, and 2 (dots) in the direction in which the stamp characters are read (from the left in the figure). Similarly, with the plate-making available area width A equal to 42 (A=42), the inter-character spacing B are defined to be 3, 3, 2, and 2. In practice, since the actual layout area E is much larger than the example of FIG. 25C, as illustrated in FIG. 31C, a difference of one dot between the inter-character spacings is small enough to be ignored. Thus, according to the layout method of the present invention, stamp characters can be readily laid out over any plate-making available area. In addition, each character can be laid out without making the difference in inter-character spacing discernible.

Next, the longest line determination and layout processing (S602) will be described for the case as illustrated in FIG. 28E where a plurality of lines of text data (two lines in FIG. 28E) are input. The longest line is determined by calculating the aforementioned equation applied to an item only including one line, i.e., (A−C×F)/F to derive a quotient G for each line, and finding the line having the smallest quotient G, where A represents a plate-making available area width; C each character width; and F the number of characters. Then, the quotient G calculated for the longest line is applied to a reference inter-character spacing B, and the layout processing is executed for the longest line as illustrated in FIG. 28F, in a manner similar to the aforementioned case of the item including only one line.

Since the basic image data illustrated in FIG. 28E has a stamp frame in a simple form and a whole plate-making available area covering the plurality of lines surrounded by a rectangular contour, the longest line can also be determined simply by counting the number of characters on each line. However, a variety of stamp frames have been prepared in the stamp-making apparatus 1 in accordance with the types of the stamp bodies A, as illustrated in FIGS. 32 and 33, and some stamp frames include decorations in any portion or portions around character strings. For example, there may be a case where although the number of characters in a string is small, decorations included in a certain portion of a frame reduces an actual character layout area. In addition, since the stamp-making apparatus 1 is capable of providing each character with decorations such as shading, emphasis, italic, outline, reverse, and so on, in a manner similar to an ordinary word processor or the like, such decorations may also cause a reduction in an actual area available for laying out characters even if only a small number of characters are included in a character string.

In these cases, for example, the second line of the basic image data, on which four characters "普通処理" ("Normal Processing") are laid out, may have a smaller quotient G than the first line of the same on which five characters "文字幅普通" ("Normal Inter-Character Spacing") are laid out. Stated another way, an inter-character spacing in the longest line determined based only on the number of characters may not be applied to another line as a reference inter-character spacing B. On the other hand, if the line having the smallest quotient G is determined to be the longest line, the selection of the longest line can be made more appropriately than the determination of the longest line simply from the number of characters. In addition, by utilizing the selected line as a basis for allocating spacings and margins, a well-balanced layout of characters can be accomplished for a stamp image having a plurality of lines of characters and hence for a stamp surface having a plurality of lines of characters.

As illustrated in FIG. 24, when the longest line determination and layout processing (step S602) is terminated, it is next determined whether or not front alignment is specified (step S603). If the front alignment is specified (step S603: Yes), front alignment processing (step S604) is executed. Conversely, if the front alignment is not specified (step S6 03:No), it is next determined whether or not centering is specified (step S605). If the centering is specified (step S605: Yes), centering processing (step S606) is executed. Conversely, if the centering is not specified (step S605: No), it is next determined whether or not rear alignment is specified (step S607). If the rear alignment is specified, rear alignment processing (step S608) is executed. Conversely, if the rear alignment is not specified, uniform layout processing (step S609) is executed, followed by the termination (step S610) of the layout type-dependent processing (step S60).

Figure 25C:
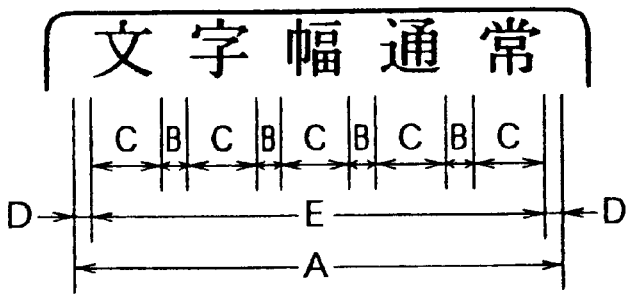

As illustrated in FIG. 28G, the front alignment processing (step S604) in FIG. 24 lays out a character string on the first line of FIG. 28F, i.e. z,4 ("Normal Character Width") which is the longest line and a character string on the second line of FIG. 28F, i.e., "普通処理" ("Normal Processing") which is not the longest line, such that the front end of the first letter "普" of the second line is aligned with the front end of the first character 文 of the longest line when an inter-character spacing between the respective four characters of "普通処理" is adjusted to be equal to the reference inter-character spacing B which is an inter-character spacing between the respective five characters of "文字幅普通" In this event, for example, the inter-character spacing B of the character string "普通処理" is set to two for all the three spacings when the plate-making available area width A of the first line "文字幅普通" is equal to 40 (A=40), and to 3, 2 and 2 from the first spacing when the width A is equal to 41 (A=41), as illustrated in FIG. 25C.

It should be noted that when A=41, the difference of one dot in spacing is small enough to be ignored, as mentioned above, so that even if all the inter-character spacings are made equal to two, the resulting character strings, uniformly laid out, would not give an unbalanced impression. As can be also seen in FIG. 29B illustrating another example of character strings laid out by the front alignment processing (step S604), the front alignment processing (step S604) is effective for a stamp image having a plurality of lines or a stamp surface having a plurality of lines in laying out the lines such that the front ends of the respective lines are aligned with each other and inter-character spacings are equal on the respective lines, whereby an orderly and good-looking layout can be provided.

As illustrated also in FIG. 28G, the centering processing (step S606) in FIG. 24 lays out the character string on the first line of FIG. 28F, i.e., "文字幅普通" ("Normal Character Width") which is the longest line and the character string on the second line of FIG. 28F, i.e., "普通処理" ("Normal Processing") which is not the longest line, such that the center of the character string "普通処理" having an inter-character spacing adjusted to be equal to the reference inter-character spacing B of the longest line, as is the case of the front alignment processing, is aligned with the center of the character string "文字幅普通" on the longest line. FIG. 29C illustrates another example of an stamp image provided by the same centering processing. As can be seen in FIGS. 28G and 29C, the centering processing (step S606) can lay out a stamp image having a plurality of lines (a stamp surface having a plurality of lines) so as to align the centers of the respective lines with each other, whereby a stable and good-looking layout can be provided.

As illustrated further in FIG. 28G, the rear alignment processing (step S608) lays out the character string "文字幅普通" and the character string "普通処理" ("Normal Processing") such that the rear end of the last character "理" of the character string "普通処理" is aligned with the rear end of the last character "通" of the longest line. FIG. 29D illustrates another example of a stamp image provided by the rear alignment processing. As can be seen in FIGS. 28G and 29D, the rear alignment processing (step S608) is effective for a stamp image having a plurality of lines (a stamp surface having a plurality of lines) in laying out the respective lines such that the rear ends of the lines are aligned with each other and inter-character spacings are equal on the lines, whereby an orderly and good-looking layout can be provided.

The uniform layout processing (step S609) regards the actual layout area width E (see FIG. 25C) calculated for the string of five characters "文字幅普通" on the first line as a conventional plate-making available area A also for the string of four characters "普通処理" on the second line, and performs uniform layout as before (see FIG. 25A). Stated another way, the character string "普通処理" is laid out such that it has the same character string length E as the longest character string "文字幅普通" and the front ends and the rear ends of the two character strings are aligned with each other. FIG. 29A illustrates another example of a stamp image provided by the uniform layout processing. As can be seen in FIGS. 28G and 29A, the uniform layout processing (step S609) is effective for a stamp image having a plurality of lines (a stamp surface having a plurality of lines) in laying out the respective lines such that all lines have the same character string length, i.e., the front ends and the rear ends of the respective lines are aligned with each other, whereby a stable and good-looking layout can be provided.

The uniform layout processing (S609) also executes character width optimal enlarging processing which is not executed in the aforementioned other processing. Therefore, the character width optimal enlarging processing will be described below with reference to FIGS. 30A to 30D. FIG. 30A illustrates an example of a stamp surface having a plate-making available area width A equal to 41 (A=41) used for explaining the layout method in FIG. 25C, and FIG. 30B illustrates an example of a stamp image resulting from the enlarging processing, executed on the stamp surface of FIG. 30A, described presently. FIG. 30C illustrates an entire stamp surface of a stamp which does not undergo the enlarging processing, and FIG. 30D illustrates an entire stamp surface of the stamp which has undergone the enlarging processing.

In the character width optimal enlarging processing, first a ratio of character portions to blank portions within a frame is calculated. Explained herein is the enlarging processing for enlarging characters within an actual layout area width E (=39) except for left and right margins D. For example, in the exemplary stamp surface of FIG. 30A, a total number of dots of character portions is calculated to be 30 (6×5=30), while a total number of dots of blank portions is calculated to be nine (39−30=9 or 3+2+2+2+9). Thus, the ratio of the character portions to the blank portions is 30/9= 10/3=3,333 . . . Assuming herein that a threshold value for determining whether or not the enlarging processing is executed is preliminarily set to four, the currently calculated ratio is below the threshold value so that the enlarging processing should be executed. Then, an enlargement ratio is next determined.

Since the number of dots of the character portions is 30 with respect to the total area width of 39 dots, the characters could be enlarged up to 1.3 times (39/30=1.3). However, the 1.3 times enlargement would eliminate inter-character spacings. Therefore, if a minimum of one dot is allocated for each inter-character spacing, a total of four dots should be reserved for the inter-character spacings. The enlargement ratio is accordingly calculated as (39−4)/30=35/30=7/6= 1.166 . . . Based on this enlargement ratio, the character width C is determined to be seven (C=7). FIG. 30B illustrates a stamp image in which characters are enlarged in accordance with the foregoing enlarging processing and laid out by the uniform layout processing. It should be noted that the threshold value serving as criteria for determining whether or not the enlarging processing is entered and a condition for determining whether or not enlargement is possible may be set in accordance with the types of stamp bodies and actual circumstances. In addition, a variety of techniques may be incorporated in the character width optimal enlarging processing. For example, an automatic enlargement ratio may be previously determined using a default value such that selecting means may be provided for allowing the user to select a mode in which the enlarging processing is automatically executed, if enlargement is possible, and a mode in which an enlargement ratio can be arbitrarily input.

The advantage of the character width optimal enlarging processing is apparent from a comparison of FIG. 30C with FIG. 30D. Specifically, the character width optimal enlarging processing can reduce blank portions in a stamp image and make stamp characters profound without producing awkward font in the respective characters of the stamp image. In addition, by executing the enlarging processing based on the numbers of dots of the plate-making available width, character width, and inter-character spacing, the ratio of character portions to blank portions can be readily calculated, and respective characters can be appropriately enlarged in width based on the calculated ratio.

Figure 34:
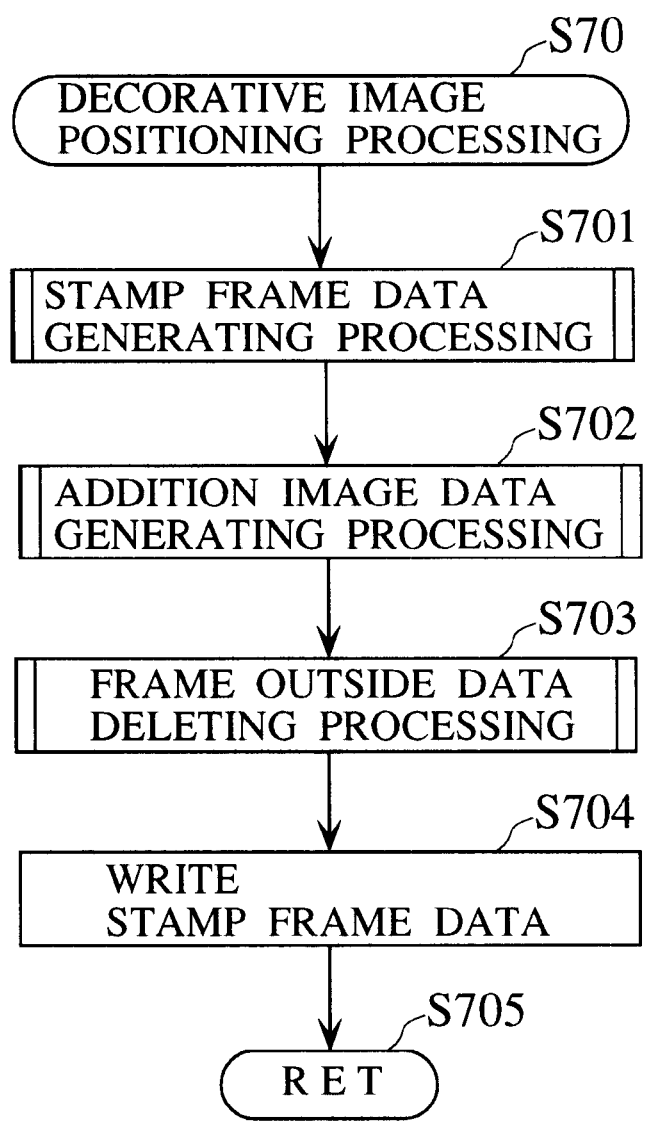
FIG. 34 is a flow chart illustrating a procedure of steps executed for decorative image positioning processing in FIG. 18.

When the character layout processing (step S60) is terminated, the decorative image positioning processing (step S70) is next executed as illustrated in FIG. 18. As the decorative image positioning processing (step S70) is started, stamp frame data generating processing (step S701) is first executed as illustrated in FIG. 34.

Figure 35A:
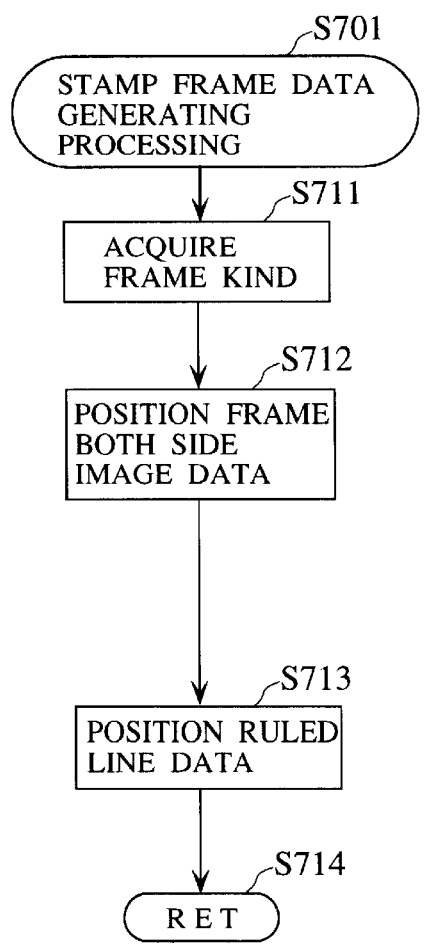
FIG. 35A is a flow chart illustrating a procedure of steps executed for stamp frame data generating processing in FIG. 34.
Figure 35B:
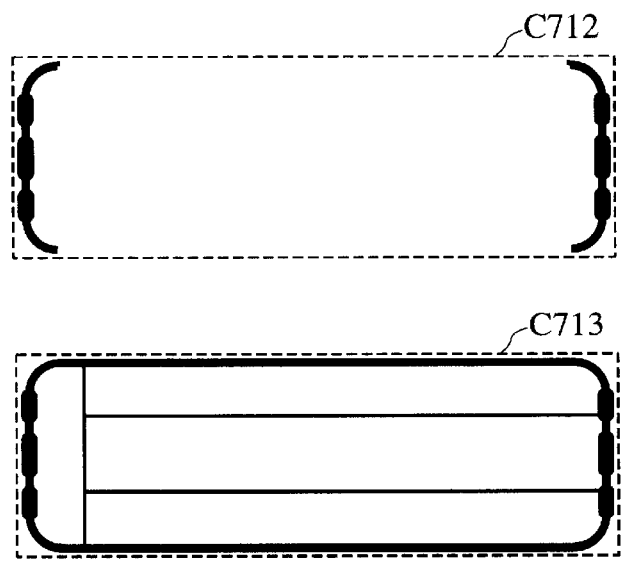
FIG. 35B illustrates examples of image data corresponding to steps in the flow chart of FIG. 35A.

In the stamp frame data generating processing (step S701), the type of stamp frame specified in the character/symbol-input processing (step S15) in the aforementioned FIG. 17 is first retrieved, and the kind of a ruled line is determined for forming the stamp frame (step S711), as illustrated in FIG. 35A. Specifically, since the stamp-making apparatus 1 has prepared a wide variety of ruled line data stored in the ROM 303 as line element parts for forming an image of a stamp frame so as to permit the user to select one from a wide variety of stamp frames as illustrated in FIGS. 32 and 33, the kind of the specified stamp frame and the kind of the ruled line corresponding to the stamp frame are first determined (step S711) in the stamp frame data generating processing (step S701).

When the frame kind acquisition (step S711) is terminated, image data representing both ends of the stamp frame is positioned in an area having the same size as the aforementioned stamp image data area (see FIGS. 28A to 28D and FIGS. 31A to 31C) (step S712). Stated another way, ruled line data forming images of both ends of the stamp frame is retrieved and positioned (step S712). An example of image data generated by this positioning processing (for an address stamp) is image data C712 illustrated in FIG. 35B. It is assumed hereinafter that processing (Sxxx) and corresponding image data Cxxx are indicated in combination, unless otherwise noted. For example, in FIGS. 35A and 35B, the image data C712 corresponds to the frame both end image data positioning (step S451).

Figure 39:
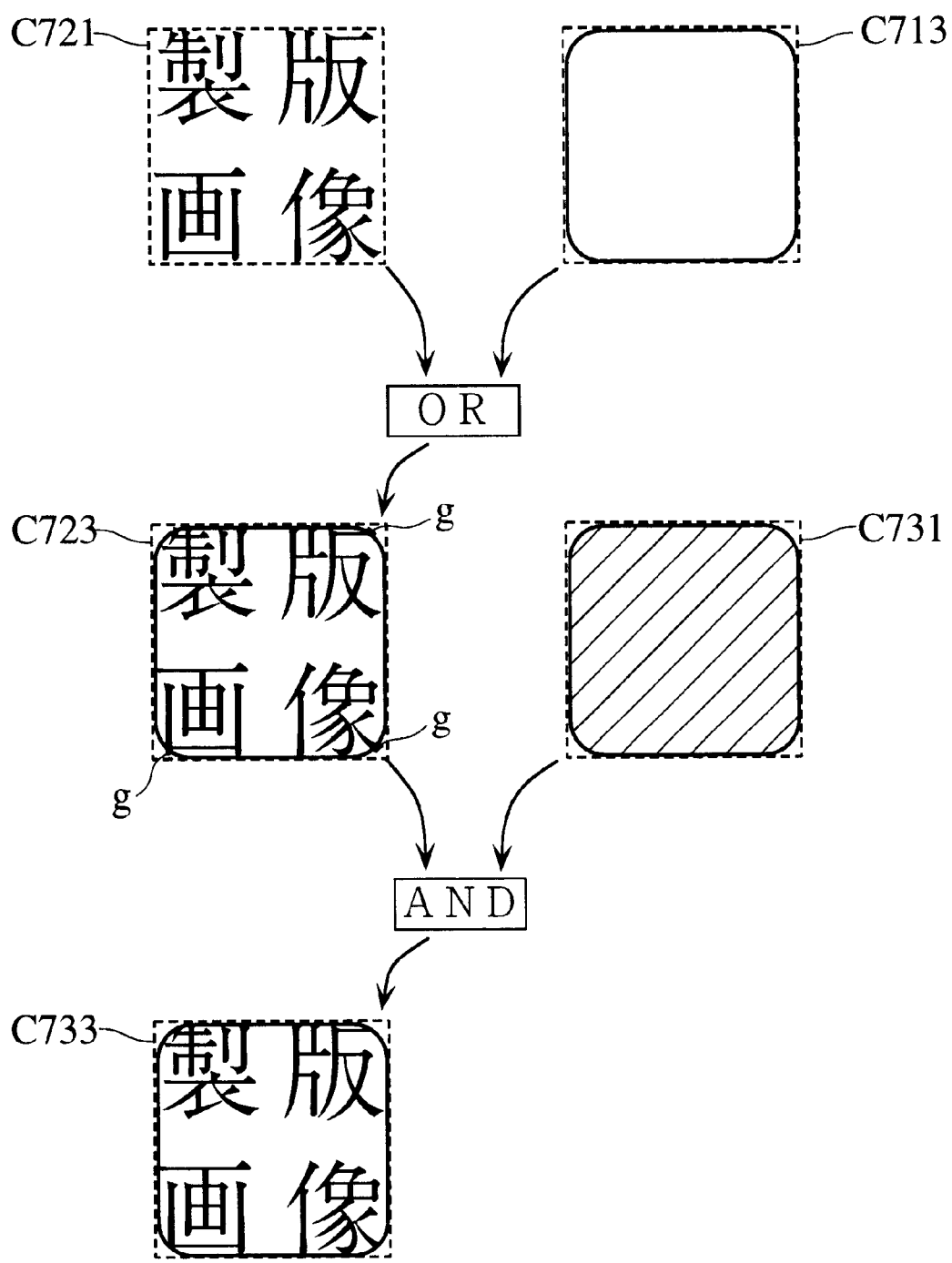
FIG. 39 illustrates another example of image data corresponding to the flow charts of FIGS. 35A, 37A and 38A.

When the frame both end image data positioning (step S712) is terminated, the images of both ends are connected by ruled lines to complete the frame, and remaining ruled line data are subsequently positioned (step S713), followed by the termination of the stamp frame data generating processing (step S714). It should be noted that FIG. 39 illustrates an example of the stamp frame data generating processing when applied to a square stamp. In the following description, refer to FIG. 39 simultaneously.

Figures 36A, 36B:
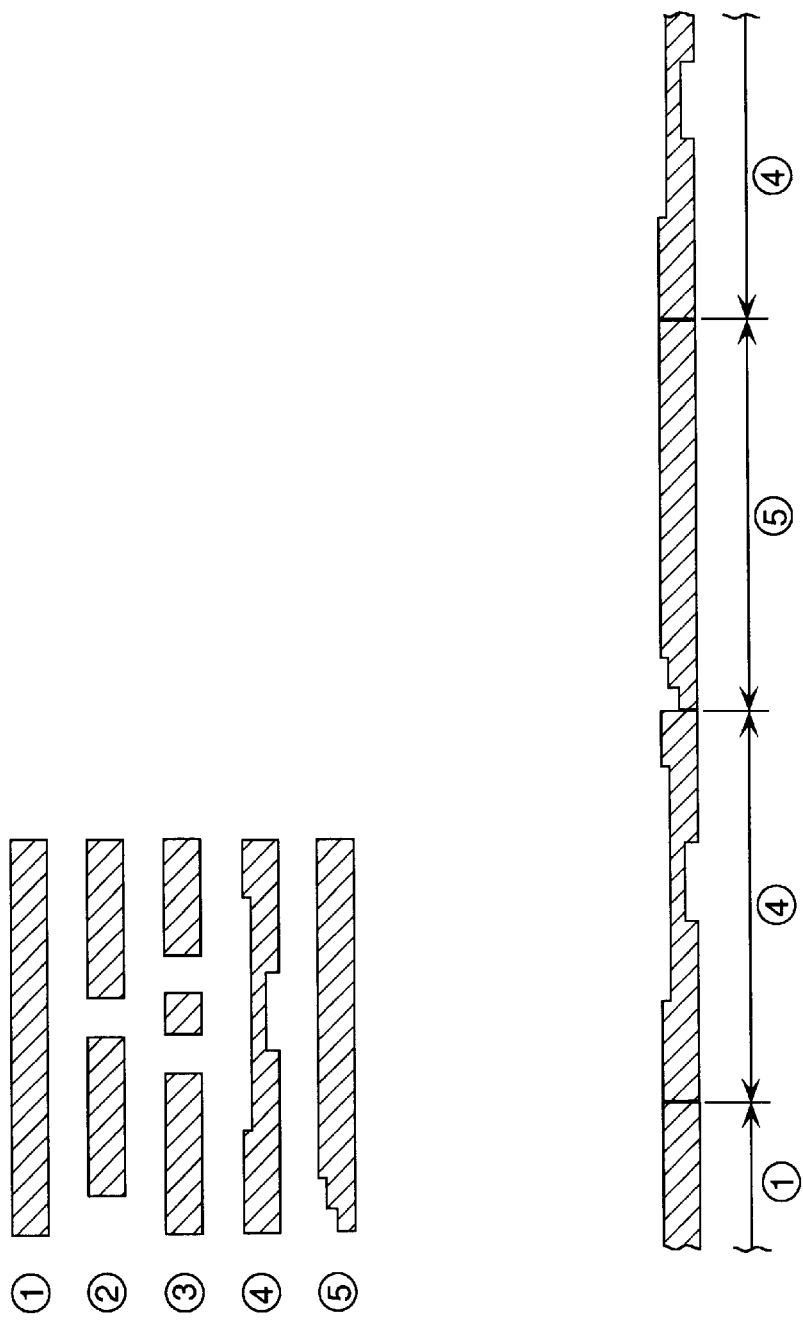
FIGS. 36A and 36B illustrate examples of ruled line data serving as ruled line parts.

The stamp-making apparatus has prepared a variety of ruled line data stored in the ROM 302 for use as parts of ruled lines as illustrated, for example, in FIGS. 36A and 36B. ① in FIG. 36A is ruled line data which may serve as a part a solid line or an intermittent line 3. Similarly, ② is ruled line data serving as a part of a dotted line; ③ a one-dot-chain line; ④ an intermittent line 1; ⑤ an intermittent line 3; and so on. These ruled line data may be sequentially arranged on image data to generate stamp frame data. For example, a normal solid line may be formed by connecting a plurality of the ruled line data ①; a dotted line may be formed by connecting a plurality of the ruled line data ②; and a one-dot-chain line may be formed by connecting a plurality of the ruled line data ③. In addition, the intermittent lines, for providing a particular feature for each stamp, may be formed by randomly selecting the ruled line data and connecting them such as ①, ④, ⑤, ④, ①, ③, ④, ①, . . . , and so on, for example, as illustrated in FIG. 36B.

As described above, since the stamp-making apparatus 1 stores ruled lines for forming stamp frames as line element parts not as entire frames, the user may retrieve various required ruled line data and freely connect the retrieved ruled line data to create a variety of frames. Also, since the stamp frame data is generated in an area having the same size as the stamp image data area, i.e., since the stamp frame data is generated to match the dimension of a particular stamp-making area corresponding to the type of a stamp body A selected for plate-making, a variety of stamps can be made suitable for features of the respective types of stamp bodies A, for example, a square stamp, a circular stamp, a vertically elongated stamp, a horizontally elongated stamp, and so on.

When the stamp frame data generating processing (step S701) is terminated, sum image data generating processing (step S702) is next executed as illustrated in FIG. 34.

In this sum image data generating processing (step S702), the basic image data C721 (after step S610 in FIG. 24) is first read (step S721), Here, the read basic image data C721 has undergone various processing up to the character layout processing (step S60) as illustrated in FIGS. 37A and 37B. Next, the stamp frame data C722 (corresponding to C713) generated in the foregoing stamp frame data generating processing (step S701) is read (step S722), and a logical OR of mutually corresponding dots of the read data is taken (step S723) to generate sum image data, followed by the termination of the sum image data generating processing (step S724).

Specifically, in the logical OR operation (step S723), a logical OR operation is performed on mutually corresponding dots of the basic image data C721 and the stamp frame data C722, wherein the basic image data C721 has the image represented in the form of positive dots corresponding to protrusions and blank portions of the image represented in the form of negative dots corresponding to recesses, and the stamp frame data C722 has the image of the stamp frame represented in the form of positive dots corresponding to protrusions and regions inside and outside of the stamp frame represented in the form of negative dots corresponding to recesses in a similar manner. In this way, the sum image data C723 having the stamp frame superimposed on the stamp image is generated, wherein the positive dots have priority over the negative dots. It is therefore appreciated that a framed stamp image can be readily formed, and accordingly a stamp having a framed stamp image can be readily made.

When the sum image data generating processing (step S702) is terminated, the frame outside data deleting processing (step S703) is next executed as illustrated in FIG. 34.

Figure 38A:
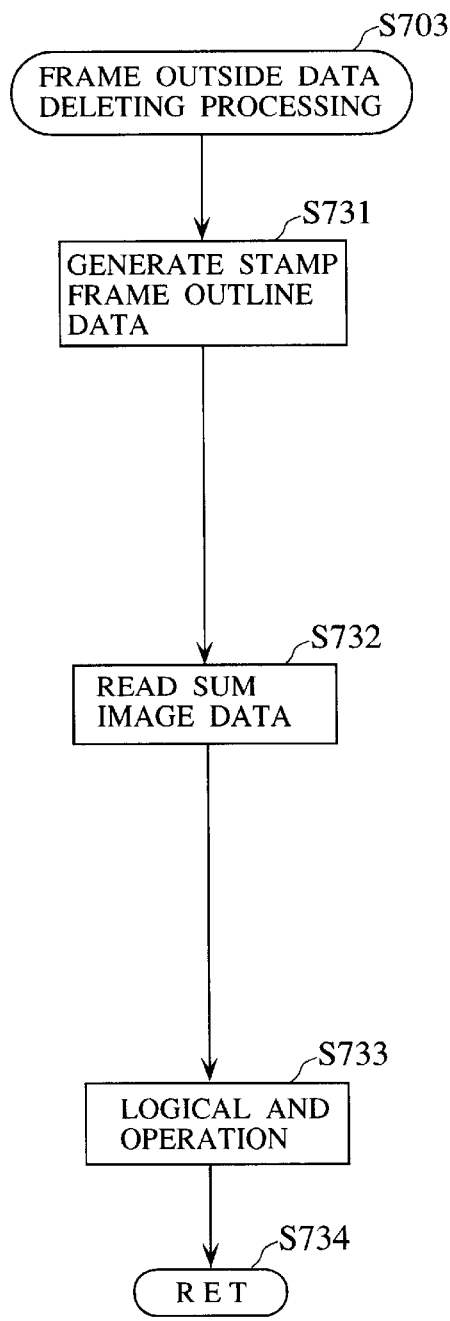
FIG. 38A is a flow chart illustrating a procedure of steps executed for frame outside data deleting processing in FIG. 34.
Figure 38B:
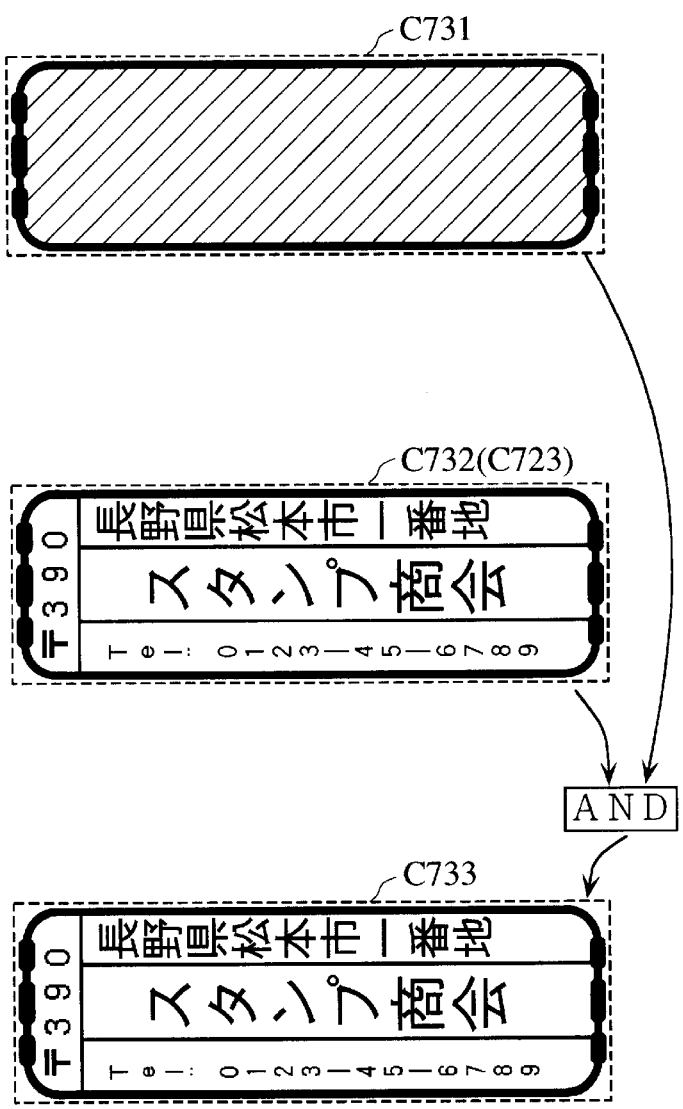
FIG. 38B illustrates examples of image data corresponding to steps in the flow chart of FIG. 38A.

The frame outside data deleting processing (step S703) first generates stamp frame outline data C731 having the stamp frame and a portion inside thereof represented in the form of positive dots and a portion outside of the stamp frame represented by negative dots (step S731), as illustrate in FIGS. 38A and 38B. Next, the sum image data C732 (corresponding to the data C723) generated in the aforementioned sum image data generating processing (step S702) is read (step S732), and a logical AND operation is performed on corresponding dots of the stamp frame outline data C731 and the sum image data C732 (step S723) to delete an image portion overflowing from the stamp frame (corresponding to an image portion q in FIG. 39) to generate stamp image data C733, followed by the termination of the frame outside data deleting processing (step S734).

Stated another way, the logical AND operation (step S733) takes a logical AND of mutually corresponding dots of the sum image data C732 and the stamp frame outline data, where the sum image data C732 has the image represented in the form of positive dots and other blank portions represented by negative dots, to superimpose the images of both data, with the negative dots having priority over the positive dots, whereby the image portion overflowing from the stamp frame is deleted. In this way, it is possible to readily form a stamp image in which a desired image will never overflow from a frame.

When the frame outside data deleting processing (step S703) is terminated, the generated stamp image data (corresponding to the stamp image data S734 in FIGS. 38B and 39) is next written into and stored in the RAM 302 (step S704), followed by the termination (step S705) of the decorative image positioning processing (step S70). Thus, the plate-making image-forming processing (step S16) is completed (step S90) as illustrated in FIG. 18, and the subsequent processing, i.e., the printing processing (step S19) and the exposure processing (step S20) in FIG. 17 are executed based on the stamp image data generated in the plate-making image-forming processing (step S16), thereby making a desired stamp.

As described above, since the stamp-making apparatus 1 makes a plate after generating stamp image data corresponding to an entire plate-making region of a stamp image, respective image segments can be positioned in a well balanced manner in the stamp image, the image segments be adjusted to increase the black ratio, and a complicated stamp image be formed. In addition, since collective printing processing can be carried out when the stamp image data is retrieved to make a stamp, not only high speed processing but also plate-making at a constant speed can be realized, whereby the ink ribbon C serving as a screen stably runs so that wrinkles and so on can be prevented from being produced on the ink ribbon C.

Further, the stamp image data including a stamp frame, generated by the decorative image positioning processing (step S70), enables respective image segments to be positioned in a well balanced manner, and the sizes of the respective image segments to be enlarged to the very limit of the stamp frame. In addition, various techniques such as the deletion of a portion from a large image to accommodate the image within a frame and so on makes it possible to make a good-looking stamp image having a high black ratio and readily discernible character(s) and/or figure(s).

While in the aforementioned decorative image positioning processing (step S70) in FIG. 34, the basic image data is superimposed on the stamp frame data (step S702) after the latter is generated (step S702), the sum image data may be generated by directly superimposing ruled line data for a stamp frame on the basic image data as it is generated. Also, while the processing in FIG. 34 is such that an image portion in the basic image data overflowing from a stamp frame is deleted (step S703) after the sum image data is generated (step S702), the image portion in the basic image data overflowing from the stamp frame may be previously deleted before it is superimposed on the stamp frame data to generate stamp image data representative of a framed image. Either or both of these processes may be employed in the decorative image positioning processing (step S0).

Figure 40:
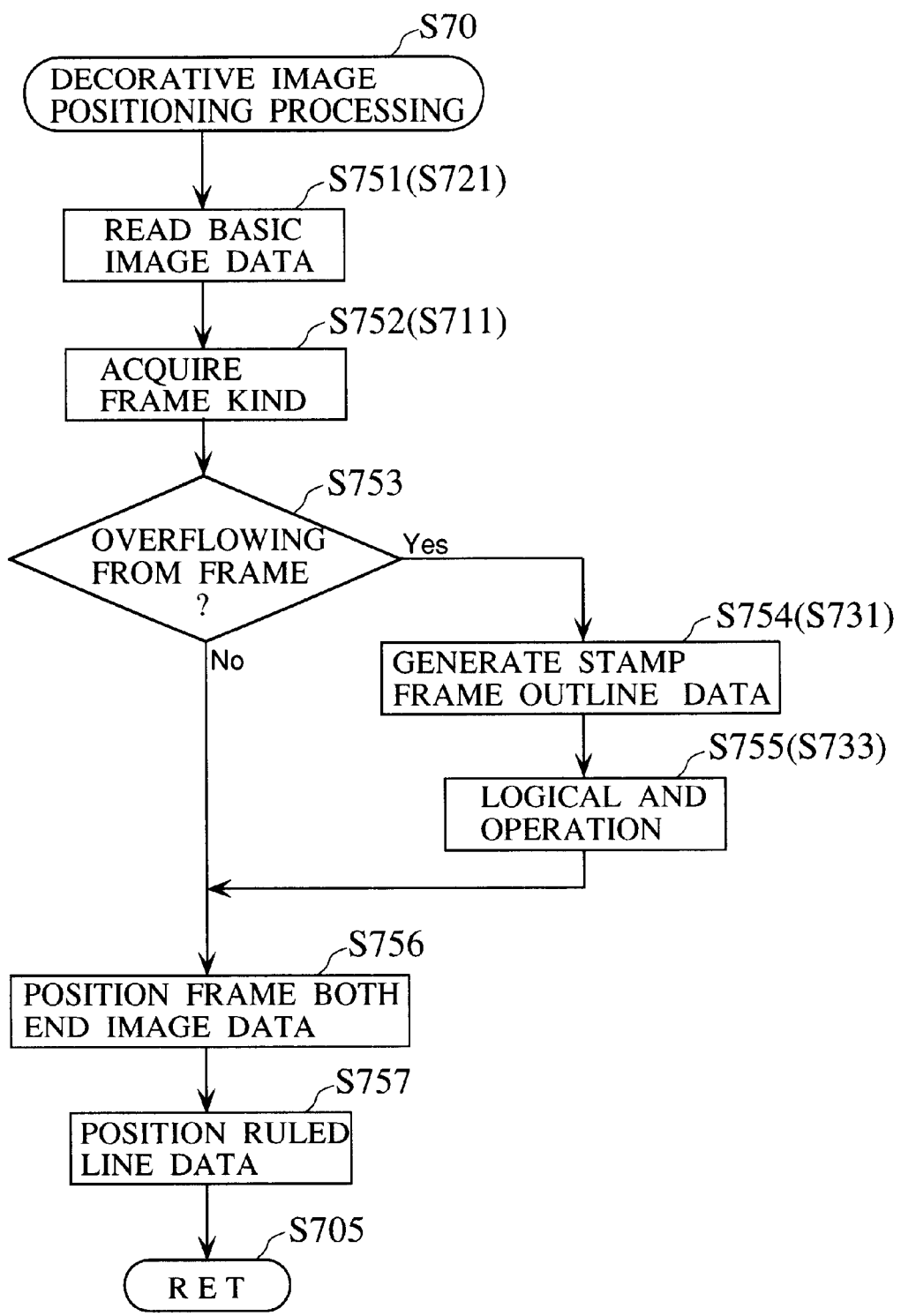
FIG. 40 is a flow chart, similar to FIG. 34, illustrating another procedure for the decorative image positioning processing.
Figure 41D:
FIGS. 41A to 41D illustrate examples of image data corresponding to the flow chart of FIG. 40.
Figure 41C:
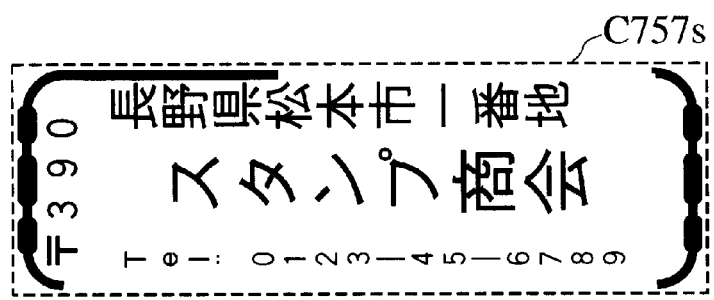
Figure 41B:
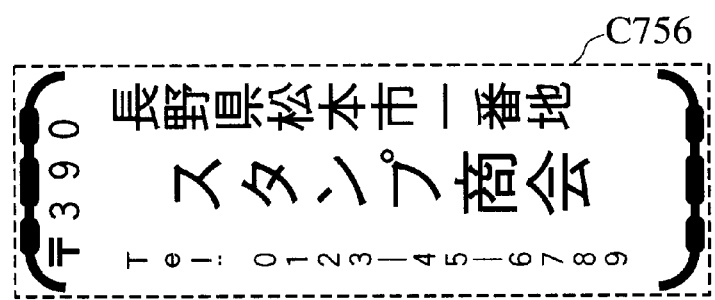
Figure 41A:
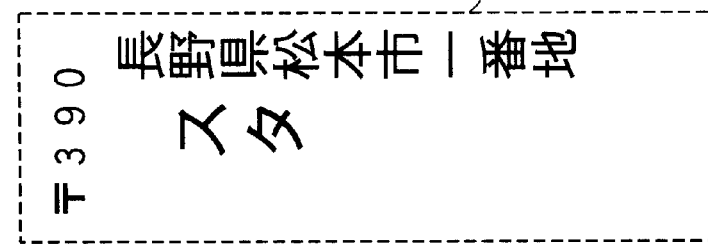
Figure 42:
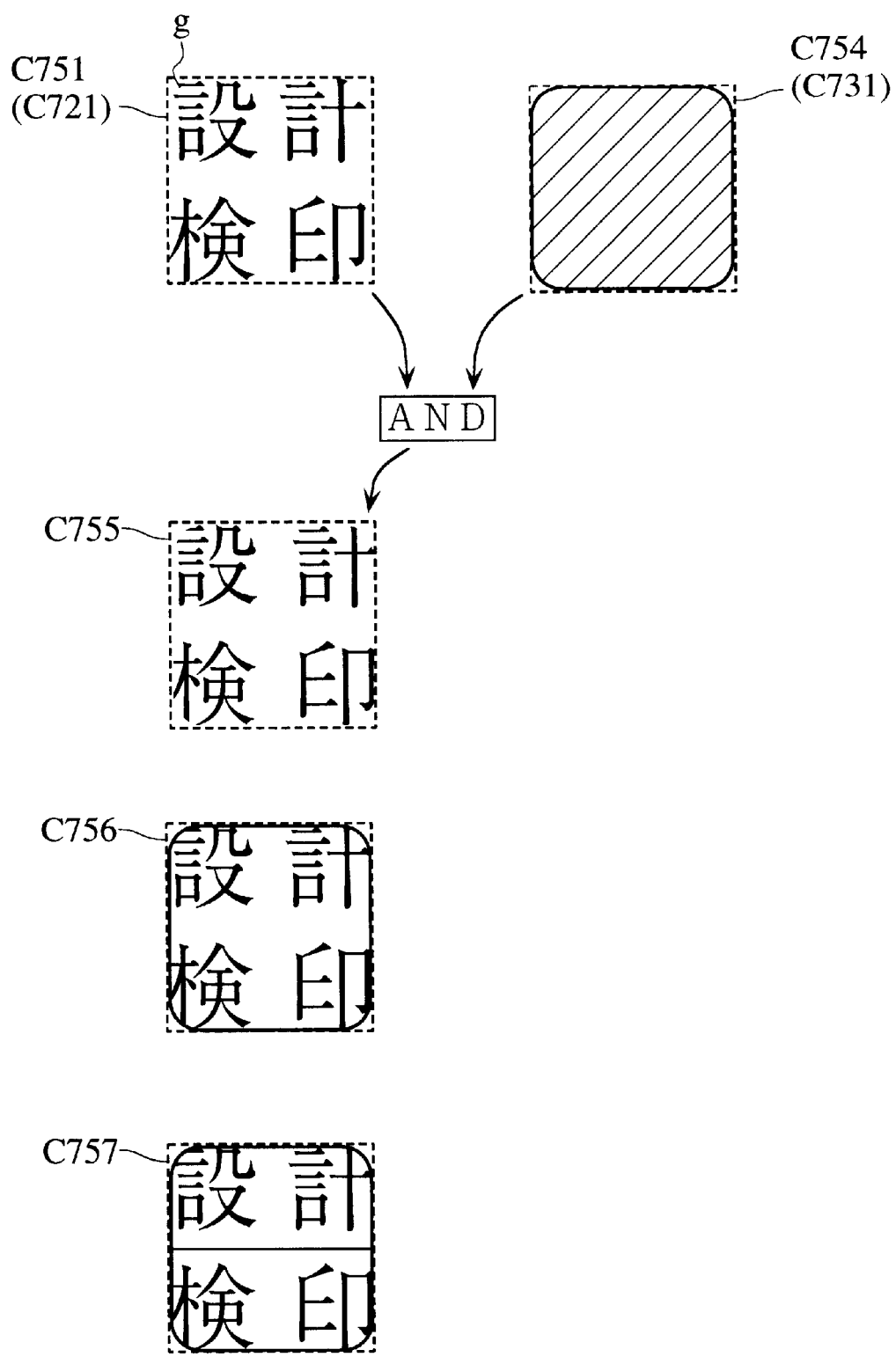
FIG. 42 are diagrams, similar to FIGS. 41A to 41D, illustrating another example.
Figure 43:
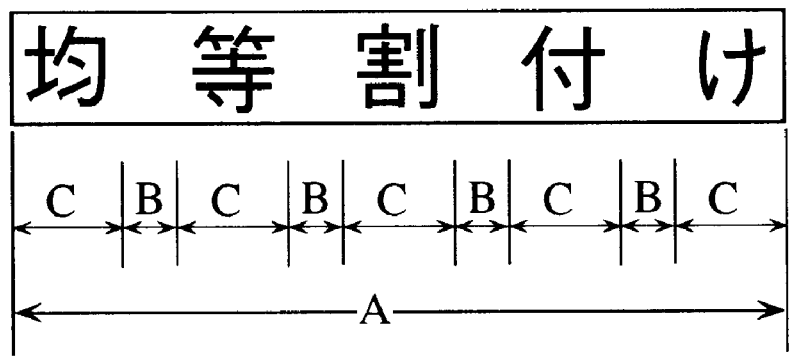
FIG. 43 is a diagram illustrating a conventional character layout method.

FIGS. 40 to 42 illustrates an example of the decorative image positioning processing (step S70) which employs both of the two processes mentioned above. As illustrated in FIGS. 40 to 42, in this decorative image positioning processing (step S70), basic image data is first read (step S751), and then a kind of frame is acquired (step S752) in a manner similar to the frame kind acquisition (step S711) in FIG. 35A. Thereafter, it is determined whether or not the basic image data C751, before it is subjected to decoration such as the addition of a frame or the like, has a portion which overflows from the decorative frame (step S753). This determination may be readily made by checking whether or not positive dots of the basic image data C751 exist outside of the specified stamp frame, for example, by taking a logical OR or the like of corresponding dots in both the data outside of the frame.

If the basic image data C751 does not have any portion overflowing from the frame (step S753: No), ruled line data are positioned at both ends of an area of the basic image data C751 (step S756) in a manner similar to the frame both end image data positioning (step S712) in FIG. 35. Next, the images on both sides are first connected by ruled line data (see an image C757s in FIG. 41) to form the frame, and remaining ruled line data are subsequently positioned (step S757) to define areas for respective items, followed by the termination of the decorative image positioning processing (step S70).

Conversely, if the basic image data C751 has a portion overflowing from the frame (step S753:Yes), stamp frame outline data C754 as illustrated in FIG. 42 is next generated (step S754), in a manner similar to the stamp frame outline data generation (step S731). Then, a logical AND operation is performed on the stamp frame outline data C754 and the basic image data C751 to delete an image portion expected to overflow from the stamp frame (corresponding to a portion q in FIG. 42) from the basic image data C751 to generate outside deleted image data C755 (step S755). Then, ruled line data are positioned at both ends of an area of the outside deleted image data (step S756), and the remaining ruled line data are positioned to define areas for respective items, followed by the termination of the decorative image positioning processing (step S70).

As described above, the decorative image positioning processing (step S70) illustrated in FIG. 40 enables a framed stamp image to be readily formed without any portion of the desired stamp image overflowing from a frame, similarly to the decorative image positioning processing (step S70) in FIG. 34, thereby making it possible to produce various effects such as the ability to make a good-looking stamp image having a high black ratio and readily discernible character(s) and/or figure(s).

While the present invention has been specifically described with reference to a preferred embodiment thereof, it will be understood by those skilled in the art that a variety of modifications may be made without departing from the spirit and scope of the present invention.

What is claimed is:

1. A character layout method for laying out, for printing, each of characters included in each character string on one or a plurality of lines within a generally rectangular frame having a predetermined width in a direction, comprising the steps of:

laying out said each character so as to satisfy B>D>0, where D is the dimension of a margin between an edge of said frame and a character at an end of said string, and B is the dimension of an inter-character spacing between adjacent characters; and printing the frame of laid out characters.

2. A character layout method according to claim 3, wherein said margin dimension and said inter-character spacing dimension are adjusted in accordance with an area ratio of character portions to blank portions within said frame.

3. A character layout method for laying out each of characters included in each character string on one or a plurality of lines within a generally rectangular frame having a predetermined width in a printing direction, comprising the step of:

laying out said each character so as to satisfy B>D>0, where D is the dimension of a margin between an edge of said frame and a character at an end of said string, and B is the dimension of an inter-character spacing between adjacent characters;

each of said characters, said margin dimension, and said inter-character spacing dimension being allocated based on the number of dots on a dot matrix; and said inter-character spacing dimension B being defined by a quotient of a calculation (A−C×F)/F, where A is the width of said frame, C is the character width of each of said characters, and F is the number of characters in said character string, and a number of dots corresponding to a residue of said calculation being allocated to the inter-character spacings from the first one in the direction of reading the characters.

4. A character layout method for laying out each of characters included in each character string on one or a plurality of lines within a generally rectangular frame having a predetermined width in a printing direction, comprising the steps of:

enlarging each of said characters in the horizontal direction such that an area ratio of character portions to blank portions within said frame is equal to or lower than a constant value; and laying out the enlarged characters.

5. A character layout method according to claim 4, wherein:

said character portions and said blank portions are allocated based on the number of dot on a dot matrix; and said area ratio is calculated with the number of dots constituting said character portions and the number of dots constituting said blank portions.

6. A character layout method for laying out each of characters included in each character string on each of a plurality of lines within a generally rectangular frame having a predetermined width in a printing direction of each of said lines, comprising the steps of:

selecting the line having the smallest quotient G of a calculation (A−C×F)/F from said plurality of line as the longest line, where A is the width of said frame, C is the character width of each of said characters, and F is the number of characters in said string;

determining an inter-character spacing in said longest line as a reference inter-character spacing dimension B serving as a basis for determining an inter-character spacing between adjacent characters; and laying out characters on said longest line and the remaining line based on said reference inter-character spacing dimension B.

7. A character layout method according to claim 6, wherein:

said longest character is laid out such that the relationship between said reference inter-character space dimension B and the dimension D of a margin between an end of said frame and a character at the end of said string satisfies B>D>0.

8. A character layout method according to claim 6 or 7, wherein:

each of lines except for said longest line includes a character string having a character string dimension E=J×H+K×(H−1)+C×F+B×(F−1) equal to the dimension of a character string on said longest line, and characters in said character string are laid out so as to align one end of either one of a character at the front end and a character at the rear end of said character string with a corresponding end of a character at said one end of the character string on said longest line, where J is a character width, K is an inter-character spacing dimension, and H is the number of characters on said line.

9. A character layout method according to claim 6 or 7, wherein:

each of lines except for said longest line includes a character string having a character string dimension E=C×H+B×(H−1) and an inter-character spacing dimension between adjacent characters equal to said reference inter-character spacing dimension B, where H is the number of characters in said character string and satisfies H≦F, and characters in said character string are laid out so as to align the front end of the first character in said character string with the front end of the first character in the character string on said longest line.

10. A character layout method according to claim 6 or 7, wherein:

each of lines except for said longest line includes a character string having a character string dimension E=C×H+B×(H−1) and an inter-character spacing dimension between adjacent characters equal to said reference inter-character spacing dimension B, where H is the number of characters in said character string and satisfies H≦F, and characters in said character string are laid out so as to align the center position of said character string with the center position of said longest line.

11. A character layout method according to claim 6 or 7, wherein:

each of lines except for said longest line includes a character string having a character string dimension E=C×H+B×(H−1) and an inter-character spacing dimension between adjacent characters equal to said reference inter-character spacing dimension B, where H is the number of characters in said character string and satisfies H≦F, and characters in said character string are laid out so as to align the rear end of the last character in the character string with the rear end of the last character in said character string on said longest line.

12. A character layout apparatus for laying out, for printing, each of characters included in each character string on one or a plurality of lines within a generally rectangular frame, comprising:

a generally rectangular frame having a predetermined width in a printing direction;

character layout means for laying out said each character within the rectangular frame so as to satisfy B>D>0, where D is the dimension of a margin between an edge of said frame and a character at an end of said string, and B is the dimension of an inter-character spacing between adjacent characters; and means for printing the rectangular frame of laid out characters.

13. A character layout apparatus according to claim 14, further comprising margin and spacing adjusting means for adjusting said margin dimension and said inter-character spacing dimension in accordance with an area ratio of character portions to blank portions within said frame.

14. A character layout apparatus for laying out each of characters included in each character string on one or a plurality of lines within a generally rectangular frame, comprising:
- a generally rectangular frame having a predetermined width in a printing direction; and
- character layout means for laying out said each character within the rectangular frame so as to satisfy B>D>0, where D is the dimension of a margin between an edge of said frame and a character at an end of said string, and B is the dimension of an inter-character spacing between adjacent characters;
- each of said characters, said margin dimension, and said inter-character spacing dimension being allocated based on the number of dots on a dot matrix; and
- said character layout means including:
  - quotient dot number calculating means for calculating (A−C×F)/F, where A is the width of said frame, C is the character width of each of said characters, and F is the number of characters in said character string, and for applying the quotient of the calculation to said inter-character spacing; and
  - residue dot number allocating means for allocating a number of dots corresponding to a residue of said calculations to the inter-character spacings from the first one in the direction of reading the characters.

15. A character layout apparatus for laying out each of characters included in each character string on one or a plurality of lines within a generally rectangular frame having a predetermined width in a printing direction, comprising:
- area ratio calculating means for calculating an area ratio of character portions to blank portions within said frame; and
- character enlarging and layout means for enlarging each of said characters in the horizontal direction and laying out the enlarged characters, when said area ratio is equal to or below a constant value, based on the calculation result of said area ratio calculating means.

16. A character layout apparatus according to claim 15, wherein:
- said character portions and said blank portions are allocated based on the number of dot on a dot matrix; and
- said area ratio calculating means calculates said area ratio from a ratio of the number of dots constituting said character portions and the number of dots constituting said blank portions.

17. A character layout apparatus for laying out each of characters included in each character string on each of a plurality of lines within a generally rectangular frame having a predetermined width in a printing direction of each of said lines, comprising;
- longest line determining means for determining the line having the smallest quotient G of a calculation (A−C×F)/F from said plurality of line as the longest line, where A is the width of said frame, C is the character width of each of said characters, and F is the number of characters in said string;
- reference inter-character spacing determining means for determining an inter-character spacing in said longest line as a reference inter-character spacing dimension B serving as a basis for determining an inter-character spacing between adjacent characters;
- longest line character layout means for laying out characters on said longest line based on said reference inter-character spacing dimension B; and
- remaining line character layout means for laying out characters on the remaining line based on said reference inter-character spacing dimension B.

18. A character layout apparatus according to claim 17, wherein:
- said reference inter-character spacing determining means determines said reference spacing dimension B and a reference margin dimension D such that the relationship between said reference inter-character space dimension B and said reference margin dimension D satisfies B>D>0, where said reference margin dimension D is the dimension of a margin between an end of said outline and a character at the end of said string; and
- said longest line character layout means lays out each of said characters on said longest line based on said reference inter-character spacing dimension B and such that said margin dimension is equal to said reference margin dimension D.

19. A character layout apparatus according to claim 17 or 18, wherein:
- said remaining line character layout means includes:
  - layout character string generating means for generating a character string having a character string dimension E=J×H+K×(H−1)+C×F+B×(F−1) equal to the dimension of a character string on said longest line, where J is a character width, K is an inter-character spacing dimension, and H is the number of characters on said line; and
  - uniform character string layout means for laying out characters in said character string so as to align one end of either one of a character at the front end and a character at the rear end of said character string with a corresponding end of a character at said one end of the character string on said longest line.

20. A character layout apparatus according to claim 17 or 18, wherein:
- said remaining line character layout means includes:
  - layout character string generating means for generating a character string having a character string dimension E=C×H+B×(H−1) and an inter-character spacing dimension between adjacent characters equal to said reference inter-character spacing dimension B, where H is the number of characters in said character string and satisfies H≦F; and
  - front alignment character string layout means for laying out characters in said character string so as to align the front end of the first character in said character string with the front end of the first character in the character string on said longest line.

21. A character layout apparatus according to claim 17 or 18, wherein:
- said remaining line character layout means includes:
  - layout character string generating means for generating a character string having a character string dimension E=C×H+B×(H−1) and an inter-character spacing dimension between adjacent characters equal to said reference inter-character spacing dimension B, where H is the number of characters in said character string and satisfies H≦F; and
  - centering character string layout means for laying out characters in said character string so as to align the center position of said character string with the center position of said longest line.

22. A character layout apparatus according to claim 17 or 18, wherein:
said remaining line character layout means includes:
layout character string generating means for generating a character string having a character string dimension $E=C\times H+B\times(H-1)$ and an inter-character spacing dimension between adjacent characters equal to said reference inter-character spacing dimension B, where H is the number of characters in said character string and satisfies $H\leq F$; and
rear alignment character string layout means for laying out characters in said character string so as to align the rear end of the last character in the character string with the rear end of the last character in said character string on said longest line.

23. An image forming method for forming images for areas having a plurality of items for inputting components of said images and defined by inputting components corresponding to the respective items, said method comprising the steps of:
when detecting an item of said plurality of items for which a component is not input, deleting an area for said item;
extending areas for the remaining items by the deleted area; and
enlarging dimensions of components input to said remaining items in accordance with the extended areas.

24. An image forming method according to claim 23, comprising the further steps of:
previously storing information for letting an operator know the contents of an item, input text data for generating image data as an output and/or text data having predetermined contents for each item; and
retrieving said information and said data to input and modify components associated with the retrieved information and data to form an image.

25. An image forming apparatus for forming images for areas having a plurality of items for inputting components of said images and defined by inputting components corresponding to the respective items, said apparatus comprising:
detecting means for detecting that there is an item within said plurality of items for which a component is not input;
item area changing means for deleting an area for said item based on the detection result of said detecting means and extending areas for the remaining items by the deleted area; and
component enlarging means for enlarging dimensions of components input to said remaining items and changing positions of said components in accordance with the extended areas.

26. An image forming apparatus according to claim 25, wherein:
said item area changing means includes:
storing means for storing enlarged dimensions of said areas for the remaining items; and
retrieving means for retrieving said enlarged dimensions based on the detection result of said detecting means.

27. An image forming apparatus according to claim 25, further comprising:
storing means for storing information for letting an operator know the contents of an item, input text data for generating image data as an output and/or text data having predetermined contents for each item;
retrieving means for retrieving said input text data and/or said text data having predetermined contents for each item from said storing means; and
input processing means for inputting and modifying components associated with said information, said input text data, and/or said text data for each item retrieved by said retrieving means from said storing means.

28. An image forming apparatus for forming images for areas having a plurality of items for inputting components of said images and defined by inputting components corresponding to the respective items, said apparatus comprising:
adjusting means, operative when detecting an item within said plurality of items for which a component is not input, for deleting an area for said item, extending areas for the remaining items by the deleted area, and enlarging dimensions of components input to said remaining items in accordance with the extended areas; and
switching means for switching whether or not processing by said adjusting means is performed.

29. An image forming apparatus for forming images for areas having a plurality of items for inputting components of said images and defined by inputting components corresponding to the respective items, said apparatus comprising:
detecting means for detecting whether there is an item within said plurality of items for which a component is not input;
means for deleting an area for an item within said plurality of items for which a component is not input, when a maintain empty input option is not specified; and
means for maintaining areas for empty input items without deleting empty input items, when a maintain empty input option is specified.

30. An image forming apparatus according to claim 29, further including means for allowing the inputting of a component only for an item previously left empty, when the maintain empty input option is again specified.

31. An image forming method for forming images for areas having a plurality of items for inputting components of said images and defined by inputting components corresponding to the respective items, said method comprising the steps of:
detecting whether there is an item within said plurality of items for which a component is not input;
deleting an area for an item within said plurality of items for which a component is not input, when a maintain empty input option is not specified; and
maintaining areas for empty input items without deleting empty input items, when a maintain empty input option is selected.

32. An image forming method in accordance with claim 31, comprising the further steps of allowing the inputting of a component only for an item previously left empty, when the maintain empty input option is again specified.

33. An image forming method according to claim 23, further comprising the steps of:
when deleting an area for an item, storing enlarged dimensions of areas for the remaining items, and retrieving the enlarged dimensions based on the detection result of the detecting means.

34. An image forming method for forming images for areas having a plurality of items for inputting components of said images and defined by inputting components corresponding to the respective items, said method comprising the steps of:
upon detecting an item within said plurality of items for which a component is not input, deleting an area for said item, extending areas for the remaining items by the deleted area, and enlarging dimensions of components input to said remaining items in accordance with the extended areas; and
switching whether or not the previous step is performed.

* * * * *